United States Patent
Pollock et al.

(10) Patent No.: US 6,902,797 B2
(45) Date of Patent: Jun. 7, 2005

(54) GYPSUM-BASED COMPOSITE MATERIALS REINFORCED BY CELLULOSE ETHERS

(75) Inventors: Jacob Freas Pollock, Berkeley, CA (US); Christopher D. Tagge, San Carlos, CA (US); Lennard Torres, Pleasanton, CA (US); David S. Soane, Piedmont, CA (US)

(73) Assignee: Innovative Construction and Building Materials, Emeryville, VA (US)

(*) Notice: Subject to any disclaimer, the term of this patent is extended or adjusted under 35 U.S.C. 154(b) by 0 days.

(21) Appl. No.: 10/446,571

(22) Filed: May 27, 2003

(65) Prior Publication Data

US 2004/0092625 A1 May 13, 2004

Related U.S. Application Data

(63) Continuation-in-part of application No. 10/351,675, filed on Jan. 23, 2003, application No. 10/446,571.
(60) Provisional application No. 60/425,924, filed on Nov. 12, 2002, provisional application No. 60/463,138, filed on Apr. 14, 2003, and provisional application No. 60/442,725, filed on Jan. 23, 2003.

(51) Int. Cl.[7] .............................................. B32B 3/26
(52) U.S. Cl. .............................. 428/304.4; 428/312.8; 428/328; 106/638
(58) Field of Search ........................ 428/304.4, 312.8, 428/328; 106/638

(56) References Cited

U.S. PATENT DOCUMENTS

| | | | |
|---|---|---|---|
| 3,878,278 A | 4/1975 | Miller et al. | 264/45.3 |
| 3,989,534 A | 11/1976 | Plunguian et al. | 106/86 |
| 4,137,198 A | 1/1979 | Sachs | 521/154 |
| 4,148,781 A | 4/1979 | Narukawa et al. | 260/42.51 |
| 4,153,470 A | 5/1979 | Stahl et al. | 106/116 |
| 4,265,964 A | 5/1981 | Burkhart | 428/306 |
| 4,330,589 A | 5/1982 | Saito et al. | 428/312.4 |
| 4,487,864 A | 12/1984 | Bermudez et al. | 524/2 |
| 4,518,652 A | 5/1985 | Willoughby | 428/312.4 |
| 4,778,529 A | 10/1988 | Barker et al. | 106/93 |

(Continued)

FOREIGN PATENT DOCUMENTS

| | | |
|---|---|---|
| DE | 3920025 | 1/1991 |
| EP | 0 216 297 | 4/1987 |
| EP | 0 486 467 | 5/1992 |
| EP | 0 985 504 | 3/2000 |
| GB | 815184 | * 6/1959 |
| GB | 2 022 503 | 12/1979 |
| GB | 2 048 235 | 12/1980 |
| JP | 49-111928 | 10/1974 |
| JP | H02-267148 | 10/1990 |
| JP | H03-028181 | 2/1991 |

(Continued)

OTHER PUBLICATIONS

ASTM Standard Designation: C 473—95, pp. 249–259 (1995).
ASTM Standard Designation: C 36—95b, pp. 47–49 (1995).

(Continued)

*Primary Examiner*—Leszek B Kiliman
(74) *Attorney, Agent, or Firm*—Christopher Paradies; Fowler White Boggs Banker, P.A.

(57) ABSTRACT

A gypsum-based composite structure is prepared from a slurry comprising a mixture of calcium sulfate hemihydrate, a cellulose ether additive other than CMC and an amount of water that is sufficient to form a slurry. The calcium sulfate hemihydrate is hydrated by the water forming a wallboard core reinforced by the cellulose ether additive. The concentration, viscosity grade and degree of substitution of the cellulose ether are selected to give the composite improved nail pull resistance and greater flexural strength.

62 Claims, 47 Drawing Sheets

U.S. PATENT DOCUMENTS

| | | | |
|---|---|---|---|
| 4,808,360 A | | 2/1989 | Natori et al. ............... 264/221 |
| 4,845,207 A | | 7/1989 | t'Sas ........................... 536/91 |
| 4,902,348 A | | 2/1990 | Kossatz et al. ............. 106/111 |
| 4,923,538 A | | 5/1990 | Hill .............................. 156/78 |
| 4,949,518 A | | 8/1990 | Nagel et al. .................. 52/239 |
| 4,994,113 A | | 2/1991 | Helmstetter ................ 106/618 |
| 5,109,030 A | | 4/1992 | Chao et al. .................... 521/83 |
| 5,194,091 A | | 3/1993 | Laney ........................ 106/611 |
| 5,277,712 A | * | 1/1994 | McInnis ..................... 106/774 |
| 5,344,490 A | | 9/1994 | Roosen et al. ............. 106/778 |
| 5,385,607 A | | 1/1995 | Kiesewetter et al. ..... 106/197.1 |
| 5,387,626 A | | 2/1995 | Böhme-Kovac et al. ...... 524/35 |
| 5,401,798 A | | 3/1995 | Rasp et al. ................. 524/423 |
| 5,414,970 A | | 5/1995 | Bontrager et al. ............ 52/408 |
| 5,432,215 A | | 7/1995 | Girg et al. ..................... 524/28 |
| 5,482,551 A | * | 1/1996 | Morris et al. ............... 106/772 |
| 5,590,501 A | | 1/1997 | Stoddart et al. ............... 52/408 |
| 5,641,584 A | | 6/1997 | Andersen et al. ........... 428/703 |
| 5,658,656 A | | 8/1997 | Whitney et al. ......... 428/304.4 |
| 5,765,334 A | | 6/1998 | Vitous ..................... 52/745.19 |
| 5,817,262 A | | 10/1998 | Englert ........................ 264/86 |
| 5,879,486 A | | 3/1999 | Philips et al. ................. 156/39 |
| 5,879,825 A | | 3/1999 | Burke et al. ................ 428/703 |
| 5,888,322 A | | 3/1999 | Holland ........................ 156/39 |
| 5,888,642 A | | 3/1999 | Meteer et al. ........... 428/313.5 |
| 5,945,208 A | | 8/1999 | Richards et al. ......... 428/294.7 |
| 6,042,665 A | | 3/2000 | Kiraly et al. ................. 156/39 |
| 6,162,839 A | | 12/2000 | Klauck et al. ................ 521/83 |
| 6,171,388 B1 | | 1/2001 | Jobbins ...................... 106/778 |
| 6,228,163 B1 | * | 5/2001 | Espinoza et al. ........... 106/778 |
| 6,251,979 B1 | | 6/2001 | Luongo ...................... 524/423 |
| 6,319,312 B1 | | 11/2001 | Luongo ...................... 106/675 |
| 6,342,284 B1 | * | 1/2002 | Yu et al. ....................... 428/70 |
| 6,402,832 B1 | | 6/2002 | Vijayendran et al. ....... 106/778 |
| 6,406,535 B1 | * | 6/2002 | Shintome .................... 106/705 |
| 6,406,779 B1 | | 6/2002 | Carbo et al. ................ 428/219 |
| 6,485,821 B1 | | 11/2002 | Bruce et al. ............. 428/304.4 |
| 6,492,450 B1 | | 12/2002 | Hsu ............................ 524/423 |
| 6,699,915 B2 | * | 3/2004 | Hilton et al. .................. 521/83 |
| 6,743,830 B2 | * | 6/2004 | Soane et al. ................... 521/83 |
| 6,746,781 B2 | | 6/2004 | Francis et al. ............ 428/537.5 |
| 2002/0045684 A1 | | 4/2002 | Bacher et al. .................. 524/4 |
| 2003/0084980 A1 | * | 5/2003 | Seufert et al. ................ 156/39 |
| 2003/0154888 A1 | * | 8/2003 | Yu et al. ..................... 106/772 |
| 2004/0045481 A1 | * | 3/2004 | Sethuraman et al. ........ 106/674 |

FOREIGN PATENT DOCUMENTS

| | | | |
|---|---|---|---|
| WO | WO 99/54265 | 10/1990 | |
| WO | WO 98/30515 | 7/1998 | |
| WO | WO 00/76937 | 12/2000 | |
| WO | WO 01/34534 | 5/2001 | |
| WO | WO 02/48254 | 6/2002 | |
| WO | WO 02/083594 | 10/2002 | |
| WO | WO 03/012218 | 2/2003 | |
| WO | WO 2004/02468 | * 3/2004 | |

OTHER PUBLICATIONS

ASTM Standard Designation: D3876—96, pp. 1–3 (2001).

The Dow Chemical Company, "Methocel Cellulose Ethers—Helping to Create Better Building Materials" (Oct. 1999).

The Dow Chemical Company, "Methocel Cellulose Ethers–For Crack Fillers and Tape–Joint Compounds" (Aug. 1999).

The Dow Chemical Company, Methocel Cellulose Ethers—For Cement–Based Plaster (Dec. 2000).

F. Brandt et al., "Bassanite ($CaSO_4 \cdot 0.5H_2O$) Dissolution and Gypsum ($CaSO_4 \cdot 2H_2O$) Precipitation in the Presence of Cellulose Ethers," Journal of Crystal Growth 233:837–845 (2001).

U. Ludwig et al., "Effect of Temperature and Methyl Cellulose on the Hydration of Gipsum β–Hemihydrate," Il Cemento, vol. 1, pp. 39–50 (1979).

S–I. Takahashi et al., "Relationship between Distribution of Substituents and Water Solubility of O–Methyl Cellulose," Journal of Polymer Science: Part A: Polymer Chemistry, 25:987–994 (1987).

F. Hayashi et al., "Polyurethane–Gypsum Foams," Int. Prog. Urethanes, 3:113–133 (1981).

The Dow Company, "Methocel Cellulose Ethers for Gypsum–Based Building Materials—The final touch for building materials" (Aug. 1999).

T. Michelsen, "Building Materials (Survey)," Encyclopedia of Chemical Technology, 4th Edition, pp. 618–619 (1992).

Hercules Incorporated, Aqualon Division, *Product Data Sheet*, No. 4195–1, 2003, Wilmington, Delaware.

"CULMINAL products, nomenclaure and specifications", www.herc.com/aqualon/construction/cons_brochure/bro_culm_prodnom.html, Copyright 2003 Aqualon.

"Chemistry of cellulose ethers", www.herc.com/aqualon/construction/cons_brochure/bro_culm_chemistr.html, Copyright 2003 Aqualon.

* cited by examiner

Fig. 19
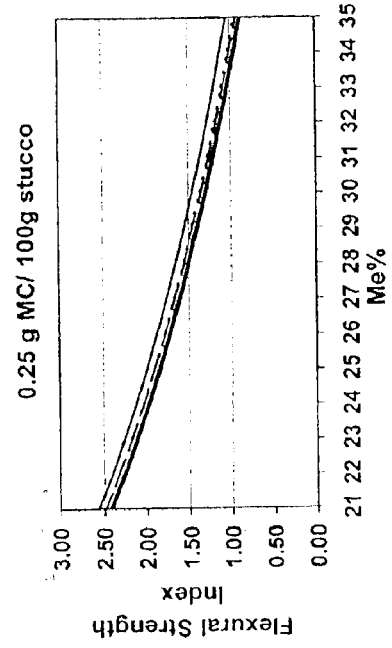
Fig. 19A
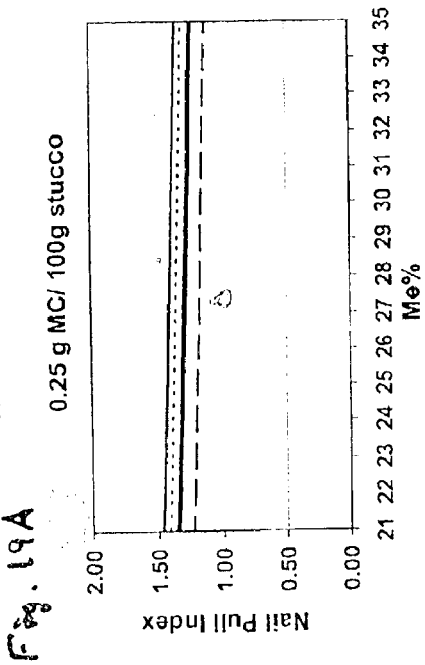
Fig. 19B
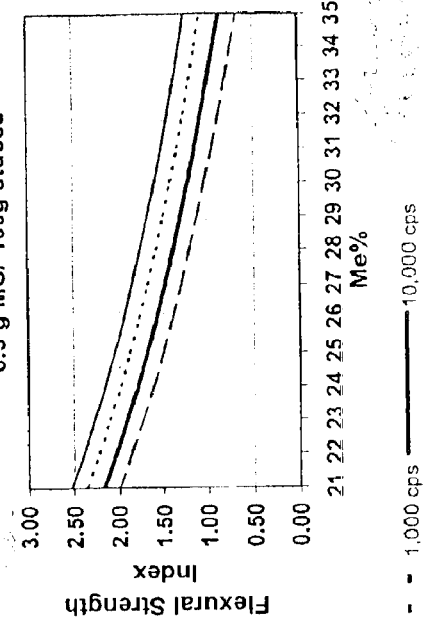
Fig. 19C
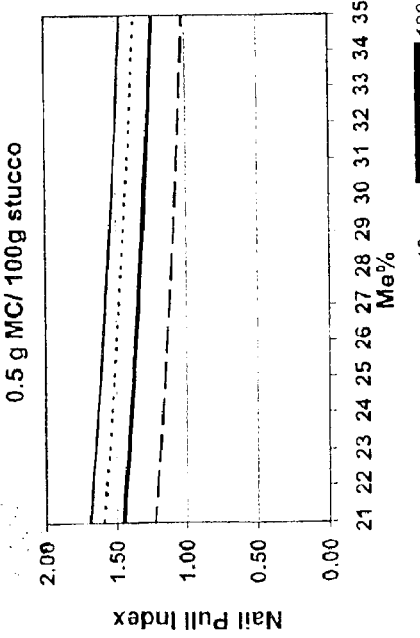
Fig. 19D

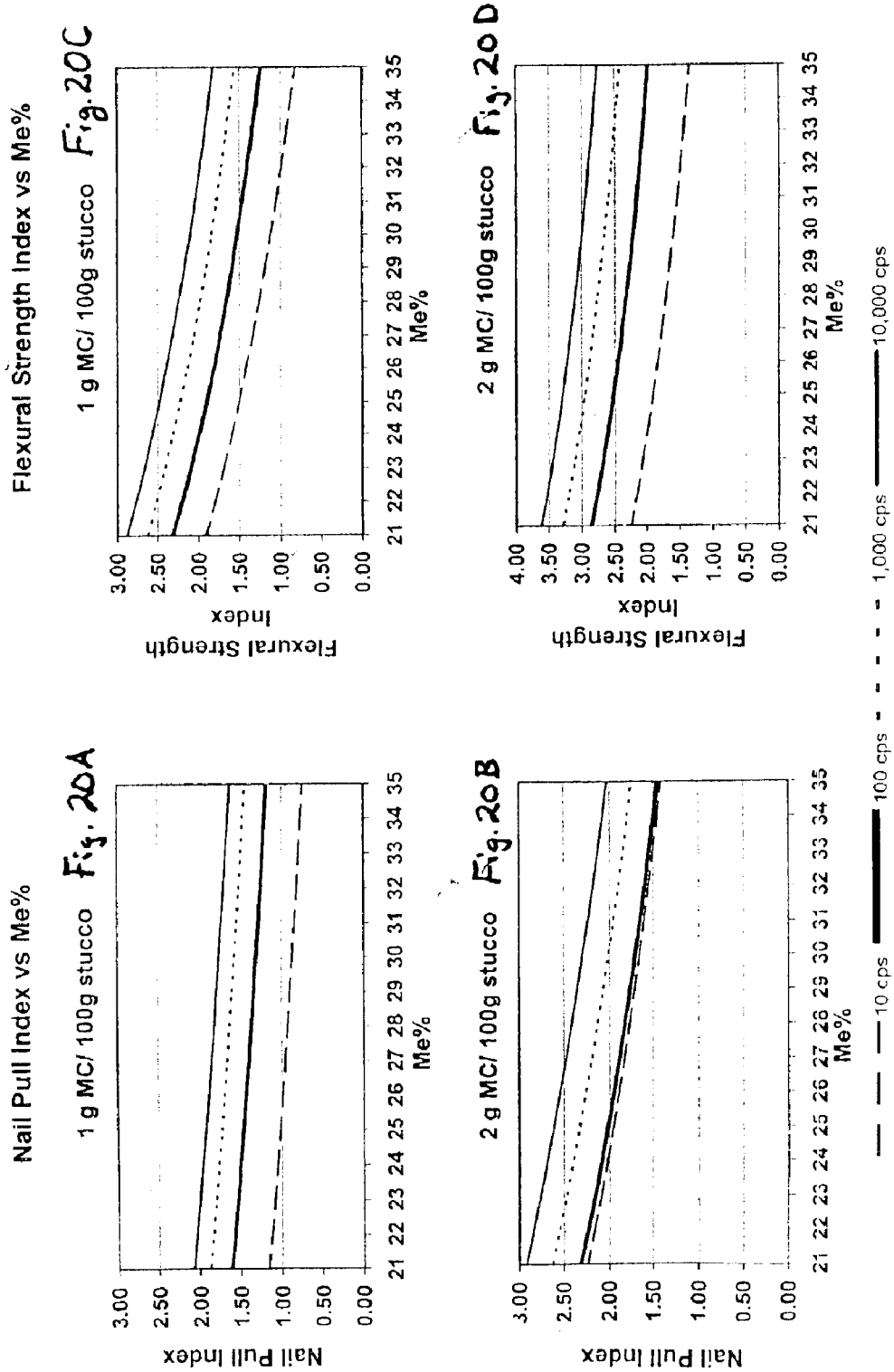

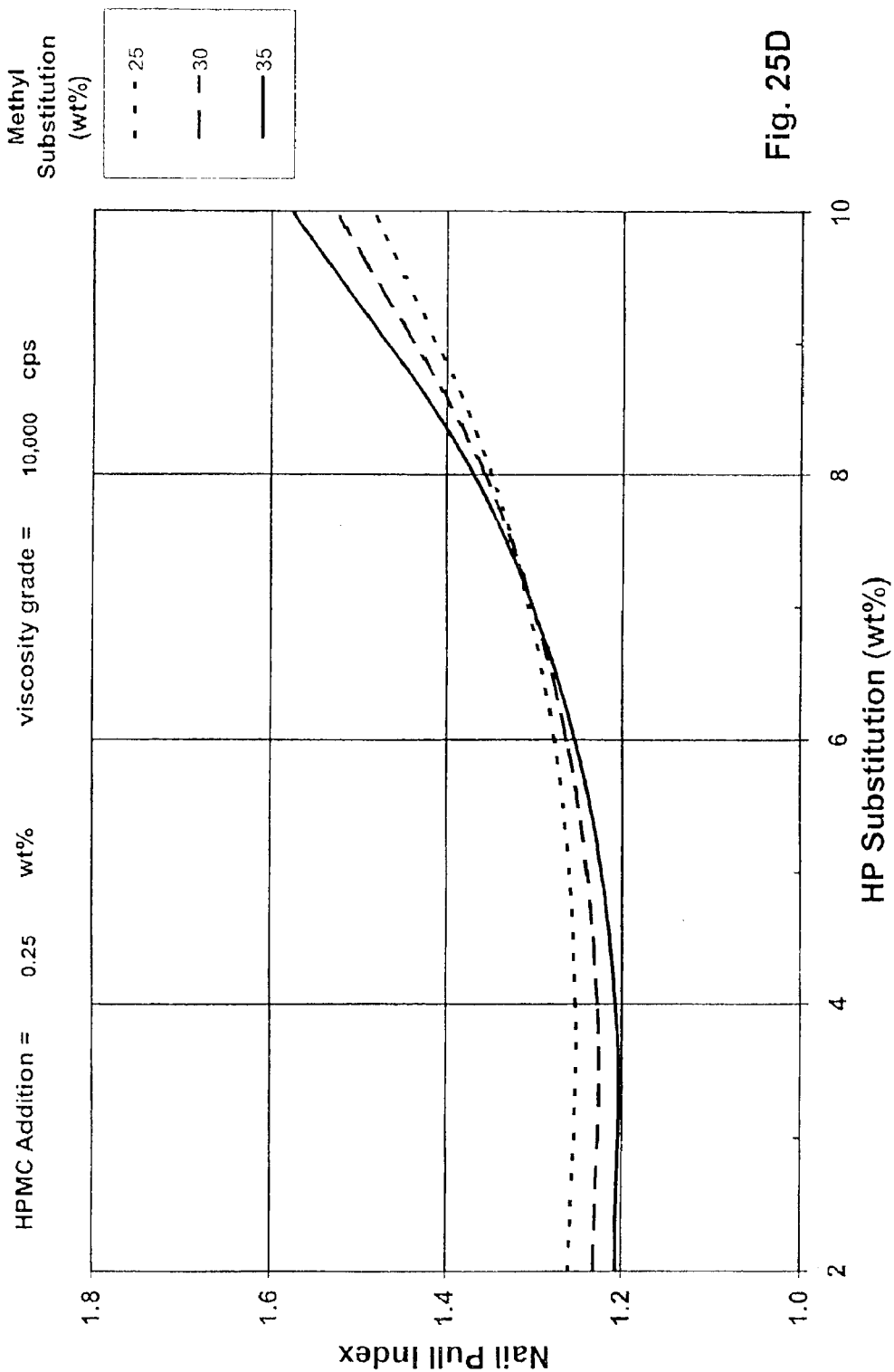

GYPSUM-BASED COMPOSITE MATERIALS REINFORCED BY CELLULOSE ETHERS

RELATED APPLICATION

This application is a continuation-in-part of U.S. patent application Ser. No. 10/351,675 by Tagge et al., filed Jan. 23, 2003, claiming the benefit of U.S. Provisional Application No. 60/425,924, filed Nov. 12, 2002, the entire disclosure of which is incorporated by reference herein, and claims the benefit of U.S. Provisional Application No. 60/463,138 for Wallboard with Anti-fungal and Reinforcing Additives and Process of Fabrication to Tagge et al., filed Apr. 14, 2003, which is incorporated by reference herein in its entirety and U.S. Provisional Application No. 60/442,725 for Reduced Paper Reinforced Wallboard, filed Jan. 23, 2003, which is incorporated by reference herein in its entirety.

FIELD OF THE INVENTION

The field of the invention is composite structures comprising gypsum, such as molded items, free-standing structural supports, wallboard, including paper-covered wallboard, panels, underlayment, sheathing board, moisture resistant board, type-X board, insulation board, shaft liner, soffit board, backing board, core board, ceiling board, cement board, gypsum glass mat board, and integrated structures and a method of manufacturing such composites.

BACKGROUND OF THE INVENTION

Cellulose is a polysaccharide composed of individual anhydroglucose units which are linked through a glycosidic bond (FIG. 16). The number 'n' of anhydroglucose units in the polymer chain is defined as the degree of polymerisation. Typically, production of cellulose ethers (CE's) involves replacing some of the hydroxyl hydrogen groups of cellulose with a substituent group, for example a methyl group, an ethyl group, a carboxymethyl group, a hydroxyehthyl group, a hydroxypropyl group, or some combination thereof. For example, a hydroxyethyl methyl cellulose (HEMC) may be produced by replacing some of the groups of cellulose with hydroxyethyl groups and methyl groups. Likewise, a hydroxypropyl methyl cellulose (HPMC) may be produced with hydroxypropyl and methyl groups replacing some of the hydroxyl groups of the cellulose.

The number of substituted hydroxyl groups per anhydroglucose unit is expressed as the degree of substitution (DS). The DS can vary between 0 and 3. As with all polymer reactions, this reaction does not occur uniformly along the polymer chain. The reported degree of substitution is therefore a mean degree of substitution over the whole polymer chain. Alternatively, molar substitution (MS) may be used to report the number of moles of substituent groups, such as a hydroxypropyl group, per mole of anhydroglucose. Often, manufacturers follow a convention whereby one of the substituents is reported by DS and the other by MS, where the substituent reported by MS may replace a hydroxyl group or may attach to another substituent to form a graft. The DS is not always reported, and the value reported is often inaccurate or given as a broad range, as shown in Table I.

In another alternative, the weight percent of substituents is reported. Weight percent of substituents may be directly related to DS and MS. For example, the following equations show the conversion for HPMC:

$$DS(OCH_3) = \frac{wt\% \ OCH_3}{31} * \frac{162}{100 - (wt\% \ OC_3H_6OH/1.29 + wt\% \ OCH_3 * 0.45)} \quad EQ. 1$$

and $$MS(OC_3H_6OH) = \frac{wt\% \ OC_3H_6OH}{75} * \frac{162}{100 - (wt\% \ OC_3H_6OH/1.29 + wt\% \ OCH_3 * 0.45)} \quad EQ. 2$$

Cellulose ethers are conventionally differentiated by type of substituent and the viscosity of an aqueous solution of the cellulose ether. For example methyl cellulose (MC), ethyl cellulose (EC), carboxymethyl cellulose (CMC), hydroxyethyl cellulose (HEC), ethyl hydroxyethyl cellulose (EHEC), ethyl hydroxypropyl cellulose (EHPC) and hydroxypropyl cellulose (HPC) are named for the type of substituent group used to replace the hydroxyl group in cellulose. The viscosity of an aqueous solution including a cellulose ether is an important characteristic for its typical use as a thickener; therefore, cellulose ethers are also differentiated by viscosity, which depends on the degree of polymerization (directly related to the measured molecular weight), and the type and degree of substitution of substituent groups. As the molecular weight increases, the viscosity of an aqueous solution of the cellulose ether increases also. However, the effect of the degree of substitution depends on the particular type of substituent group, which may also affect the viscosity of the cellulose ether.

Manufacturers characterize the effect of a particular cellulose ether on the viscosity by reporting the measured viscosity of a 2 wt % aqueous solution of the cellulose ether at 20° C. Herein, we refer to this 2 wt % viscosity as the viscosity grade of the particular cellulose ether. Typically, the viscosity grade is measured by one of two techniques: Brookfield and Ubbelohde. Often, the measured viscosity grade differs between the two techniques. For example, results using both techniques are shown in Table I for some cellulose ethers.

A modified cellulose, also referred to herein as a cellulose derivative, is used in plaster and joint compounds as a thickener (or to modify the rheology in some way) and to improve the workability of gypsum-based compounds. Cellulose ethers have been known to improve some other properties, including the consistency, adhesion and water retention of gypsum-based joint compounds and tile adhesives. However, adhesion, water retention and thickening are considered detrimental in the production of some gypsum-based composite structures. For example, wallboard is processed from a slurry that is continuously mixed and fed onto a belt. Thus, it is desirable for the slurry used to make wallboard to be more readily mixed and more quickly dried than a plaster, which is ordinarily formed or shaped by hand in a manual layering process.

Calcined gypsum powder (calcium sulfate hemihydrate and/or calcium sulfate anhydrite) is usually mixed with water and a variety of additives, which are used for nucleating the growth of gypsum crystals, as anti-fungal agents, light weight fillers or reinforcing fibers. Dissolution of the calcined gypsum powder in the water and a resulting hydration reaction causes crystallization of gypsum crystals (calcium sulfate dihydrate) forming a core of interlocking gypsum crystals. Application of multi-ply face sheets is usually integrated with the formation of the core into a wallboard. This is often followed by mild heating to drive off the remaining free (unreacted) water to yield a dry product, having face sheets adhered to gypsum core.

Tensile and shear strength of conventional wallboard is related primarily to the strength of the facing paper, typically an oriented fiber, multi-ply facing paper that is applied to the gypsum-based slurry during a continuous forming process. For a ½ inch wallboard with a density of about 0.6 g/cc, approximately one-half of the nail pull resistance and two-thirds of the flexural strength are supplied by the paper face sheets, which also account for 40% of the manufacturing costs. The core is usually exceptionally poor at handling tensile loads of any kind Even compressive loads are limited for lower density wallboards without face sheets. Adding porosity and/or a low-density, expanded filler (e.g. perlite) into the conventional material reduces the core density. However, the strength of gypsum sheets decreases dramatically with density. For example, a dramatic decrease of the nail-pull resistance with density of ½-inch gypsum wallboard, both papered and non-papered, can be seen in FIG. 3.

Several unique challenges have thus far restricted the commercialization of polymer-reinforced cementitious products to relatively expensive niche products. For example, the nail pull resistance may decrease with the addition of some organic additives or an increase in nail pull resistance may require concentrations of polymers greater than 5 wt %, which can lead to problems such as inflammability, reduced extinguishability, commercially unacceptable cost of the wallboard, and mold susceptibility. Therefore, there is a longstanding and unresolved need for an additive that can increase both the nail pull resistance and the flexural strength of wallboard core, allowing the core density to be reduced, without adversely affecting other properties of the gypsum-based product.

SUMMARY OF THE INVENTION

A gypsum-based composite structure is produced using water, calcium sulfate hemihydrate and an additive, which are mixed together, reacted and formed into the composite structure. Upon mixing with the water, the calcium sulfate hemihydrate may dissolve or partially dissolve in the water and hydrates, over time, forming gypsum crystals. Preferably, β-calcium sulfate hemihydrate is used; however, α-calcium sulfate hemihydrate may be used, if the addition of water is adjusted to account for the slower dissolution of this crystalline form. The additive is selected from one or more cellulose ethers. For example, a cellulose ether having a degree of methyl substitution, such as MC, HPMC and HEMC is used.

Preferably, the weight percent of cellulose ether to calcium sulfate hemihydrate is selected to be no greater than 5 wt %, more preferably no greater than 3 wt %, whereby the cellulose ether has a negligible effect on the inflamability and extinguishability of the wallboard. Even more preferably, the weight percent is no greater than 0.5 wt %, whereby the composite structure is substantially strengthened at a low cost. Herein, substantially strengthened means that the flexural strength index and/or nail pull index is at least 1.3, corresponding to about a one-third increase in the measured parameter compared to an unreinforced alternative. An increase of about one-third is believed to be commercially significant, providing an advantage to other ways of strengthening a gypsum-based composite structure that cost more, as well as competing favorably with other composite systems.

By a "slurry," it is meant that the mixture of dry ingredients and water forms a homogeneous fluid, dissolving at least a portion of the calcium sulfate hemihydrate in the water. For example, the slurry is a thixotropic fluid. The amount of water required depends, for example, on the amount and type of calcium sulfate hemihydrate, e.g. α or β, the amount of additive and other dry ingredients, as well as the temperature and the type of additive or additives included in the slurry. The amount of water used in the slurry significantly alters the microstructure of the gypsum-base composite structure, for example, by affecting the amount of porosity, the extent of dissolution of the calcium sulfate hemihydrate, the rate of hydration and the morphology of the gypsum crystals. The microstructure affects the properties of the wallboard, such as the nail pull resistance and flexural strength.

It should be understood that reported and measured viscosity grade varies considerably. Viscosity grade varies, for example, based on the use of different measurement techniques. For example, selection of the shear rate and spindle size used for measuring viscosity grade impacts the measured value. A variation of as much as 30% from the viscosity grade reported by manufacturers is to be expected at low viscosity grades, e.g. less than 100 cps. Viscosity grades greater than about 1000 cps show an even greater variation in the viscosity grade from that actually measured and the viscosity grade reported by the manufacturer. Thus, any limits in viscosity grade stated herein should be understood as approximate values within these expected variations.

It should be understood that the mean value of the molecular weight for a specific type of commercial cellulose ether with a specific degree of substitution may vary, for example, between batches. Variations between batches allow for significant commercial variances in the mean and standard deviation from the mean of the molecular weight of a particular cellulose ether. Typically, the mean molecular weight may vary by as much as 20% from the manufacturer's specification. Also, the standard deviation of the molecular weight within a batch depends, for example, on manufacturing tolerances, the process chosen to manufacture a particular cellulose ether, and the variations already present in the raw cellulose prior to substitution. Thus, any limits for MW expressed herein should be considered approximate values within the expected variations.

A nail pull index and flexural strength index are presented herein that normalize the measurements of nail pull resistance and flexural strength for wallboard and ceiling board specimens having a spectrum of board weights by comparing the strength measurements to the strength of specimens prepared without a strengthening additive at the same wallboard weight and thickness, but with all other factors such as stucco purity, other additions, forming process and testing conditions constant. For example, the nail pull resistance versus board weight without a strengthening additive is shown in FIG. 3 for specimens with and without paper. Thus, the nail pull index, as shown in FIG. 5 for some embodiments, is a comparative measure of the nail pull resistance of a reinforced specimen to a conventional specimen at the same density (board weight), and a nail pull index of 1.0 means that a reinforced wallboard specimen has the same nail pull resistance as a specimen of the same density that is prepared without a strengthening additive.

BRIEF DESCRIPTION OF THE DRAWINGS

FIGS. 19 and 20, based on a correlation with data, show graphically the calculated effect of percent substitution of methyl groups in methyl cellulose on the nail pull index and flexural strength index for various viscosity grades and weight percent additions of methyl cellulose.

DETAILED DESCRIPTION OF THE PREFERRED EMBODIMENTS

Figure 1:
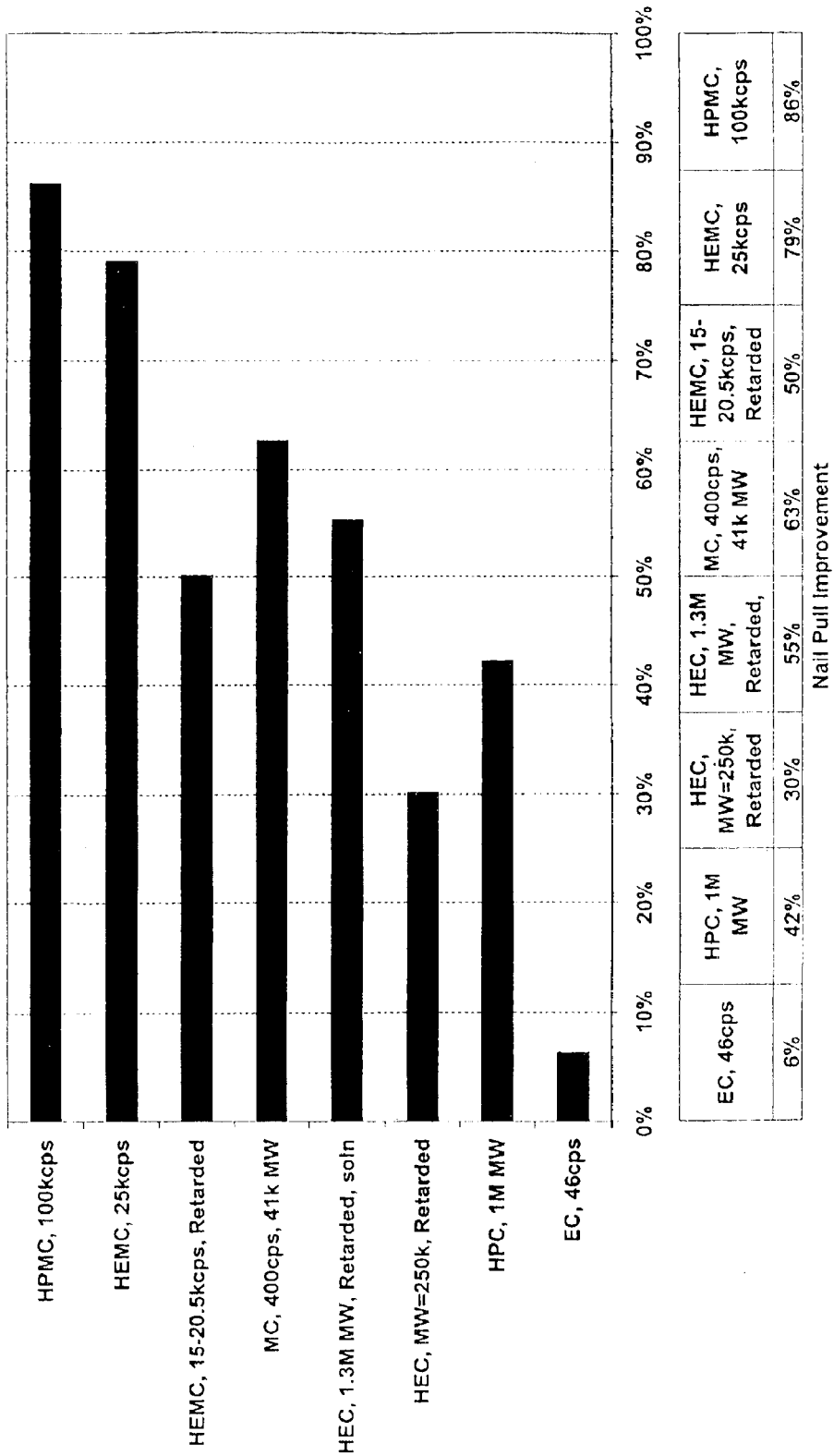
FIG. 1 shows the improvement in nail pull resistance of several embodiments of the present invention at a concentration of 1 g of additive/100 g β-calcium sulfate hemihydrate.

A gypsum-based composite structure is prepared using a mixture of a calcium sulfate hemihydrate, a reinforcing additive and water. The calcium sulfate hemihydrate is preferably β-calcium sulfate hemihydrate in one embodiment and may be produced by calcining gypsum, for example. In another embodiment, α-calcium sulfate hemihydrate is preferred. The reinforcing additive is a cellulose ether that is dispersable in water and may be produced and used in various forms, such as aqueous solutions, granules and powders. For example, cellulose ethers may be used with a wide variety of substituent groups, including HPC, HEC, MC, HPMC, EHEC, EHPC and HEMC. Preferably, the cellulose ether contains either a methyl group, an hydroxypropyl group, an hydroxyethyl group or a combination of these groups.

In one alternative embodiment, the cellulose ether comprises at least one hydroxybutyl substitution.

The increased nail pull resistance and flexural strength imparted to gypsum-based composite structures by the embodiments of the present invention offers new uses and markets for this inexpensive cementitious material. For example, a free standing poured structure may be molded that has exceptional strength and stiffness. In another example, a mold resistant wallboard can be fabricated with or without face sheets. The heavy, fiber-laden face sheets of conventional wallboard tend to feed mold growth. However, one embodiment of the present invention prevents mold growth.

Also, cellulose ethers do not tend to feed mold growth when added to the wallboard core in amounts less than 5 wt %, as shown by mold resistance tests. For example, specimen maintained at 32° C. in an incubator with 90% humidity and in the presence of mold spores showed no mold growth after 24 days. In an alternative embodiment, a skim layer added to at least one surface provides even greater mold resistance or a treated surface is added that improves water repellency and/or the antimicrobial and antifungal properties of the composite structure. There is a longstanding and unresolved need for low cost gypsum-based structures having such mold resistance.

In another example, a lightweight wallboard with a conventional multi-ply facing sheet or sheets, may be fabricated by reducing the density of the wallboard core without sacrificing the nail pull resistance of the wallboard. For example, the density may be reduced below 0.75 g/cc using a lightweight filler or by introducing porosity into the core in the form of voids or air bubbles while maintaining the flexural strength and nail pull resistance of the wallboard.

Addition of an excess amount of water to the slurry, over and above the stoichiometric amount of water needed to hydrate the powdered dry ingredients, reduces the density of the wallboard core. It is believed, without being limiting in any way, that the excess water originally fill voids in the wallboard core, and after drying, the voids remain as porosity in the wallboard core. A general, empirical correlation has been found for predicting the wallboard density in g/cc (p) with the water to powdered dry ingredient ratio (W:P), if foaming is limited by using comparatively low mixing speeds: $\rho=0.8324(W:P)^{-0.7629}$. The addition of foaming, whether by rapid stirring or addition of a foaming agent, may further reduce the density by introducing porosity into the wallboard core in addition to the amount introduced by the excess water.

By adding additional water to the slurry, viscosity of the slurry is reduced. Thus, a slurry containing substantially no clay may be extruded in a continuous extrusion process, forming a gypsum-base composite structure. By "substantially" no clay, it is meant that no clay is added to the dry ingredients as a rheology modifier. Of course, clay may be present as an impurity in the dry ingredients or the water at a level that does not significantly affect the rheology of the extrusion process.

One method of producing gypsum-based structure mixes dry ingredients comprising calcium sulfate hemihydrate powder and a powdered additive selected from cellulose ethers other than CMC. For example, the cellulose ether is selected to be soluble in water, but to have a degree of methyl substitution less than 1.8 (e.g. from 1.2 to 1.8 for MC) and/or an hydroxypropyl substitution weight percent less than 4 wt % or greater than 8 wt %. Other ingredients, including reinforcements, antifungal agents, fire retardants and sag reducers, may also be added to the gypsum-based structure. In one alternative embodiment, a cellulose ether is added in an amount less than 1 wt % to calcium sulfate hemihydrate, and the preferred methyl degree of substitution is greater than 1.8.

Surprisingly, selection of the degree of substitution (DS) may result in a substantial increase in flexural strength and nail pull resistance for cellulose ethers, such as methyl cellulose (MC), compared to commercially available cellulose ethers with other DS. A low DS (e.g. less than 1.6) is preferred for methyl cellulose. Using a DS in the range from 1.2 to 1.5 is more preferable, because a lower viscosity grade cellulose ether may be selected, or less methyl cellulose needs to be added to achieve a substantial increase in the strength of a composite structure compared to an unreinforced structure of the same density. For example, by lowering the viscosity grade of the methyl cellulose, the slurry becomes easier to mix if the amount of water remains unchanged. By making the slurry easier to mix, the microstructure of the material is made more homogeneous, which increases the nail pull resistance, for example. Alternatively, less water can be used, and the wallboard dries quicker with the same slurry viscosity. Also, lowering the fraction of methyl cellulose to calcium sulfate hemihydrate reduces the manufacturing cost of the wallboard.

It is preferable, for maximizing strength and nail pull resistance, to select a high viscosity grade, e.g. at least 100 cps and a high molecular weight (MW), e.g. at least 10,000 MW, for a methyl cellulose having a methyl DS less than 1.8. More preferably, the DS is in a range of 1.2 to 1.5. For maximizing strength, HPMC or HEMC is even more preferable than methyl cellulose. For example, a molecular weight of HPMC of 1 million cps achieves exceptional improvements in both nail pull resistance and flexural strength when the HPMC is added as part of a gypsum-based composite panel. The selection of the degree of substitution of both the methyl groups and the hydroxypropyl or hydroxyethyl groups may substantially increase the strength of the composite structure, compared to non-optimized, commercially available HPMC and HEMC.

In one example, an amount of water is selected to form a slurry with the dry ingredients that results in a finished wallboard core density of 0.75 g/cc after extrusion, setting and drying in an oven at 45° C. In other embodiments, many other additives, including other cellulose ethers may be added to tailor the properties of the wallboard core without diminishing the nail pull resistance and strength of the wallboard core.

In one embodiment, these dry ingredients are well mixed to thoroughly disperse the additive throughout a calcium sulfate hemihydrate powder. Then, the dry ingredients are added to and mixed with water, poured into a form, formed into a sheet, allowed to set, dried and trimmed. The amount of water is selected in excess of the amount needed for extrusion and the stoichiometric amount needed to form gypsum from the calcium sulfate hemihydrate and water. Preferably, the amount of water is selected to produce a wallboard core with a density less than 0.8 g/cc, more preferably less than 0.75 g/cc, even more preferably in a range from 0.45 g/cc to 0.7 g/cc for lightweight wallboard.

As one alternative embodiment, a foam may be added to the slurry, to reduce the density to a preferred range for a specific application. For example, a foaming agent, such as a surfactant or chemically active foaming agent, may be added in the water and/or the slurry to create a foam during stirring of the water and/or slurry. Adding a foam may result in a shorter drying time and/or a more preferable distribution of the porosity than a process that would produce a wallboard with an equivalent density by merely increasing the amount of water. Alternatively, a low density filler may be added, such as expanded polystyrene or perlite.

The process may be a continuous process, whereby the dry ingredients are mixed, added to the water, blended into a slurry and the slurry is extruded onto a moving surface to form the wallboard core. Alternatively, a form may both contain the slurry and form the edges of the wallboard. Optionally, one or more rolls or restrictions spread and flatten the free surface of the slurry, whereby an elongated sheet is formed. In one embodiment, the elongated sheet is a continuous wallboard core supported on at least one side. Following forming of the continuous wallboard core, the end of the elongated sheet of slurry, after being allowed to set at least partially, is cut into lengths from the rest of the elongated, continuous sheet. Then, the wallboard is trimmed if necessary and dried. Alternatively, one or more facing sheets may be added during the process on one or both sides of the wallboard core. Alternatively, a facing sheet is added after the wallboard is formed into sheets, such as by gluing or spraying a surface layer.

Another method of producing the wall board mixes a strengthening additive with the water before mixing with a powdered calcium sulfate hemihydrate. In this method, the additive, whether dry, paste, gel or liquid, is at least partially dissolved in the water. Then, the dry ingredients, including the calcium sulfate hemihydrate and optionally other dry additives, are added to and mixed with the aqueous solution to form a slurry or paste. The slurry or paste is then formed into a gypsum-based structure.

In another example, one or more paper layers may be adhered to one or more sides of a wallboard core as facing sheets, for example, for decorative purposes and/or to impart improved strength. The paper may have fibers, which may be oriented to strengthen the wallboard in a preferred direction. Alternatively, no paper layers may be added or a non-paper layer may be adhered to one or both sides of the wallboard core. In yet another alternative, a second additive may be included in the dry ingredients that segregates to one or both surfaces of the wallboard, forming an in situ surface layer on the wallboard. In yet another embodiment, reinforcing particulates or fibers may be added, for example, throughout the core or on a surface of the core.

If a methyl group is added substitutionally to the cellulose ether to make a methyl cellulose, it is preferable that the degree of substitution is less than 1.8. More preferably, the degree of substitution is no greater than 1.5. It is preferable that the methyl degree of substitution in methyl cellulose is greater than 1.2, which makes the methyl cellulose soluble in water.

In one embodiment, the cellulose ether additive is of HPMC and/or HEMC. For example, as viscosity grade of HPMC decreases from one million cps to 10 cps, the nail pull index generally decreases. Thus, it is preferable to use a high viscosity grade for an increased nail pull index; however, there is a trade-off. A high viscosity grade increases the viscosity of the slurry, unless additional water is also added. A highly viscous slurry may be difficult to mix or form; therefore, selection of the preferred viscosity grade depends on the amount of water used and vice versa. Also, an increase in water in the slurry is associated with a lower density in the fabricated structure, which leads to a reduction in strength and nail pull index compared to a denser gypsum-based structure. In one embodiment, a water reducer, such as a lignin sulfate, is added to control the slurry viscosity and excess water content.

The percent substitution of specific cellulose ethers, which were used as reinforcing additives, were analyzed in accordance with standard test method ASTM D 3876, which is incorporated by reference herein in its entirety. ASTM D 3876 determines methoxyl (methyl) and hydroxypropyl (HP) substitution in cellulose ether products by gas chromatography. The resolved substitution percentages of the various cellulose ethers, along with the measured viscosity grades, were compared to the mechanical testing results to determine the effect of the degree of substitution on flexural strength and nail pull resistance. Based on these empirical measurements, correlations were developed that relate the nail pull index and the flexural strength index to cellulose ether substitution pattern. The following regression models established the best correlation:

HPMC Nail Pull Index (NPI):

$$NPI = A_1 f^{X1}[(\log \gamma)^{X2} + A_2 M^{X3} + A_3 H^{X4}] + A_4 f^{X5} M^{X6} H^{X7} (\log \gamma)^{X8} + A_5$$

MC Nail Pull Index (NPI):

$$NPI = B_1 f^{Y1} + B_2 f^{Y2} (\log \gamma)^{Y3} + B_3 f^{Y4} M^{Y5} (\log \gamma)^{Y6} + B_4$$

MC Flexural Strength Index (TPBI)

$$MC\ TPBI = C_1 f^{Z1} + C_2 f^{Z2} (\log \gamma)^{Z3} + C_3 f^{Z4} M^{Z5} + C_4 f^{Z6} M^{Z5} + C_4 f^{Z6} M^{Z7} (\log \gamma)^{Z8} + C_5$$

wherein:
γ=cellulose ether viscosity grade (cps) (2% Ubbelohde)
M=cellulose ether methoxyl percent substitution
H=cellulose ether hydroxypropyl percent substitution
f=cellulose ether wt % (g/100 g stucco)
wherein $A_i$, $B_i$, $C_i$, Xi, Yi, and Zi are defined in Table 2.

These empirical correlations are useful in defining the effect of each of the weight percentage of cellulose ether (f), the degree or percent of substitution of the methyl (M) and hydroxypropyl (H) groups, and the viscosity grade (γ) on the nail pull index and flexural strength index of wallboard core reinforced by MC and HPMC. Additional analysis shows that HEMC behaves similarly to the correlation for HPMC. It is believed, without being limiting, that the correlation is valid in a range of viscosity grade from 5 cps to 1,000,000 cps; methyl substitution from 21% to 38%; hydroxypropyl substitution from 2% to 10%; and an amount of addition from 0.25 wt % to 5 wt %. It is also believed that the observed trends are likely to extend beyond these limits in some cases.

Figure 14:
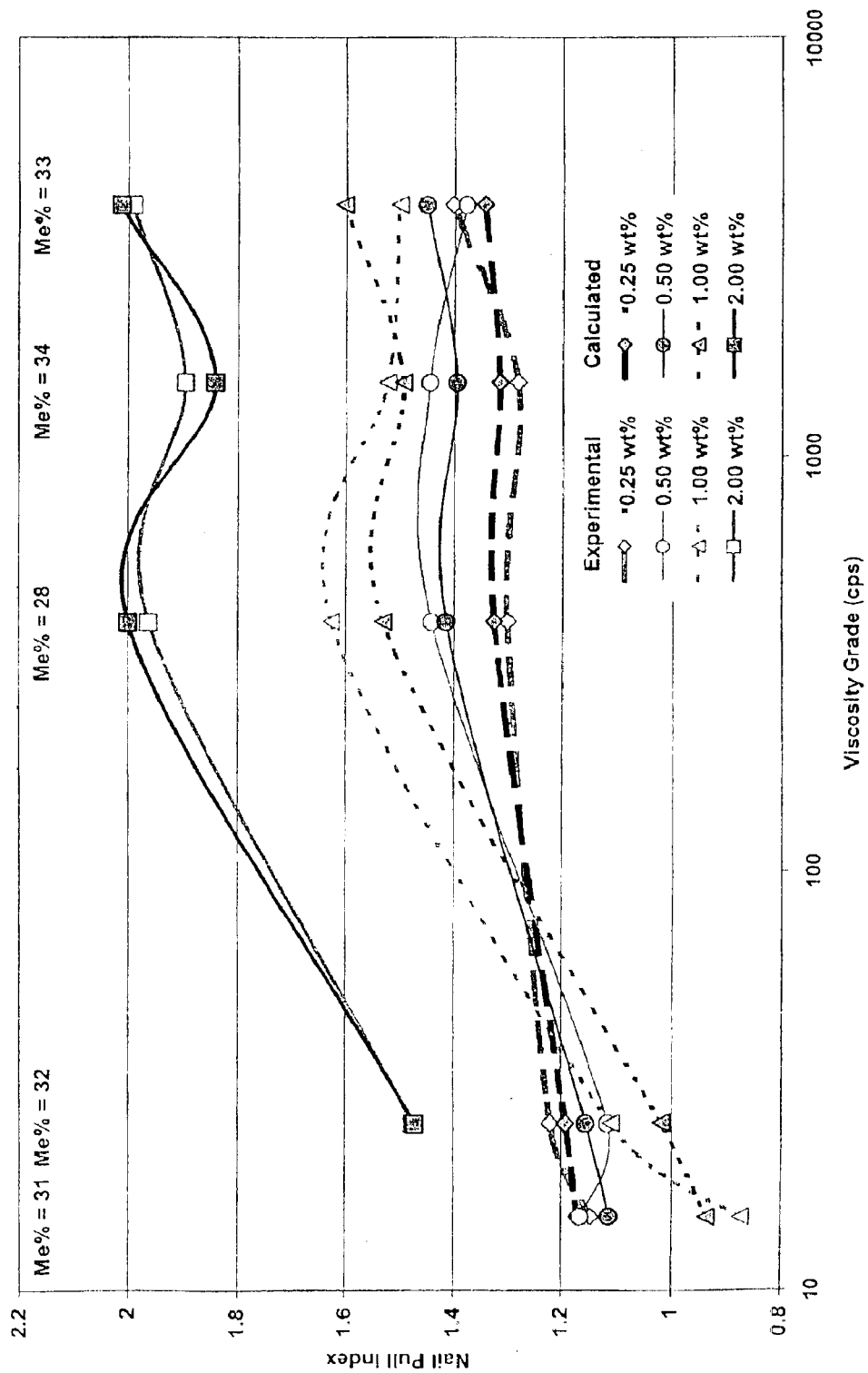
FIG. 14 shows the data and a correlation for the nail pull index versus viscosity grade for another embodiment comprising a paperless MC-reinforced wallboard.

Specifically, there is a correlation of the amount of cellulose ether additive in the wallboard core and the nail pull index and flexural strength index. The nail pull resistance and strength increases with increasing weight percent of additive, e.g. when more MC and/or HPMC is added to the slurry. There is also a correlation with viscosity grade. Surprisingly, the data shows that increasing viscosity grade increases the nail pull index and flexural strength index for HPMC and MC, which was not reflected in the literature or in some of the raw data, for example, as shown in FIG. 14 for MC. The viscosity grade tends to increase with the molecular weight; therefore, increasing molecular weight also tends to increase nail pull index and flexural strength.

There is a very surprising and unexpected correlation with the percent substitution of particular substitutional groups. For methyl cellulose, the nail pull index increases with decreasing degree of substitution (DS), as shown in FIGS. 19 and 20, for example. This unexpected and surprisingly strong correlation is sufficient to explain the dramatic inflection in the nail pull index versus viscosity grade curve shown in FIG. 14, for example. In FIG. 14, the commercially available MC had a percent substitution of methyl groups of 34% compared to 28% methyl substitution for the MC used in the adjacent data point with lower viscosity grade. This has gone unnoticed by others, and, as a result, commercial MC has a comparatively high degrees of substitution. This may have discouraged others from adding methyl cellulose to wallboard as a strengthening additive.

Manufacturers seldom openly report the DS for commercial cellulose ethers. If reported, it is often highly inaccurate. Thus, to perform this analysis, it was necessary to independently measure the percent substitution by gas chromatography. Otherwise, a clear correlation was not discernable for methyl cellulose (MC), hydroxypropyl methyl cellulose (HPMC), and hydroxyethyl methyl cellulose (HEMC). In the range of weight percent addition of reinforcing additive most practical for wallboard, e.g. less than 5 wt % or more preferably less than 3 wt %, even modest increases in the DS of methyl cellulose substantially decrease the measured flexural strength index of wallboard compared to structures using a lower DS, as shown in FIGS. 19 and 20. Also, at even lower weight percent addition of additive, e.g. less than 1 wt % of HPMC, the effect of viscosity grade tends to diminish compared to the effect of degree of substitution, increasing the importance of selecting an appropriate degree of substitution.

Figure 21:
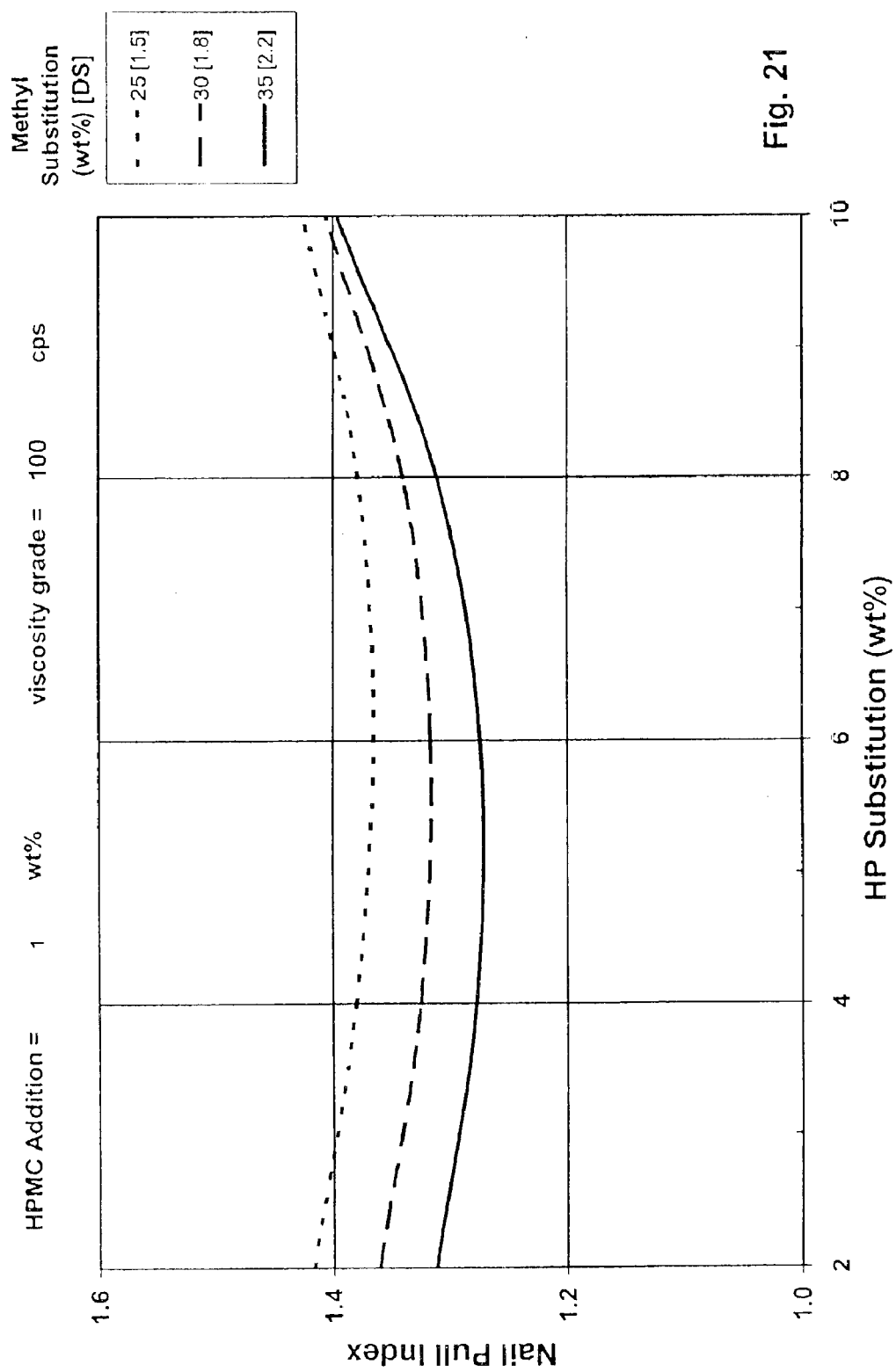
FIGS. 21–24B show graphs of nail pull index versus hydroxypropyl wt % substitution at three levels of methyl substitution and for six different HPMC viscosity grades for a 1 wt % addition of HPMC to β-calcium sulfate hemihydrate.

As shown in FIG. 21, a HPMC-reinforced gypsum-based panel, using 1 wt % of HPMC with a viscosity grade of 100 cps, is preferably prepared using a percent substitution of methyl groups less than 30 wt % (DS of 1.8) and a percent substitution of hydroxypropyl groups no greater than 4 wt % or at least 8 wt %.

Figure 22:
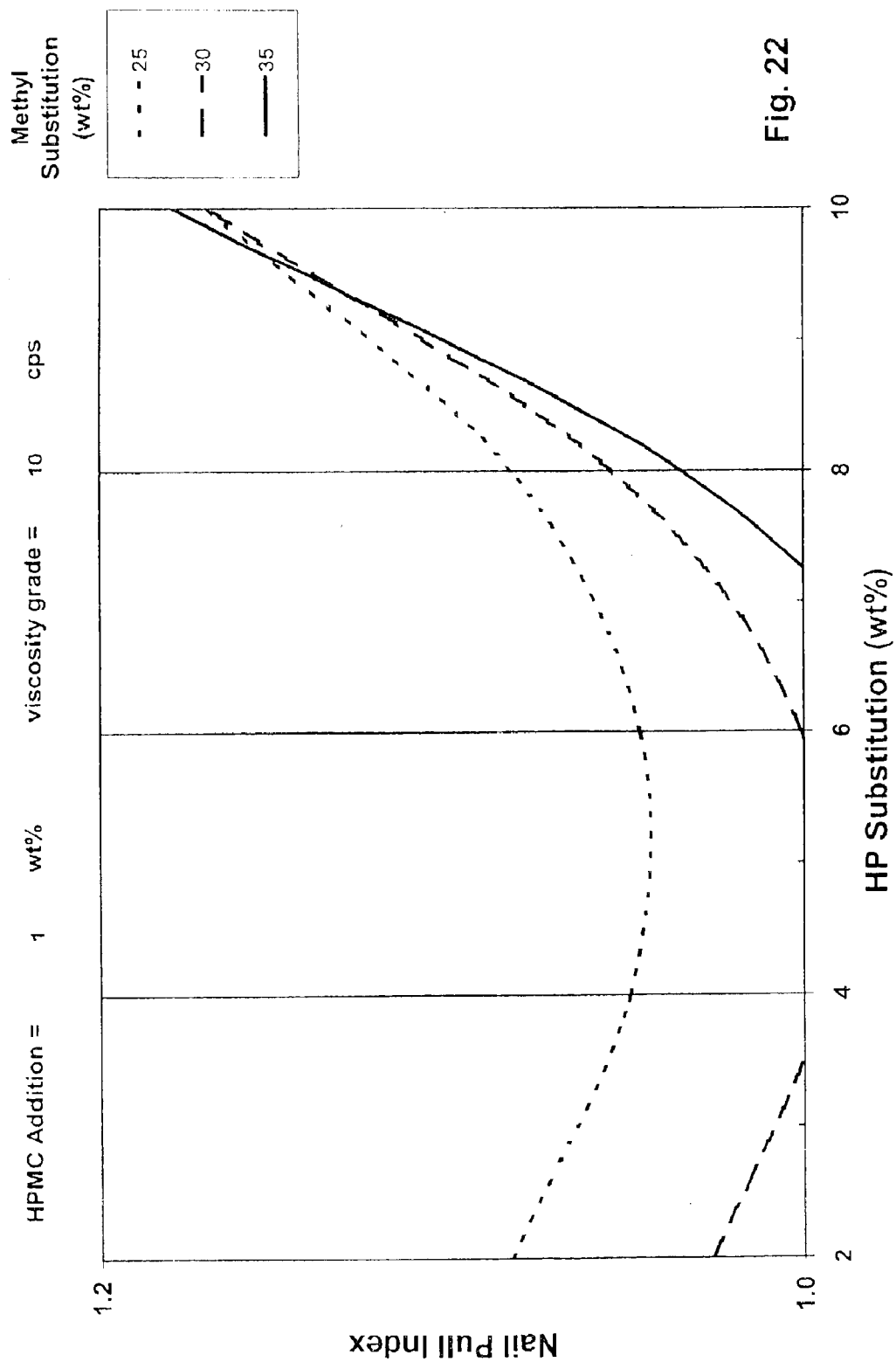

In FIG. 22, a HPMC with a viscosity grade of 10 cps has, preferably, a substitution of methyl groups less than 30 wt % (more preferably 25 wt %—a DS of 1.5). The preferred hydroxypropyl substitution is either no greater than 4 wt % or at least 6 wt %. However, a percent substitution of at least 6 wt % HP is more preferable than a substitution of no greater than 4 wt %.

Figure 23A:
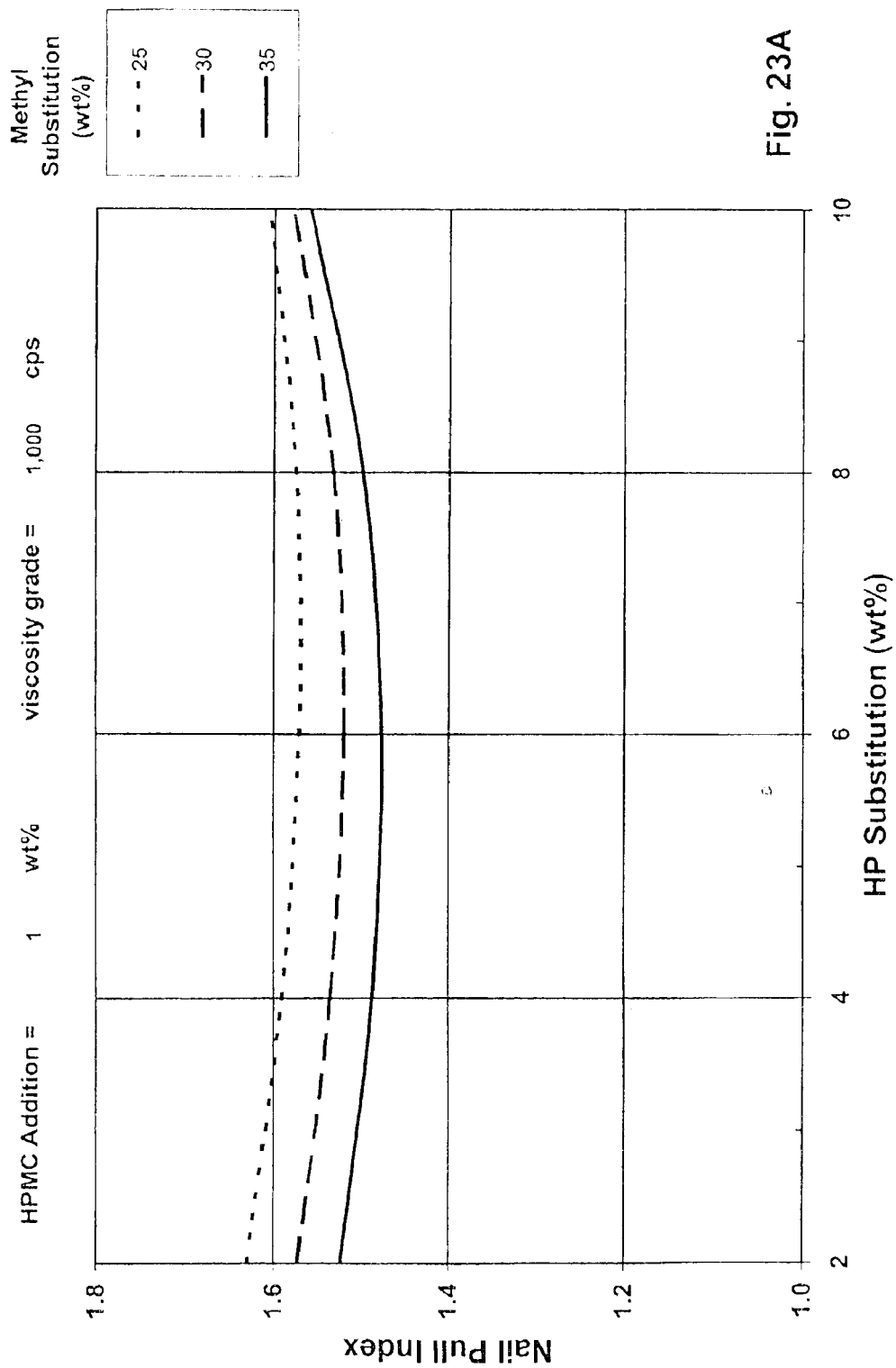

FIG. 23A shows the correlation for HPMC with a viscosity grade of 1,000 cps. In this case, the preferred percent substitution of methyl groups is the same as in FIGS. 21 and 22; however, the effect of the hydroxypropyl substitution is about the same for a HP substitution of 4 wt % or 8 wt %. The change with HP substitution is merely a fraction of the change with methyl substitution.

Figure 23B:
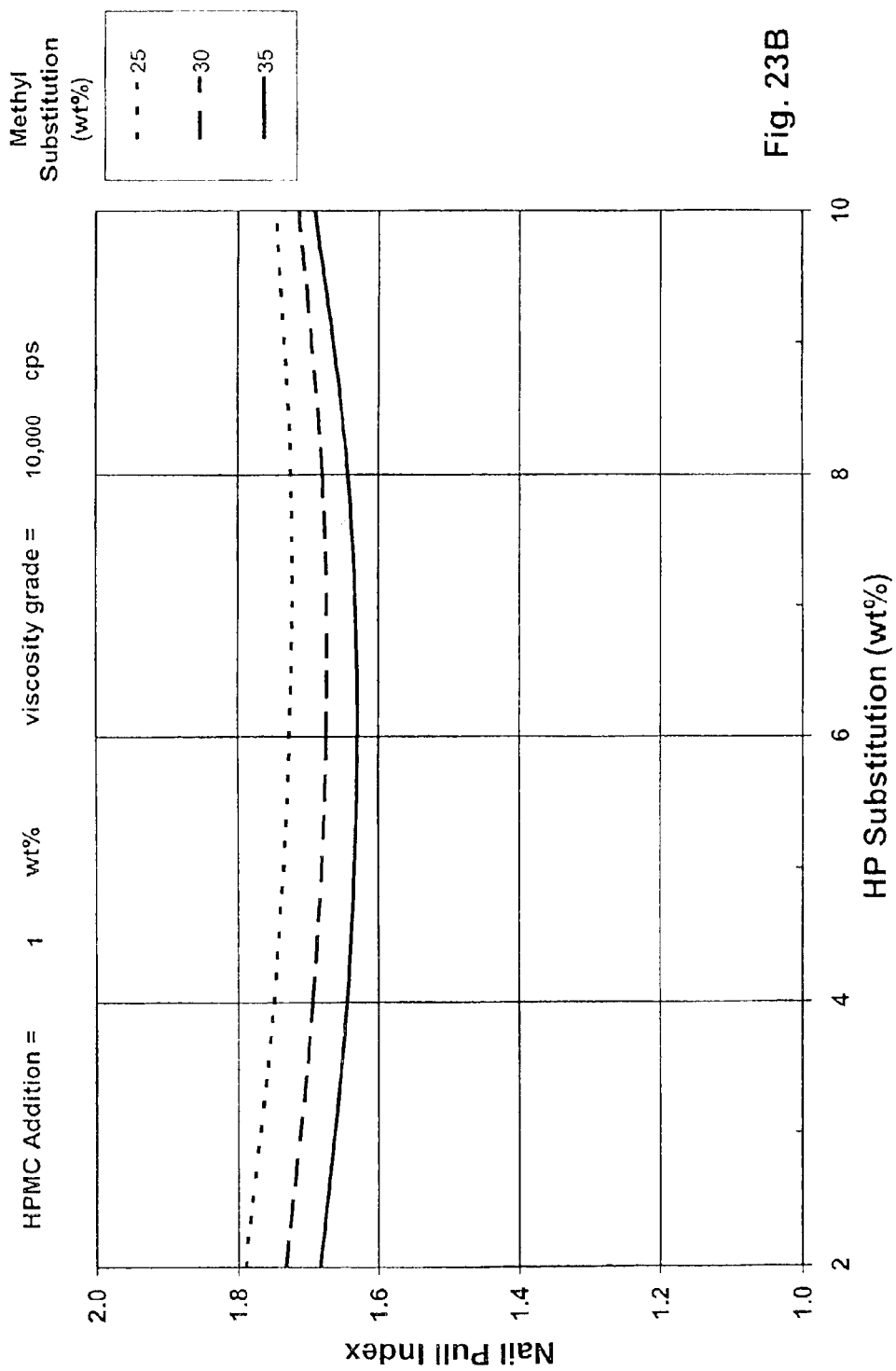
Figure 24A:
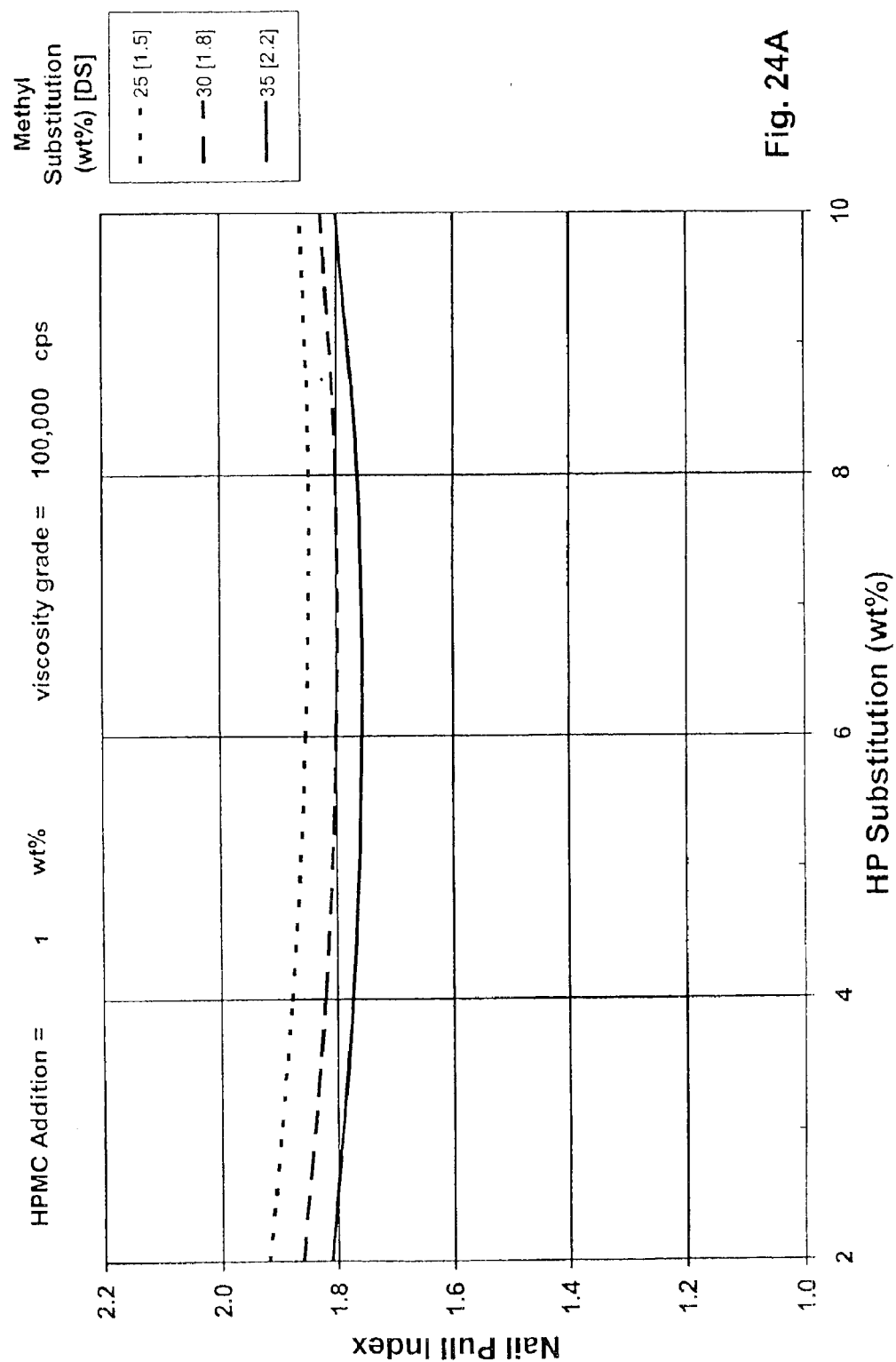
Figure 24B:
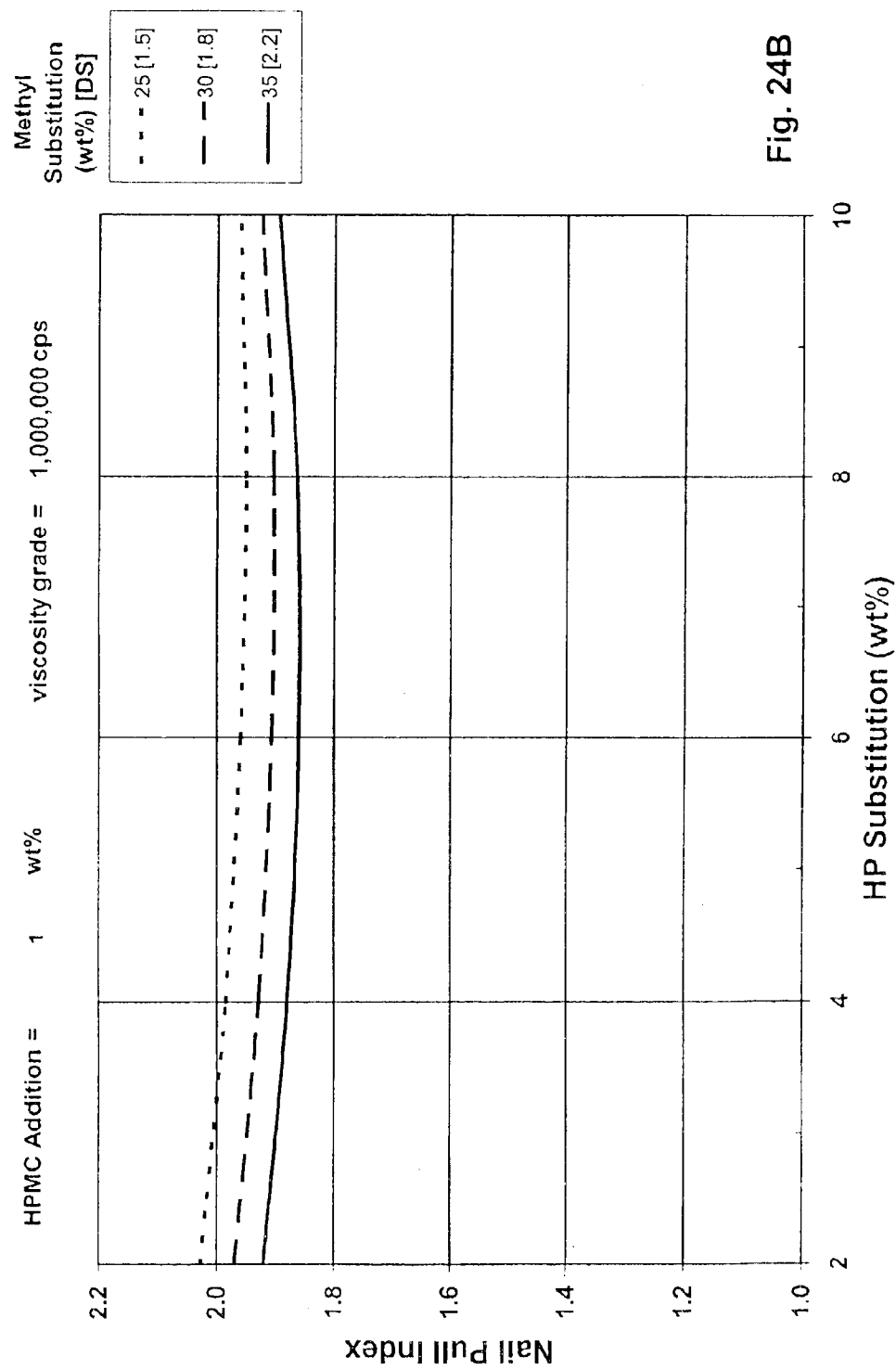

In FIG. 23B the correlation at a viscosity grade of 10,000 cps is shown. As for 1000 cps, the effect of methyl substitution is greater than the effect of HP substitution. This trend continues for viscosity grades of 100,000 and 1 million, as shown in FIGS. 24A–24B. Preferred embodiments have a low DS of methyl groups and an hydroxypropyl substitution either no greater than 4 wt % or at least 8 wt %. The nail pull index at these high viscosity grades is as great as double that of a gypsum-based structure prepared without addition of the cellulose ether.

FIGS. 25A–28F compare the effect of degree of substitution for additive additions of 0.25 wt %, 0.5 wt % and 2 wt %, respectively. With small HPMC additions, e.g. less than 1 wt %, and at low viscosity grade, e.g. less than 1000 cps, the effect of hydroxypropyl substitution is dramatic.

For example, at 0.25 wt % of HPMC and a viscosity grade of 10 cps, the nail pull index of a gypsum-based panel with addition of HPMC having an HP substitution of less than 6 wt % is less than one. This means that the nail pull resistance is less than that of a gypsum-based panel having no cellulose ether additive. However, a panel may be substantially strengthened (e.g. greater than 1.3) at a substitution of at least 8 wt % and a methyl substitution of at least 35 wt %. Surprisingly, the trend for the nail pull index with methyl substitution at low HPMC addition (e.g. 0.25 wt %) and high HP substitution (e.g. at least 8 wt %) is the opposite of the trend at high HPMC addition.

Figure 25A:
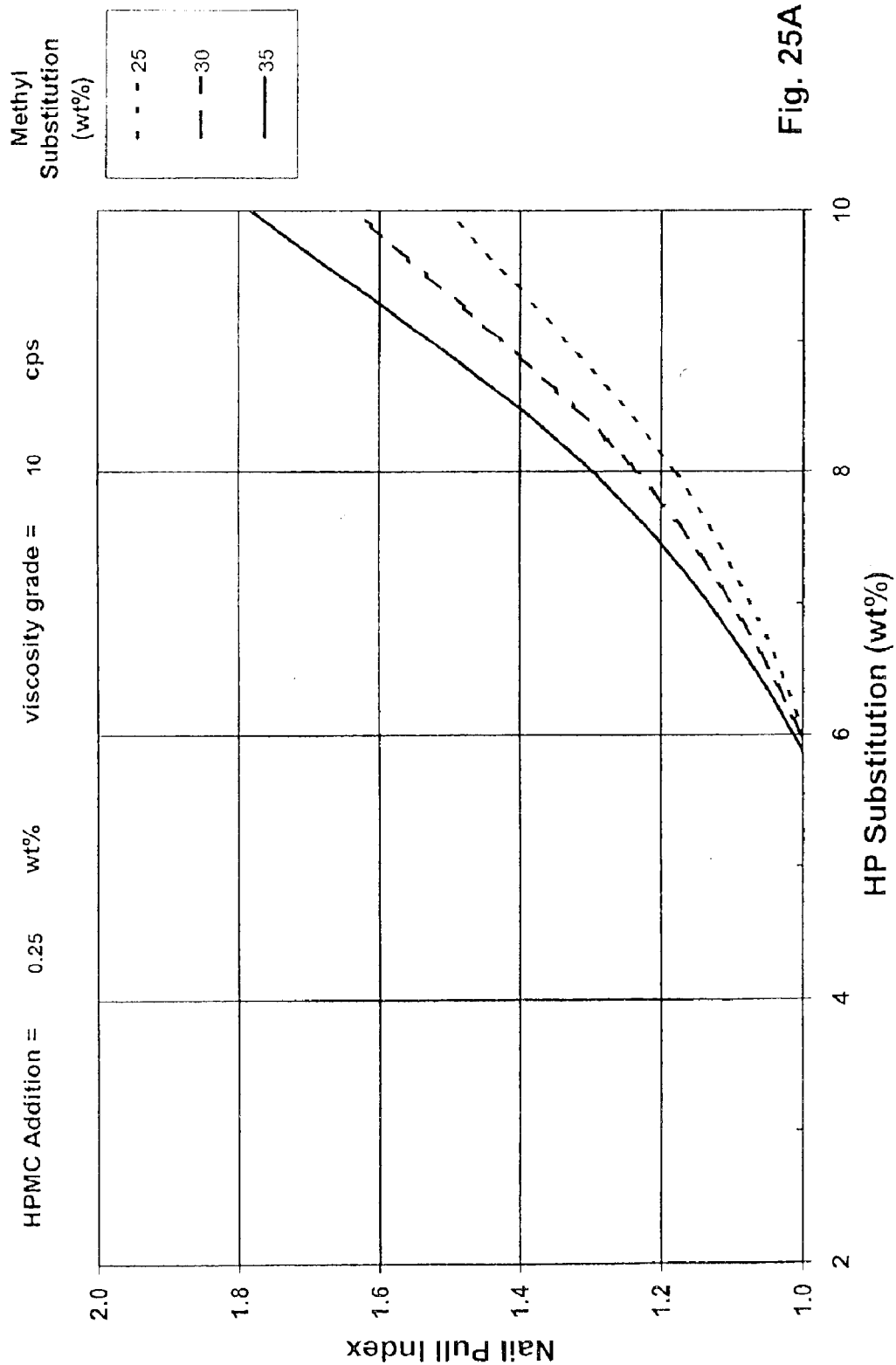
FIGS. 25A–27F show graphs of nail pull index versus percent hydroxypropyl (HP) substitution with varying levels of HPMC addition, viscosity grade, and percent substitution of methyl groups.
Figure 25B:
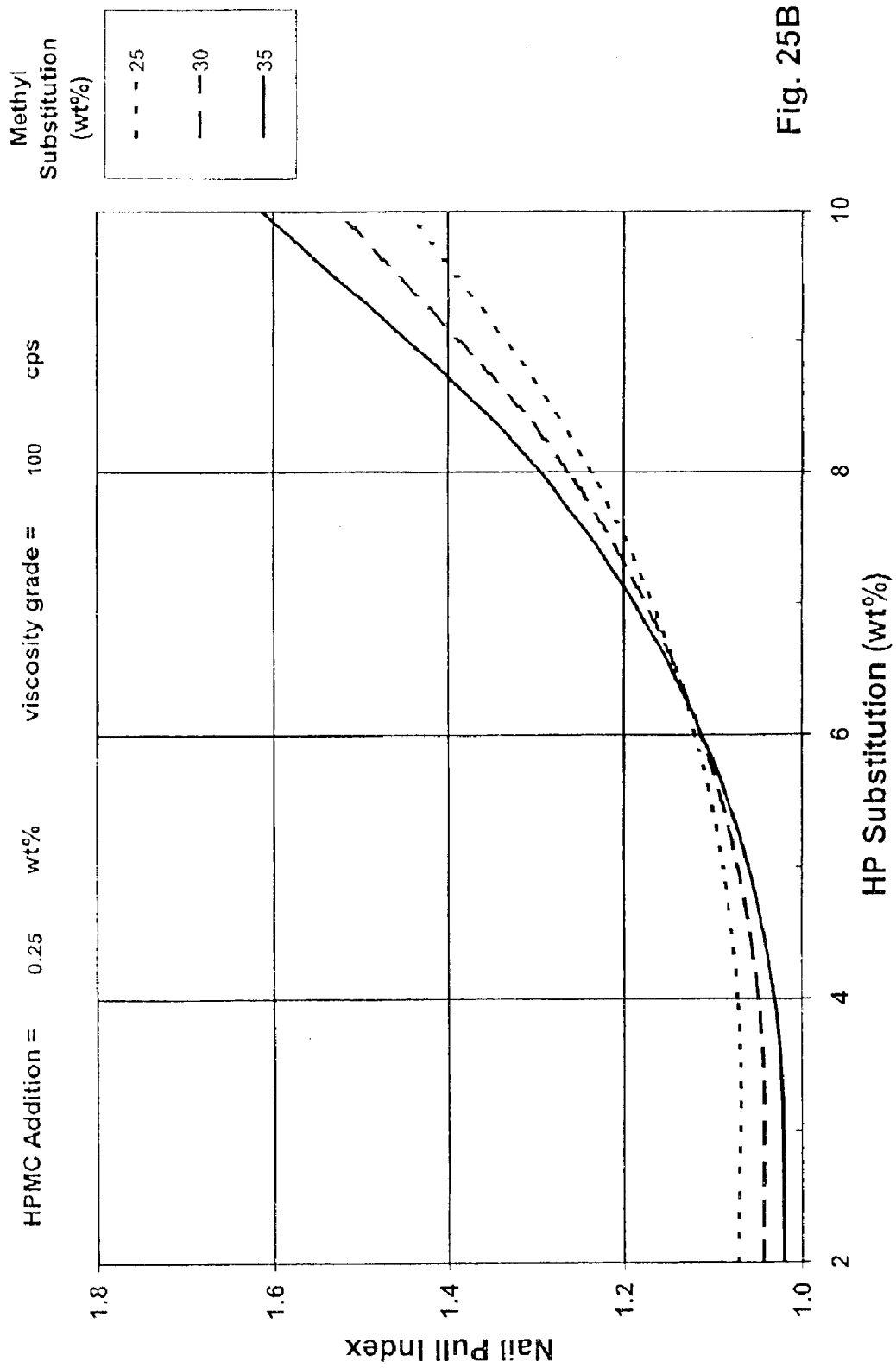
Figure 25C:
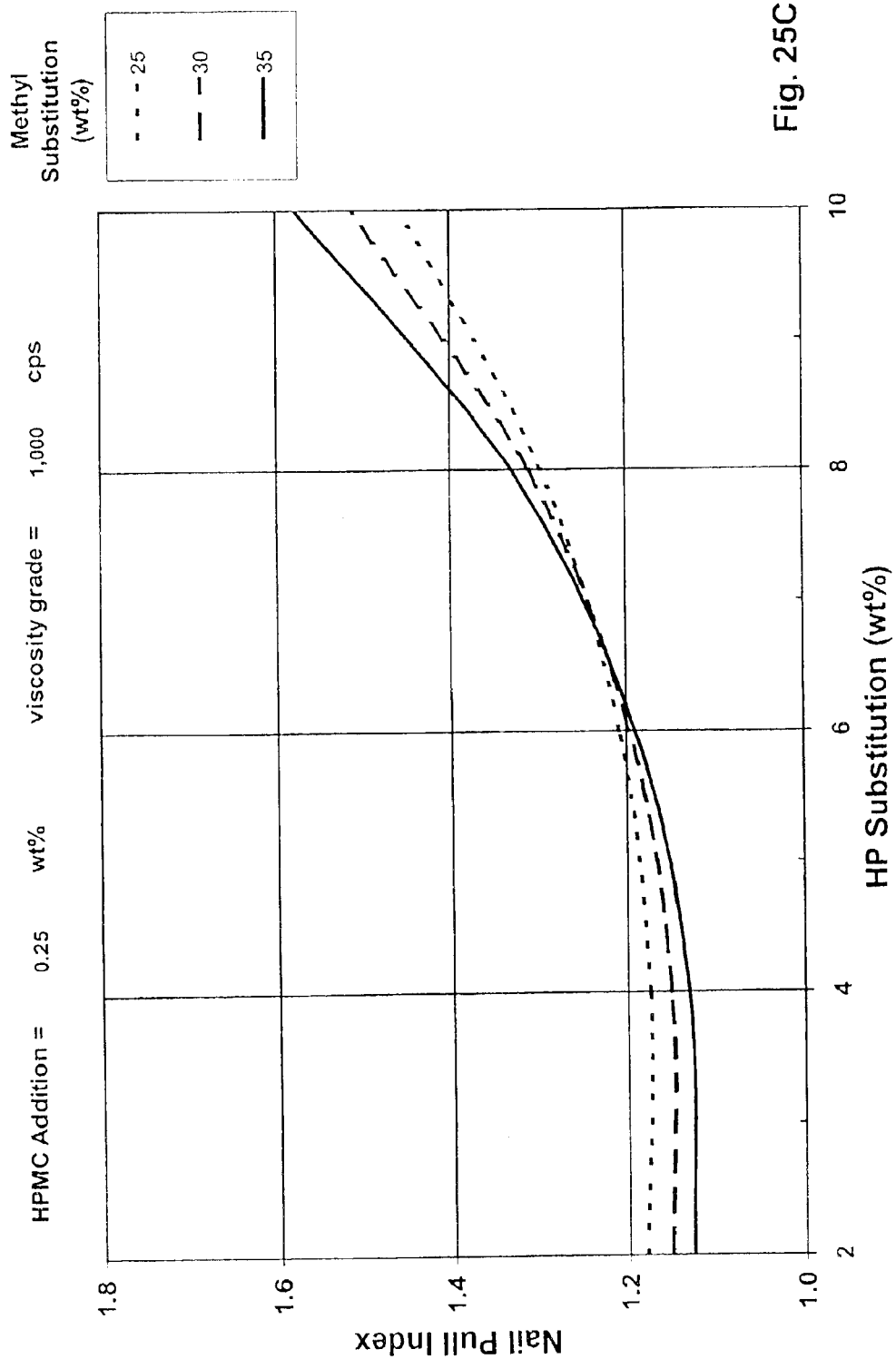
Figure 25E:
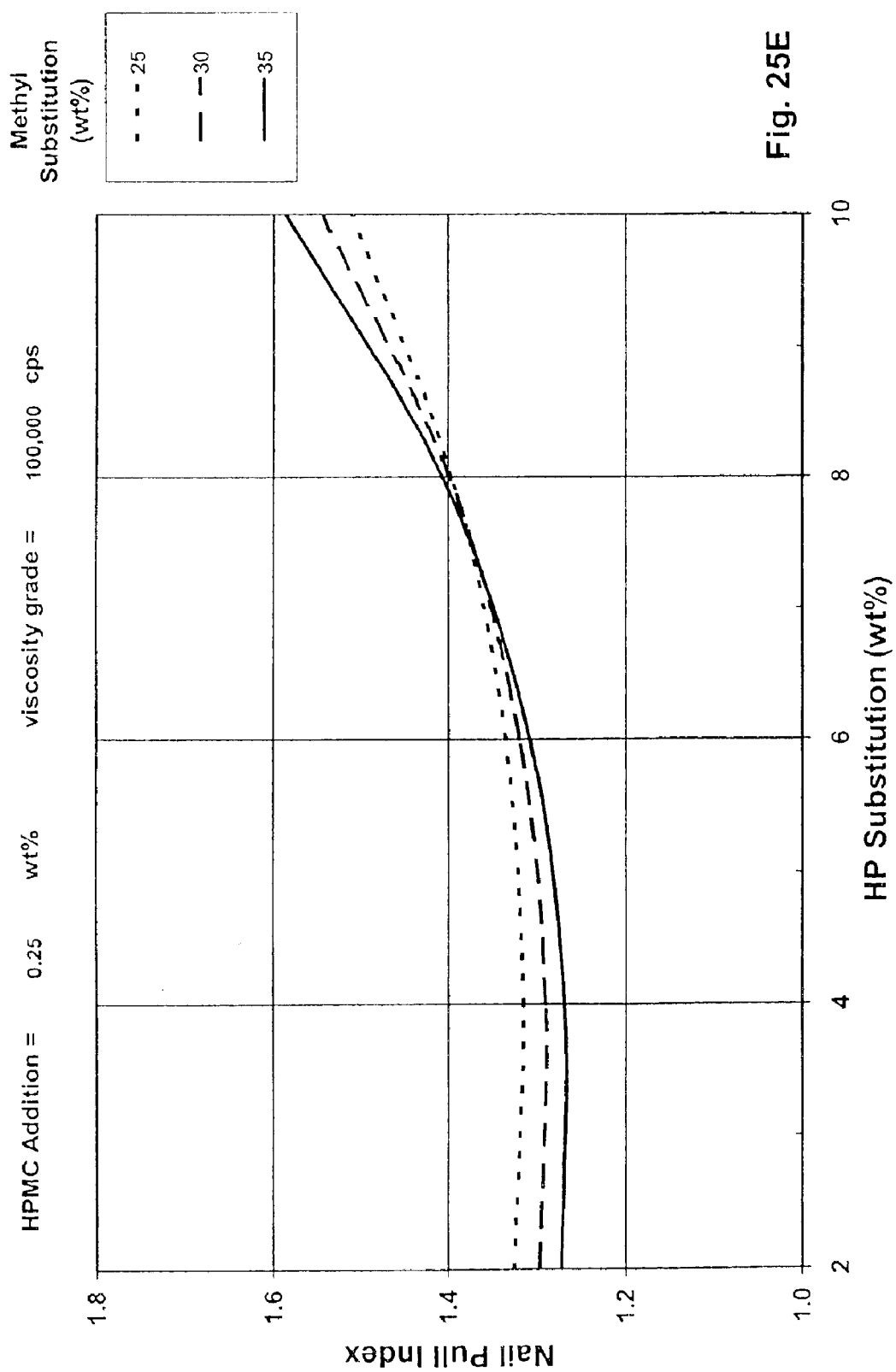
Figure 25F:
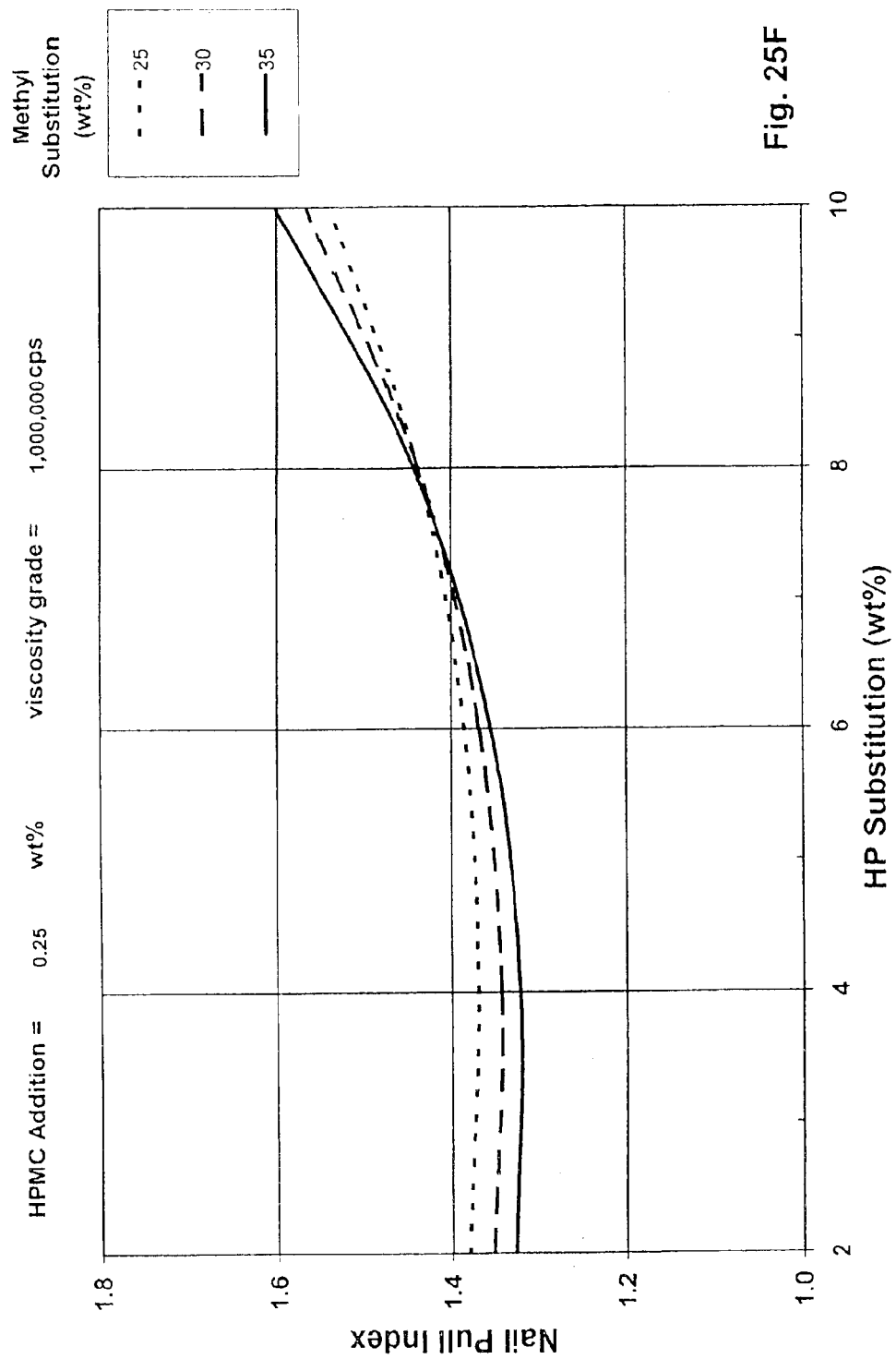
Figure 26A:
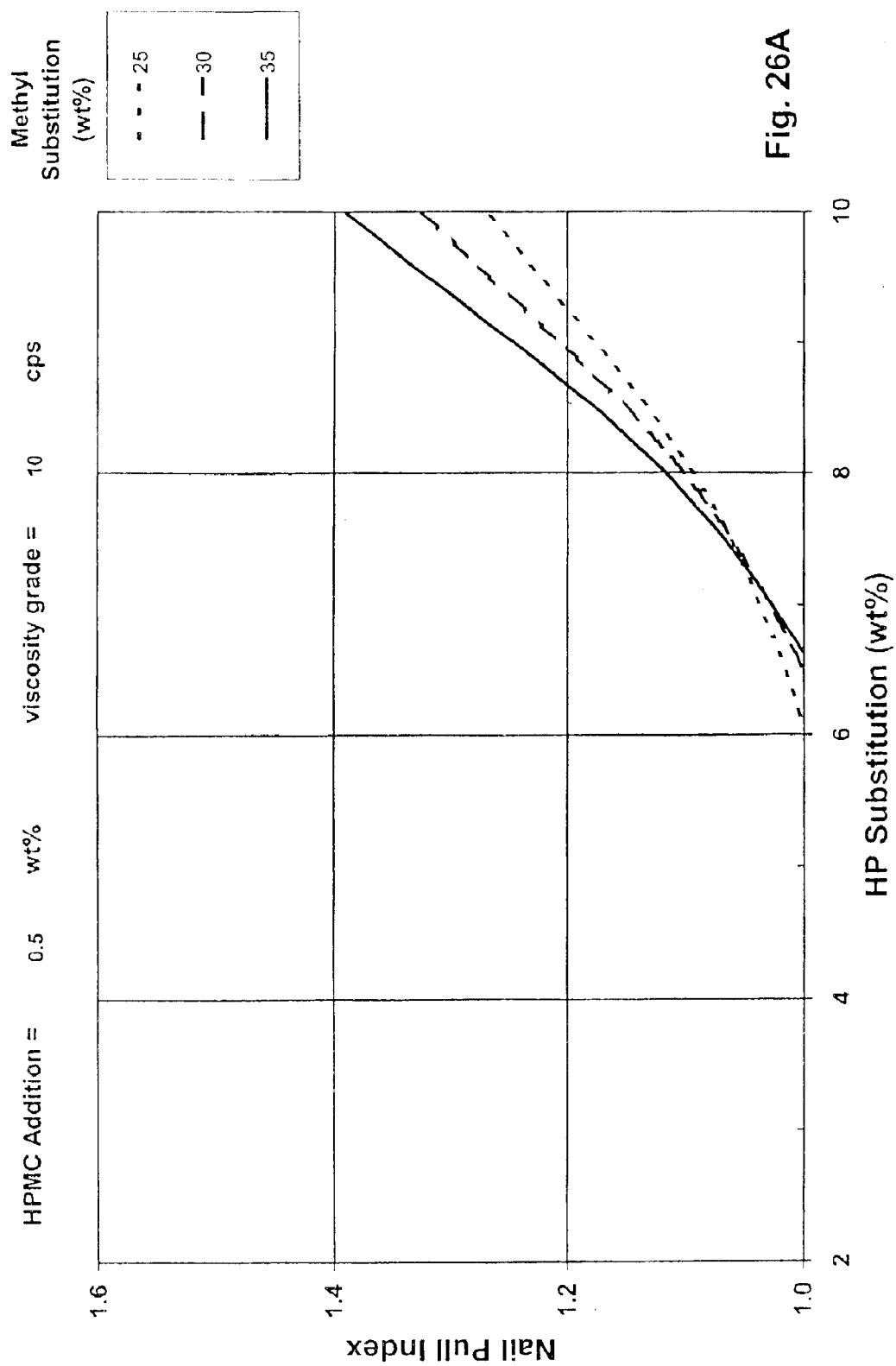
Figure 26B:
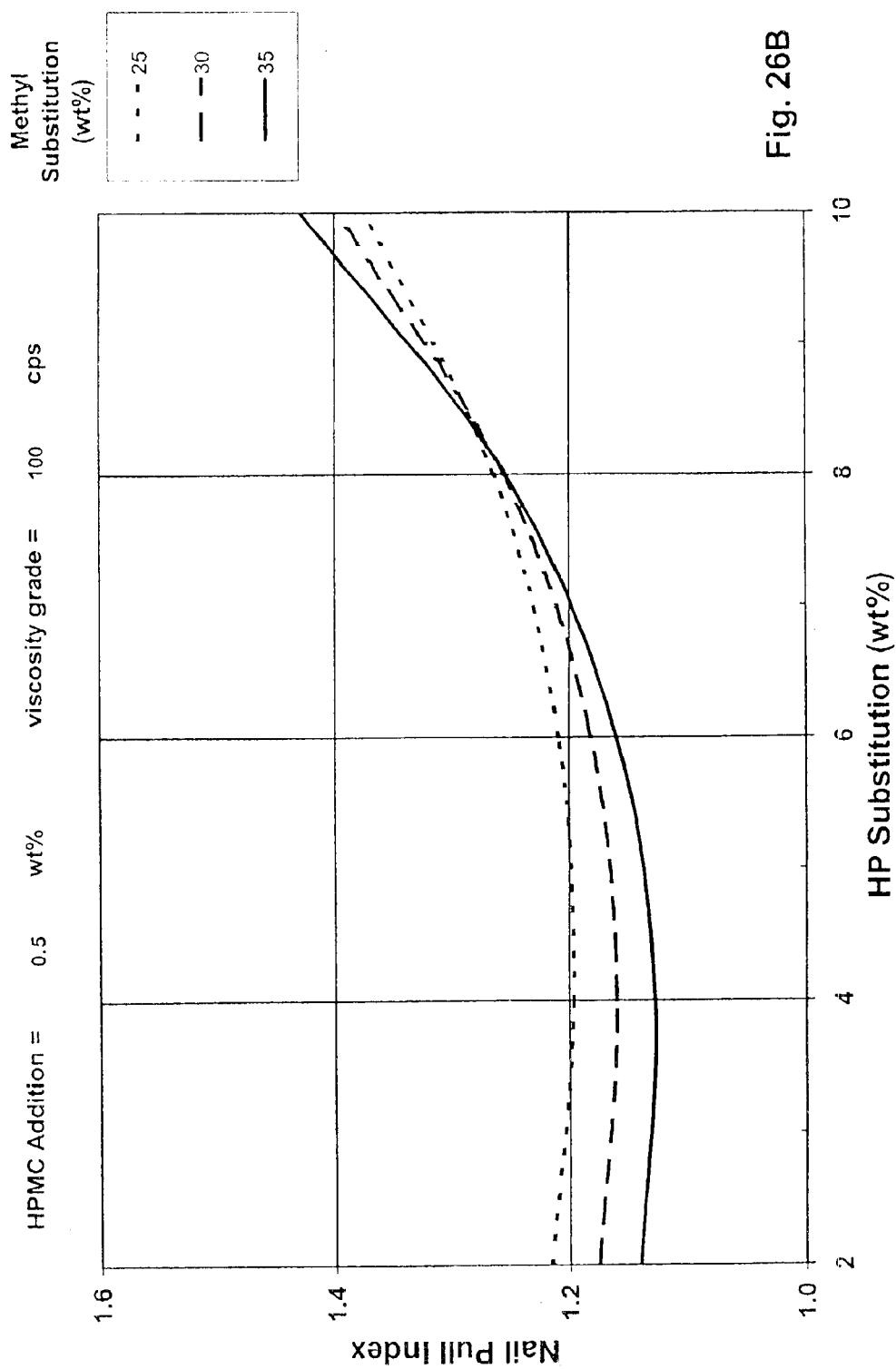
Figure 26C:
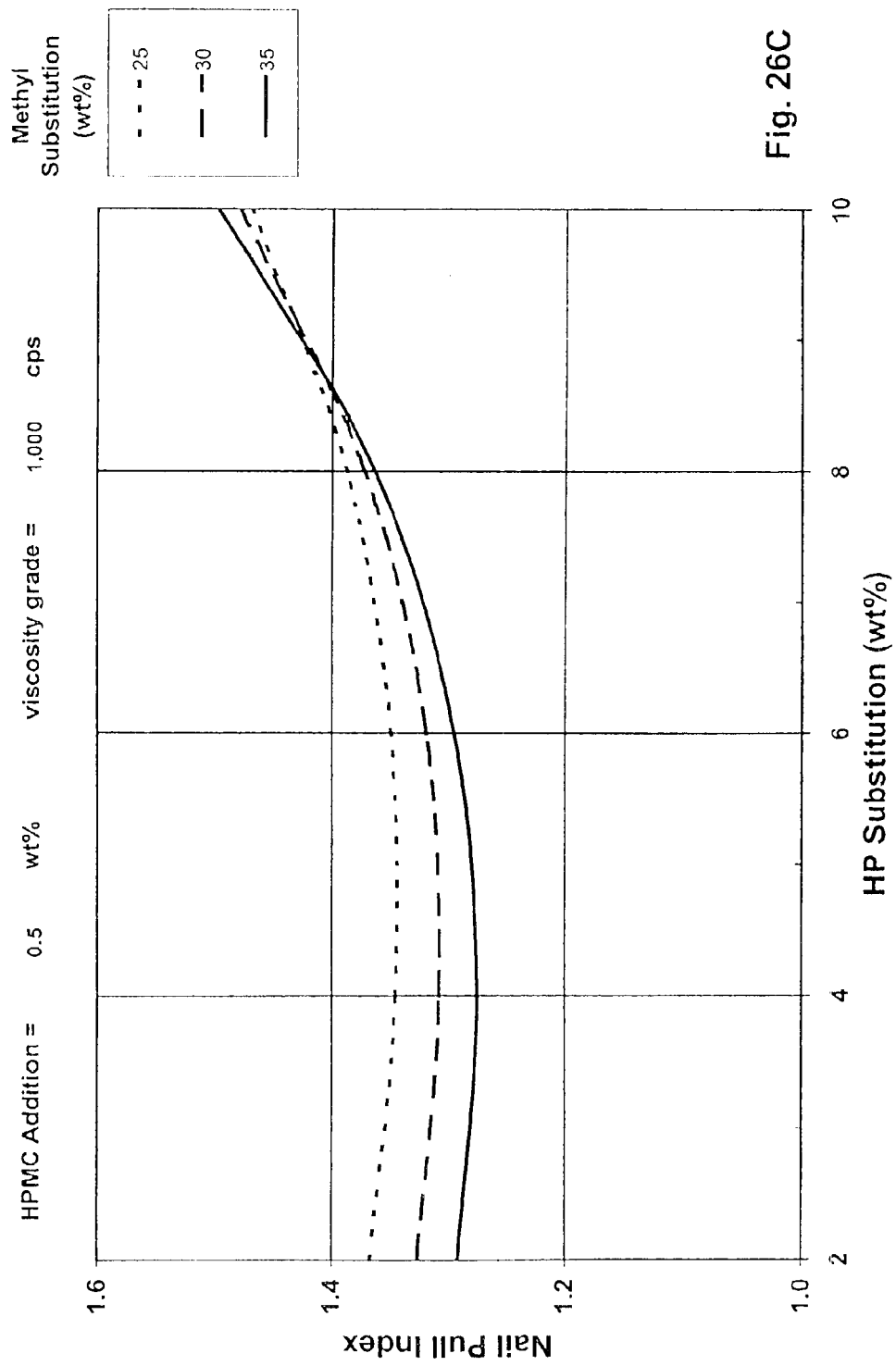
Figure 26D:
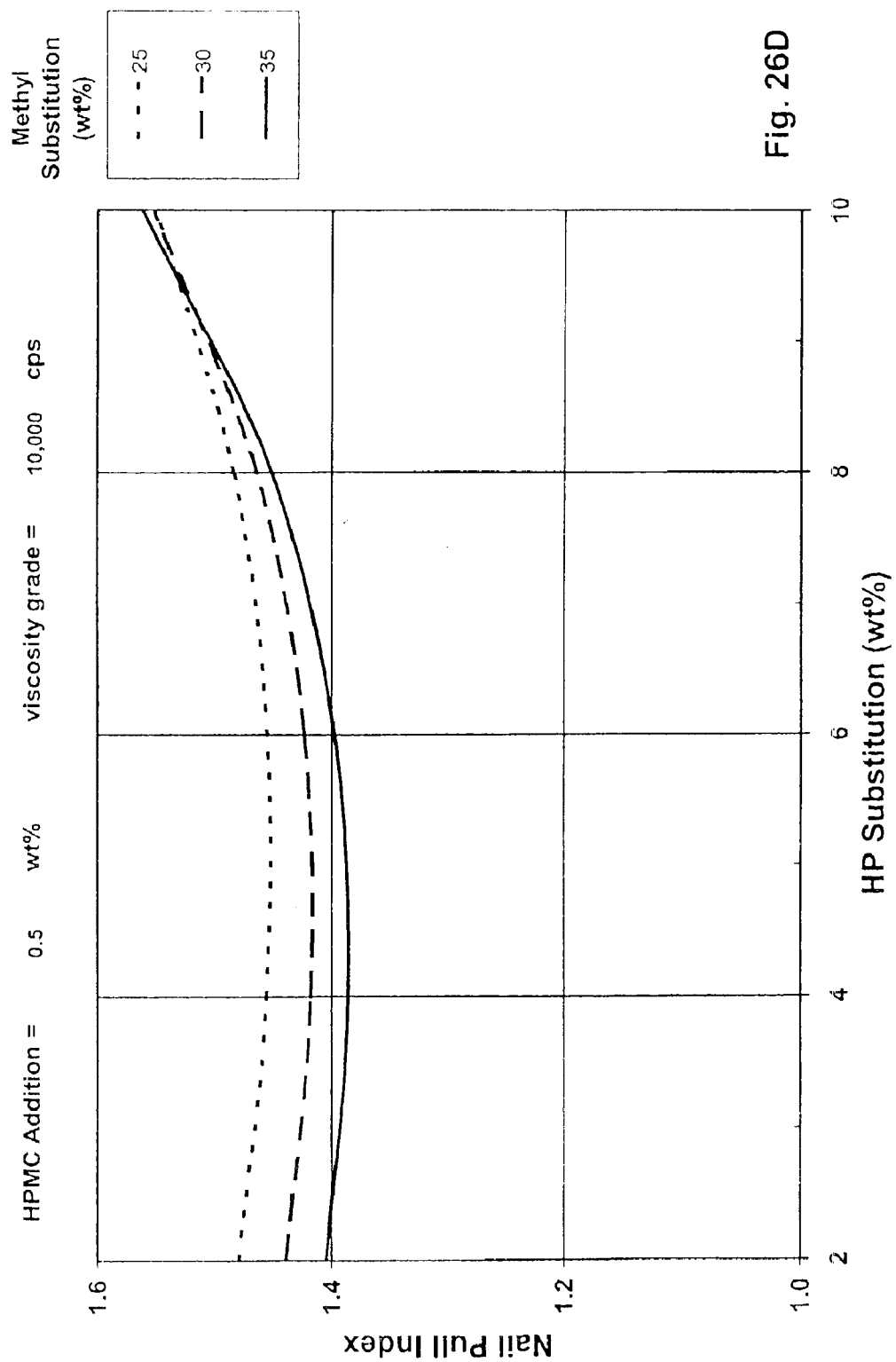
Figure 26E:
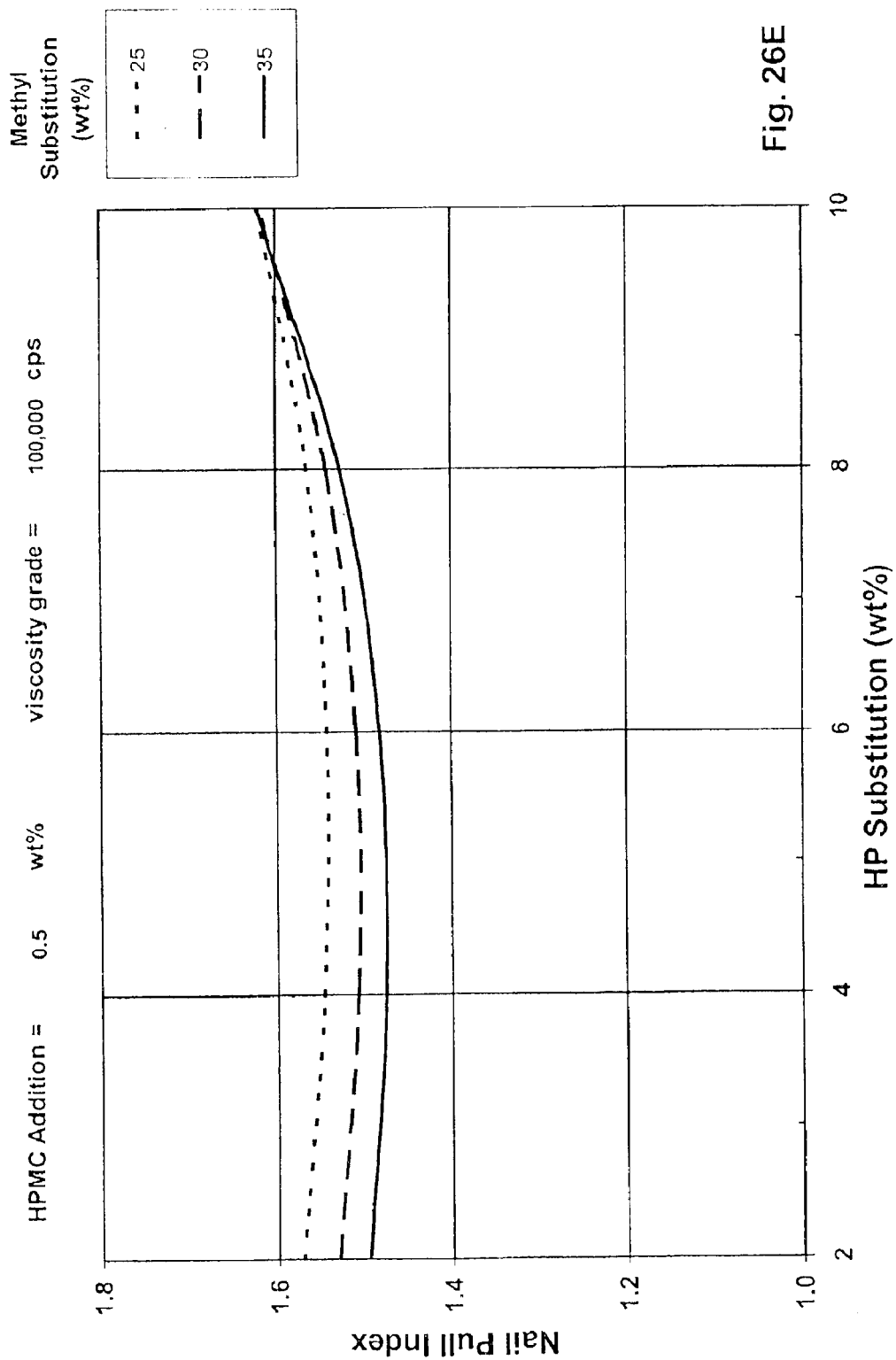
Figure 26F:
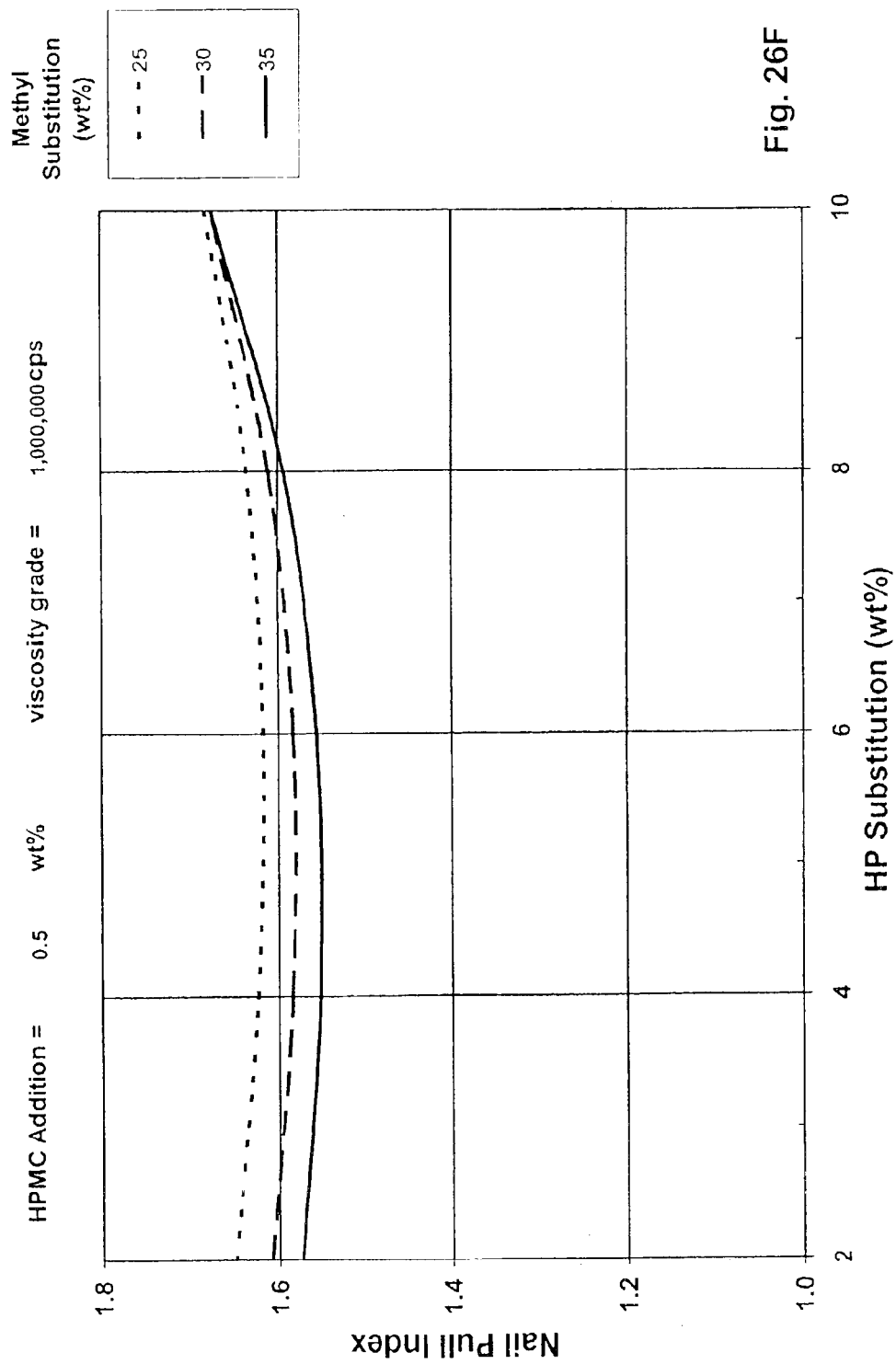
Figure 27A:
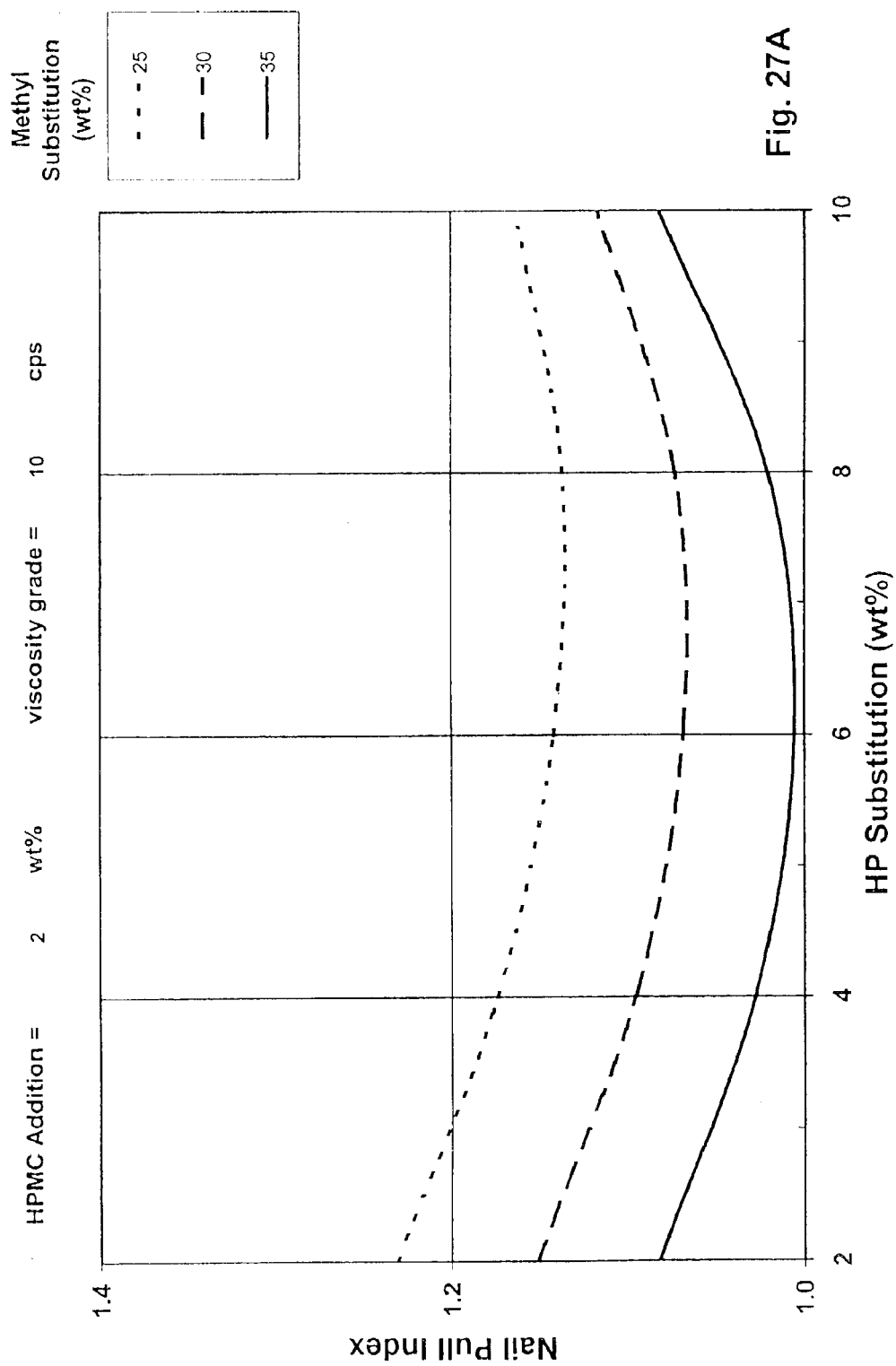
Figure 27B:
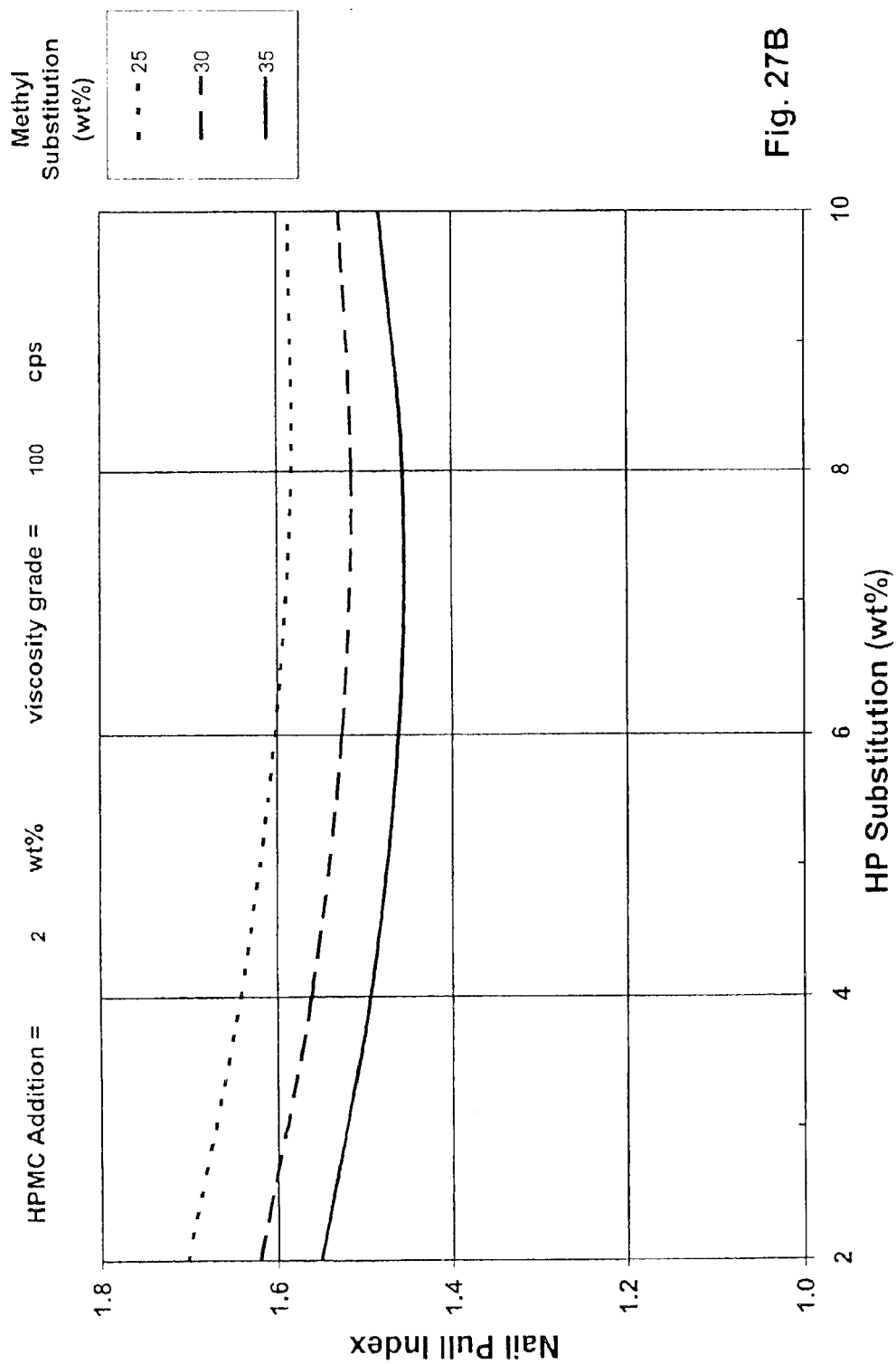
Figure 27C:
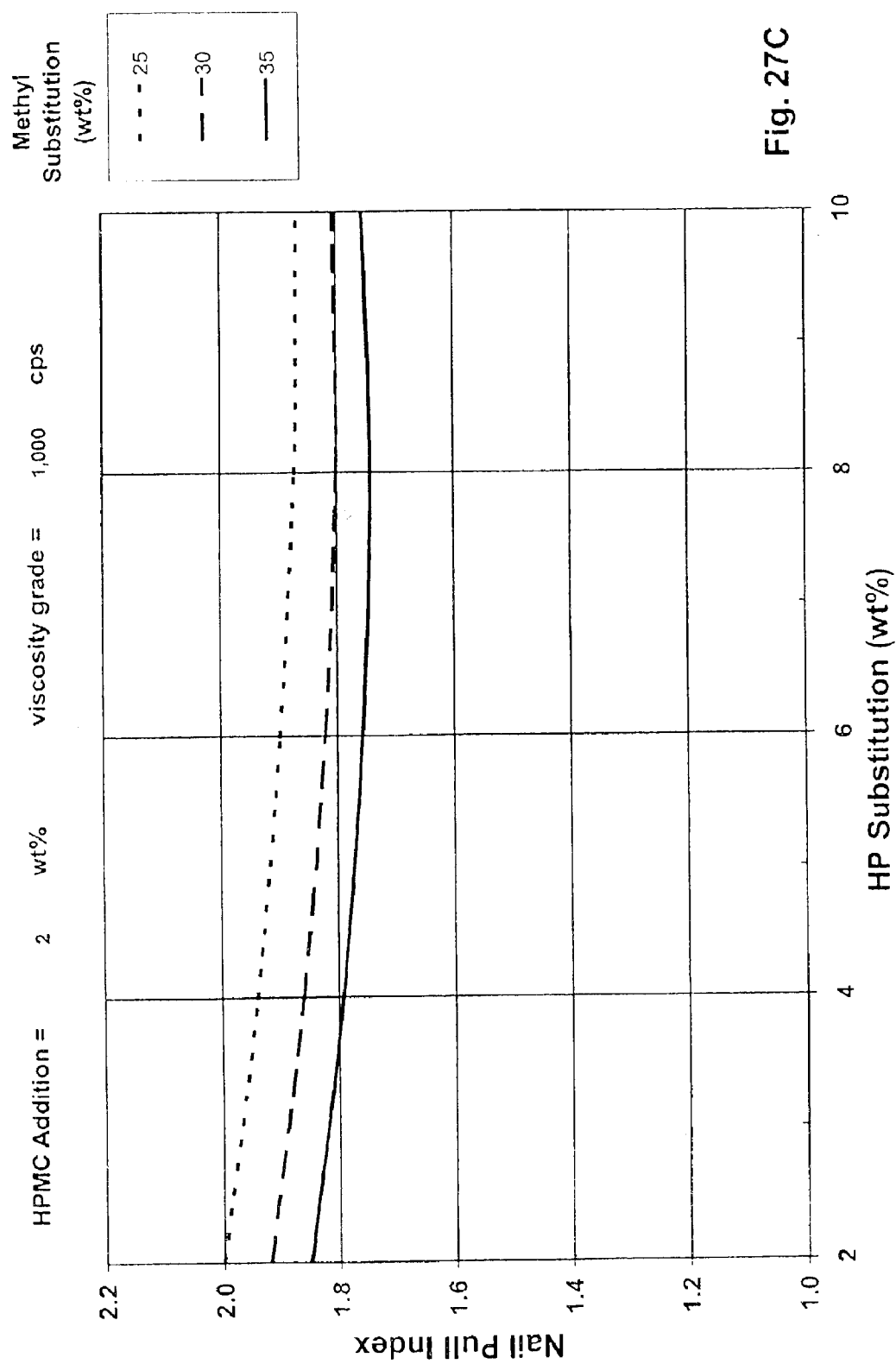
Figure 27D:
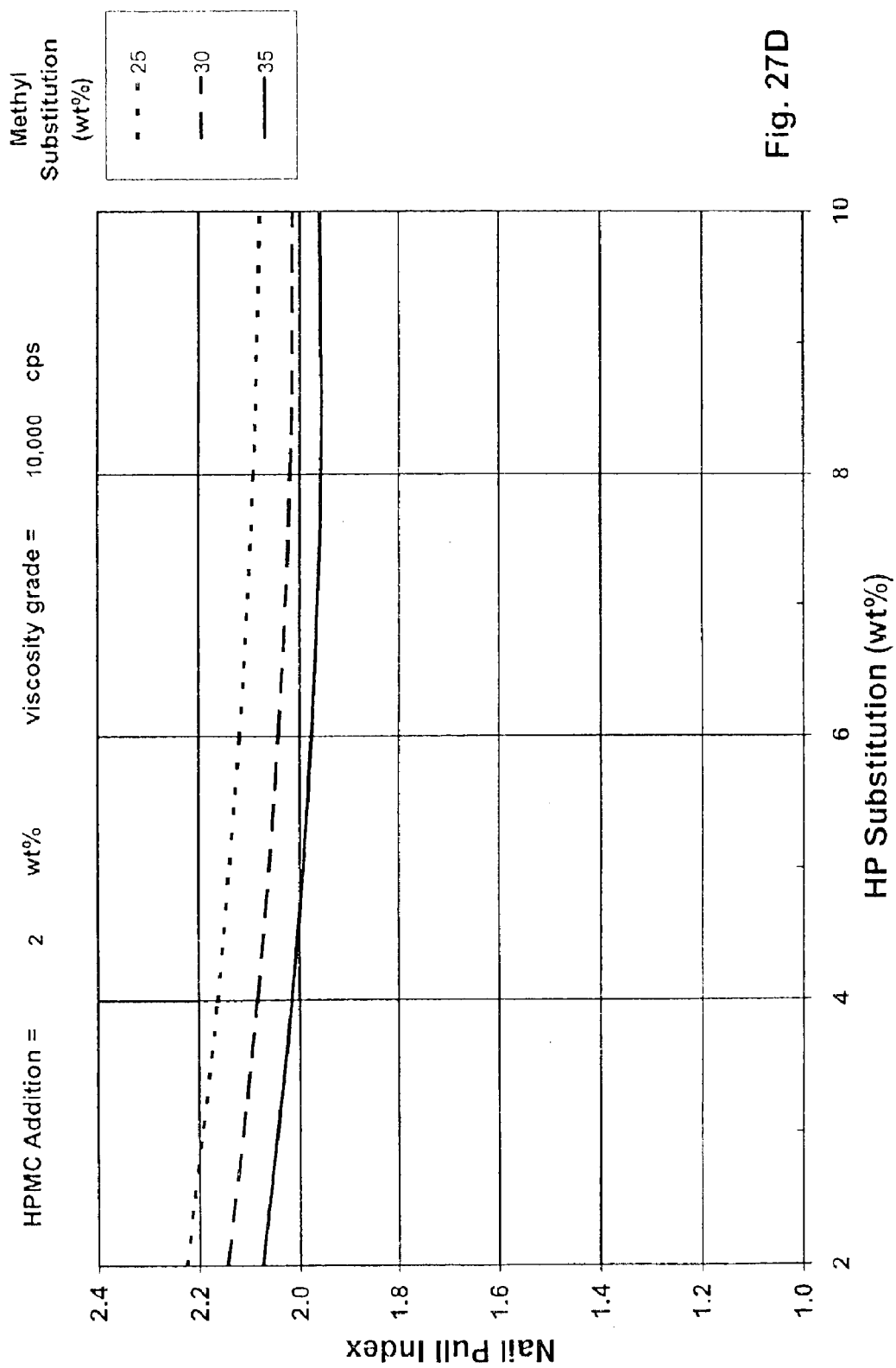
Figure 27E:
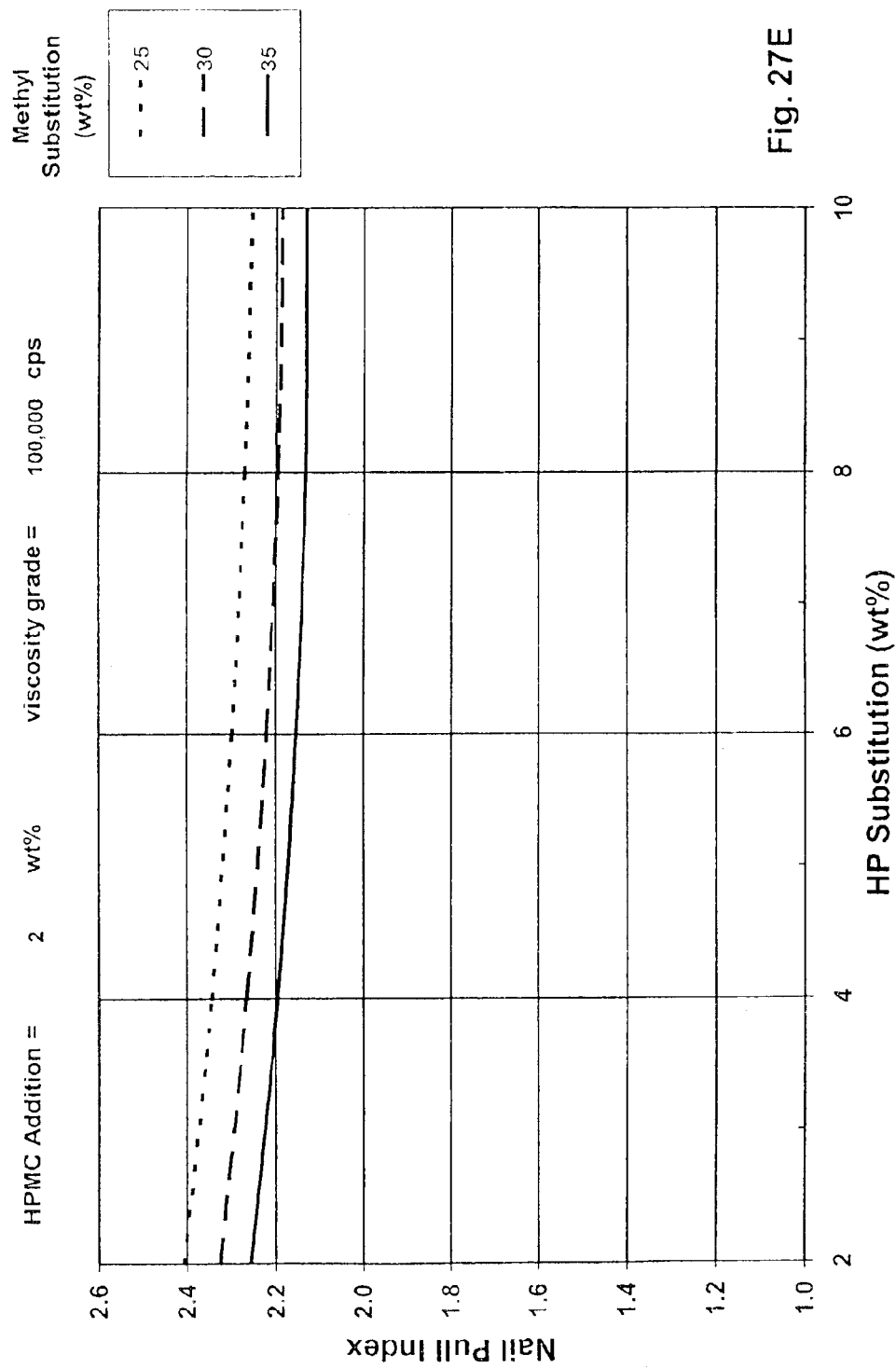
Figure 27F:
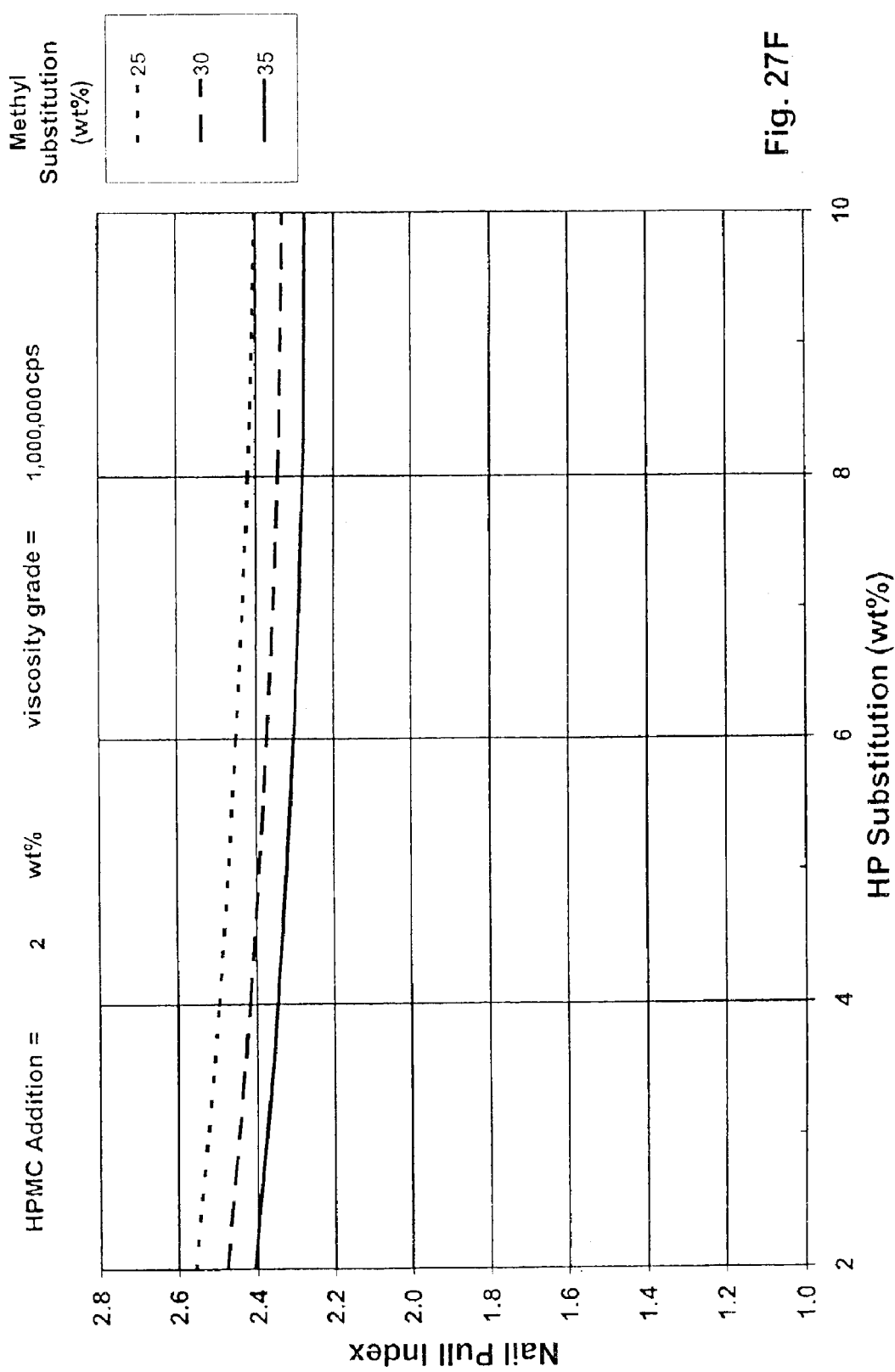

At a viscosity grade of 100 cps, as shown in FIG. 25B, the nail pull index is again substantially strengthened at an HP substitution of at least 8 wt %. However, some strengthening occurs even at HP substitution levels greater than 2 wt %. The point where the effects of methyl substitution DS reverses shifts to higher HP substitution levels. FIGS. 25C–25F show that the trend continues with increasing viscosity grade. Increasing viscosity grade both increases the nail pull index across the board and tends to reduce the slope of the nail pull index versus HP substitution curve. While HP substitution greater than 8 wt % continues to substantially increase the nail pull index compared to 2 wt %, the rate of increase at high viscosity grades (e.g. at least 1000 cps) is not as great as the rate of increase at lower viscosity grades (e.g. less than 1000 cps). Nevertheless, a nail pull index of about 1.6 in the correlation is predicted with an additional of only 0.25 wt % of HPMC to calcium sulfate hemihydrate if the correct values of methyl and hydroxypropyl substitution are selected for the HPMC additive.

As shown in FIGS. 26A–27F, as the amount of HPMC addition is increased further, the nail pull index is generally increased; however, the slope of the nail pull index versus HP substitution curves tend to be reduced. In FIGS. 27A–27F, with an HPMC addition of 2 wt %, HP substitution of no greater than 4 wt % is more preferable than HP substitution of at least 8 wt %. Further increases in the amount of HPMC addition greater than 2 wt % tends to further increase the slope of the portion of nail pull index curve for HP substitution no greater than 6 wt %. This means that the rate of increase in NPI with a reduction in HP substitution is even greater as the amount of HPMC approaches 5 wt %.

At amounts of HPMC of at least 2 wt %, a nail pull index of greater than 2.0 is achieved by selecting a low HP substitution (e.g. no greater than 6 wt %), a low methyl substitution (e.g. no greater than 1.8), and/or a high viscosity grade (e.g. at least 1000 cps). As viscosity grade increases, the comparative effect of changing the amount of HP substitution tends to decrease, but some additional strengthening is imparted to the structure at low HP substitution.

Results for HEMC are also analyzed to select preferred ranges for the degree of substitution of methyl and hydroxyethyl groups. From these results, it is clear that preferred ranges will emerge as a wider selection of HEMC materials is fabricated for testing, having preferred methyl and hydroxyethyl substitutions. The same procedure is used for selecting HEMC for use as a reinforcing additive as was used for HPMC. Prepare samples of HEMC having a range of substitution levels, viscosity grades, and amount of HEMC addition to calcium sulfate hemihydrate. Determine, by testing, an important strength parameter, such as the nail pull index, and calculate a correlation for selecting an HEMC that meets or exceeds the improvement needed for commercial success of the additive.

Initial results with HEMC show a behavior similar to HPMC. The degree of substitution of the methyl group may be selected to substantially increase strength of the composite structure. The hydroxyethyl substitutional groups tend to improve the nail pull index at either low or high percent substitution, depending on concentration and viscosity grade. Thus, the molecular substitution of hydroxyethyl groups in HEMC shows a pattern consistent with the effect disclosed for the hydroxypropyl groups of HPMC.

At low viscosity grade, e.g. less than 100 cps, the effect of substitution on the measured index of nail pull and flexural strength is dramatic. The amount of methyl substitution and/or hydroxypropyl or hydroxyethyl substitution is sufficient to change the nail pull index from a decrease to a substantial increase, as shown in FIGS. 19, 20 and 25A. Commercially available methyl cellulose typically have a DS of at least 1.8 (30 wt %). High viscosity grades were avoided, because a high viscosity grade makes mixing and forming more difficult. It is not surprising that cellulose ethers have been overlooked as an additive for strengthening gypsum-based structures. Indeed, the most promising cellulose ethers, for example MC with a DS in the range from 1.2 to 1.6, HPMC and HEMC have not been readily available for testing from commercial suppliers at substitutional levels optimized for substantially strengthening gypsum-based composite structures. As can be seen in Table 1, commercially available HPMC and MC have levels of HP and methyl substitution that do not optimize the nail pull index and flexural strength of gypsum-based composite structures.

In one embodiment, dry β-calcium sulfate hemihydrate powder and powdered HPMC are mixed together, dispersing the powdered HPMC additive throughout the β-calcium sulfate hemihydrate powder. The dry ingredients are then added to water, including an excess of water beyond that required to hydrate the β-calcium sulfate hemihydrate stoichiometrically, forming a slurry by stirring of the powder/water mixture. For example, the amount of water used is selected such that the finished wallboard has a density less than 0.85 g/cc, preferably less than 0.75 g/cc for lightweight structures. Then, the slurry is formed into a shape, for example, by pouring into a mold or extruding through a die or a form or a series of dies and forms. In one alternative, the extruded slurry is then fed onto a belt as a continuous sheet. The slurry is allowed to harden, which is also referred to as setting. Setting is a result of the calcium sulfate hemihydrate at least partially dissolving and hydrating, forming calcium sulfate dihydrate crystals, referred to herein as gypsum crystals.

Then, the setting gypsum-based composite structure is dried. Air drying or drying in a furnace evaporates the excess water that has not reacted during hydration. For example, forced connection of dry air over the surface of composite is used to remove most, if not all, of the excess water.

Tests include measuring the nail pull resistance, flexural strength, humidified deflection, mold resistance, and inflammability, using ASTM standard test procedures, for example. Mold resistance is defined as showing no signs of mold growth on a wallboard or wallboard core surface after 24 days of exposure to mold spores within an environment maintained at 90% humidity and a temperature of 32° C.

Figure 2:
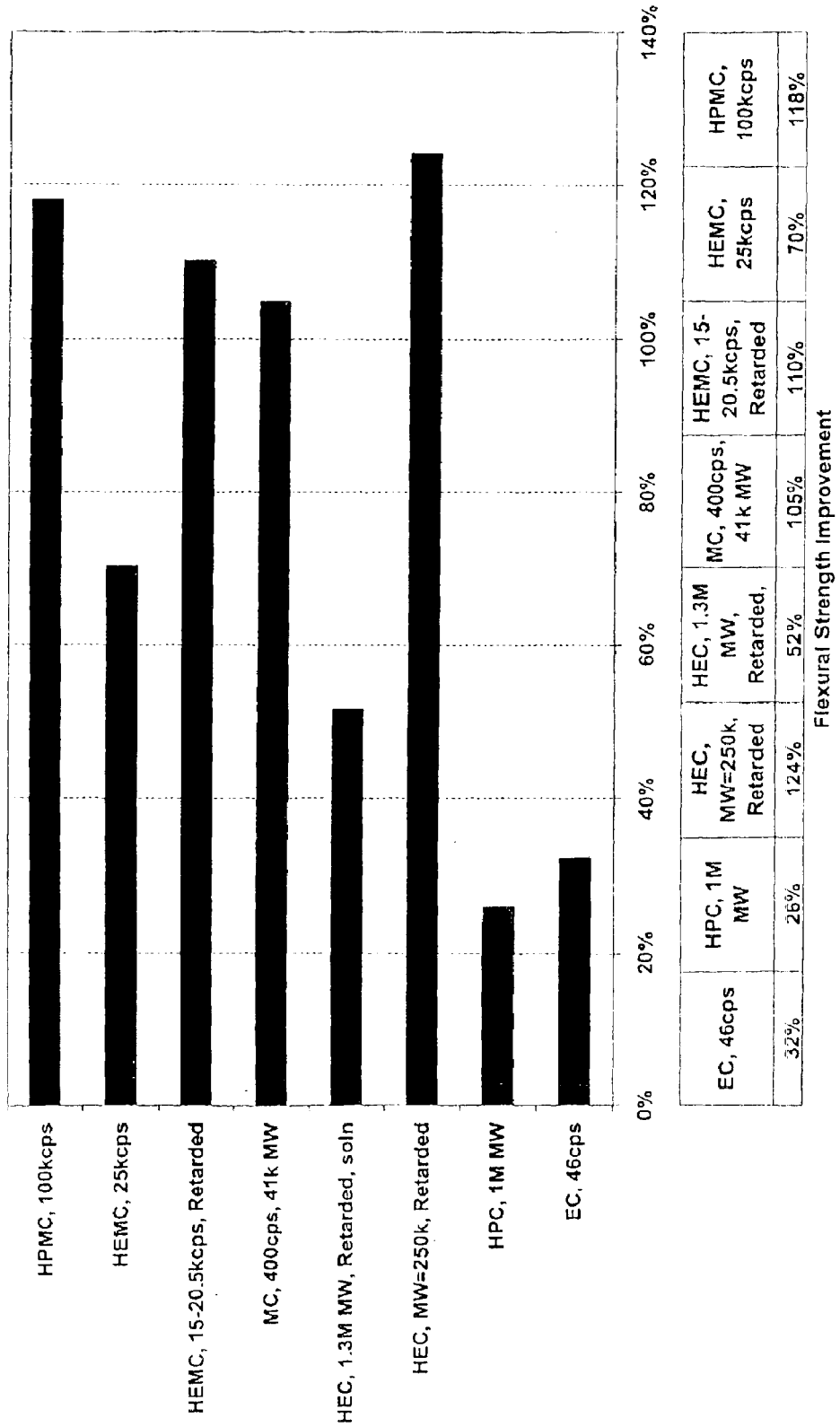
FIG. 2 shows the improvement in flexural strength of the same embodiments as shown in FIG. 1.
Figure 3:
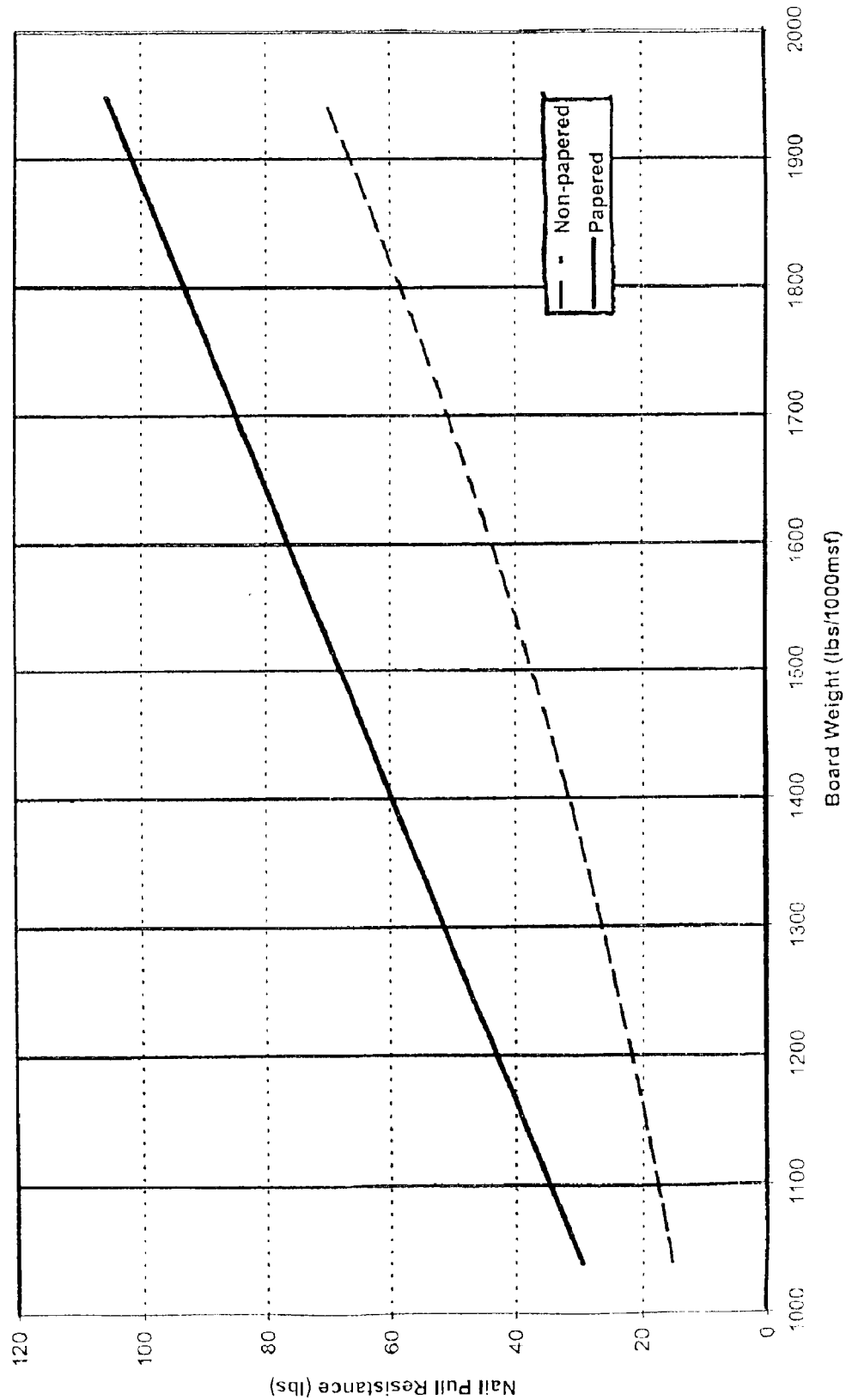
FIG. 3 shows the nail pull resistance versus board weight of wallboard specimens prepared without a cellulose ether based reinforcing additive.
Figure 4:
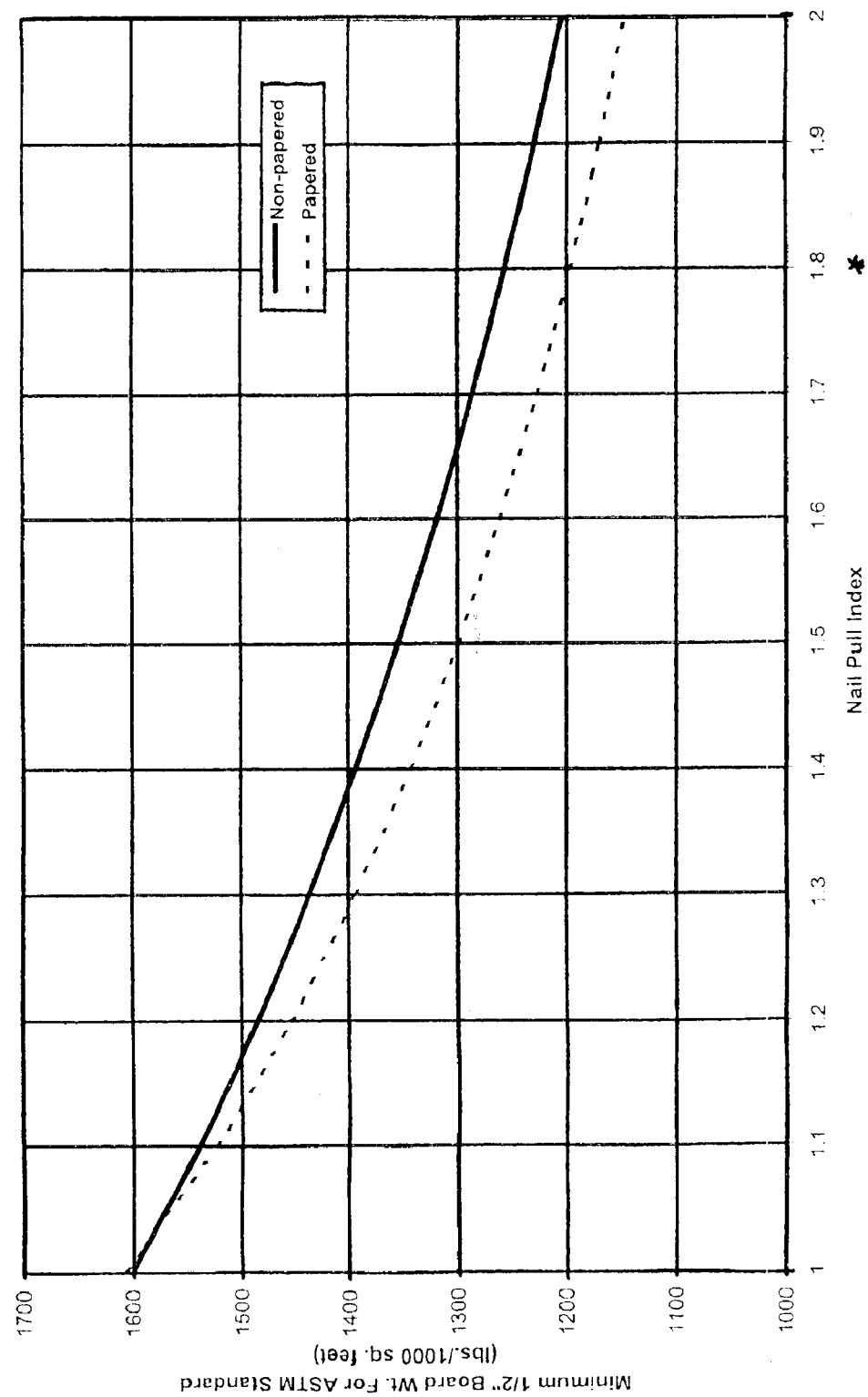
FIG. 4 shows a minimum board weight to satisfy ASTM Standard C473-95 for a ½ inch thick wallboard versus nail pull index for papered and non-papered wallboard.
Figure 7:
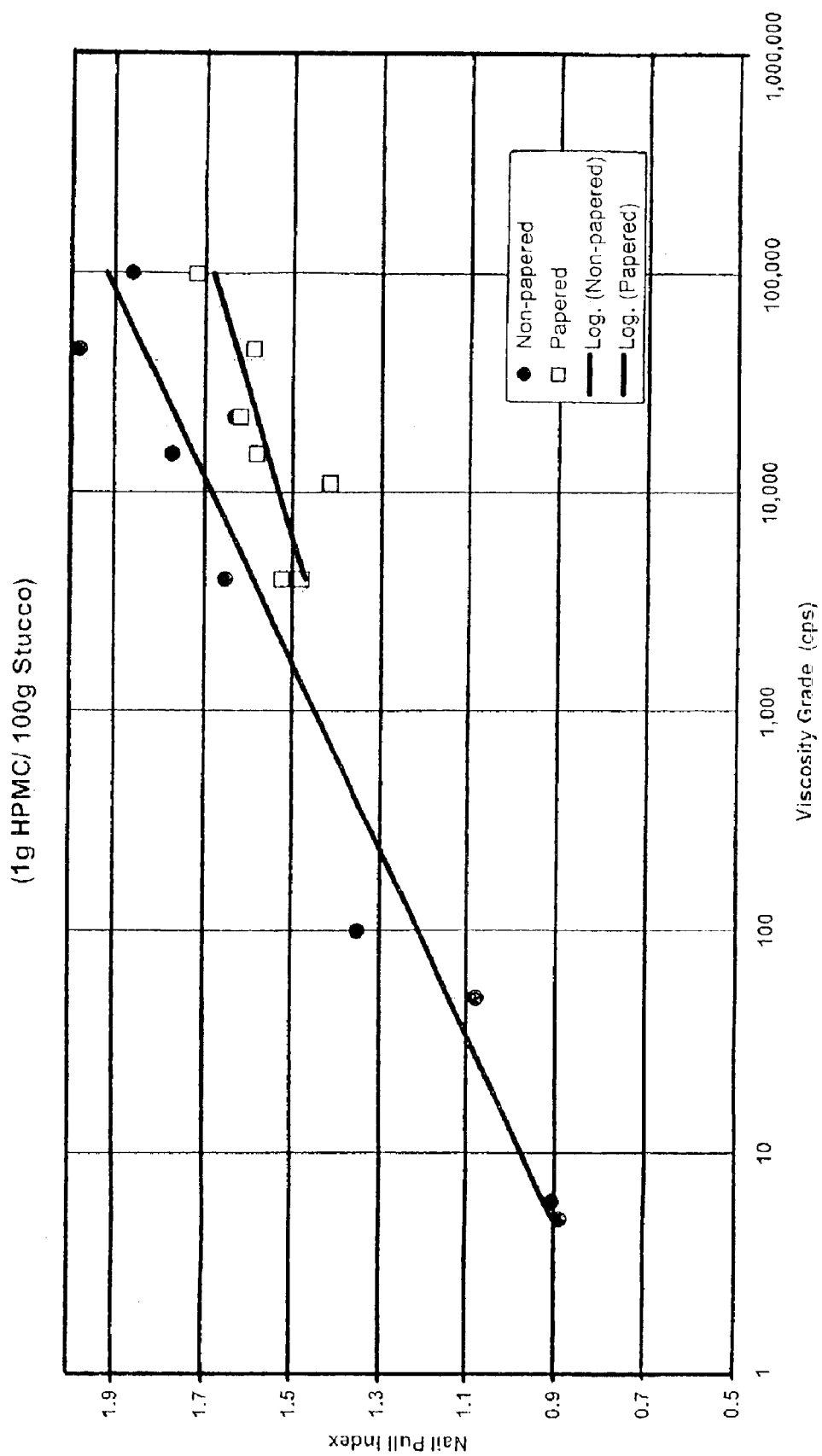
FIG. 7 shows the nail pull index versus viscosity grade for HPMC at a weight fraction of 1 g of HPMC per 100 g β-calcium sulfate hemihydrate with and without a paper backing.
Figure 15:
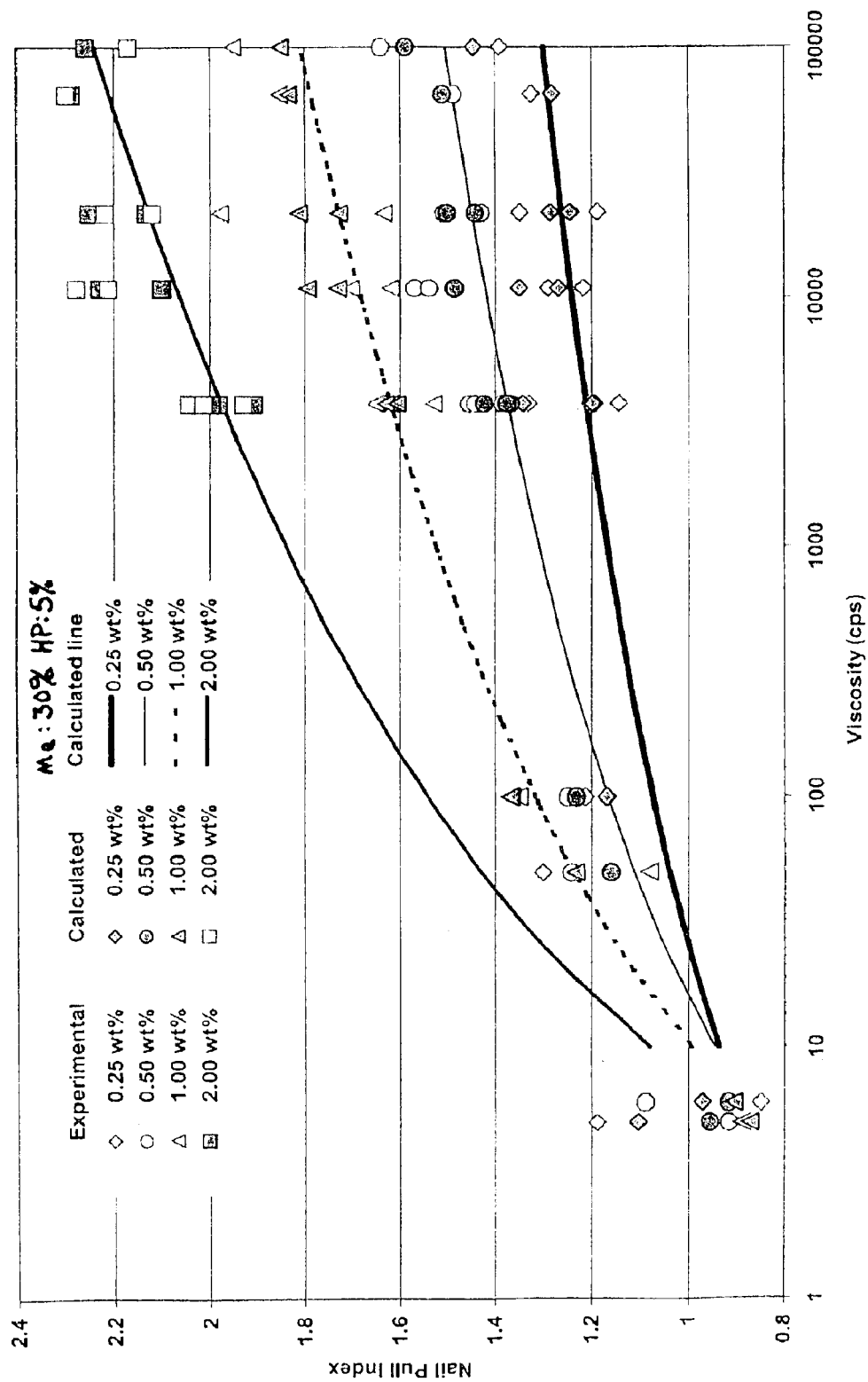
FIG. 15 shows the data and a correlation for the nail pull index versus viscosity grade for another embodiment comprising a paperless HPMC-reinforced wallboard.
Figure 16:
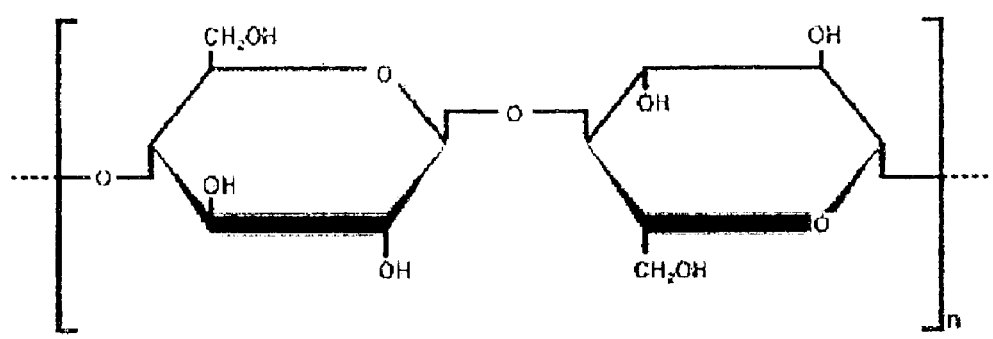
FIG. 16 shows the chemical formula for cellulose.
Figure 17:
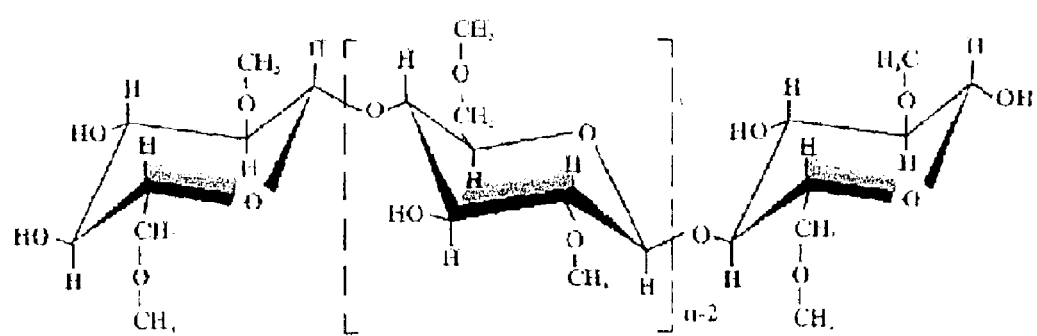
FIG. 17 shows the chemical formula of a methyl cellulose.
Figure 18:
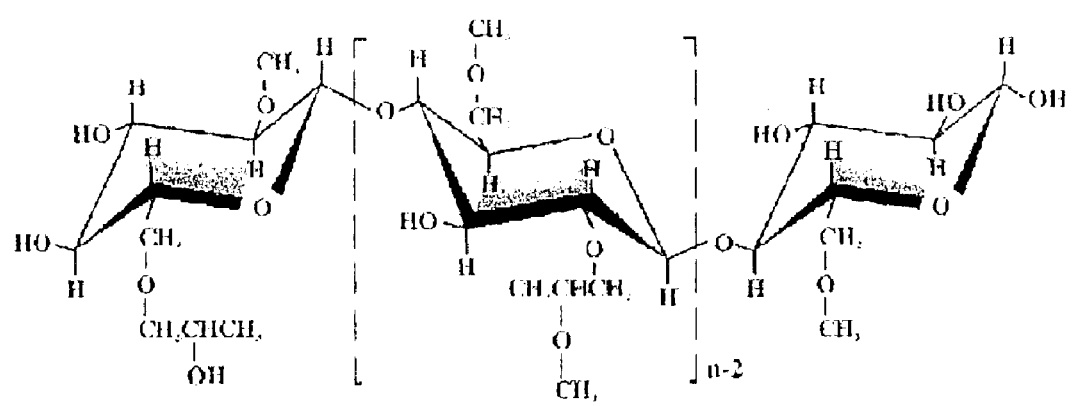
FIG. 18 shows the chemical formula of a hydroxypropyl methyl cellulose.

In one embodiment, cellulose ethers used as additives to the wallboard slurry are selected to have a high molecular weight and a high viscosity grade. Surprisingly, both nail pull resistance and flexural strength are greatly increased for cellulose ethers other than CMC at particular, as shown in FIGS. 1 and 2. Also, it is very surprising that both nail pull index and flexural strength index increase rapidly with increasing molecular weight and viscosity grade for some cellulose ethers, for example as shown in FIGS. 7 and 15. This contradicts those references that indicated that high viscosity grades and high molecular weights would weaken the gypsum crystal strength or be detrimental to strength at all but very low additions of the cellulose ethers. It is believed, without being limiting, that conventional wisdom erred, in part, because the effect of degree of substitution was not appreciated, previously.

Specimens of high molecular weight and high viscosity grade HPMC reinforced wallboard and HEMC reinforced wallboard have the greatest value of nail pull index of those tested, as shown in FIG. 1. Other embodiments show greatly improved nail pull index, as well, especially using high viscosity grade cellulose ethers.

In one embodiment, a low degree of substitution of methyl groups is preferred, e.g. less than 1.6. In an alternative embodiment, a wallboard comprising additions of HPMC less than 1 wt % of the calcium sulfate hemihydrate preferably has HP substitution of HP groups greater than 6 wt % substitution in the cellulose ether polymer.

Figure 5:
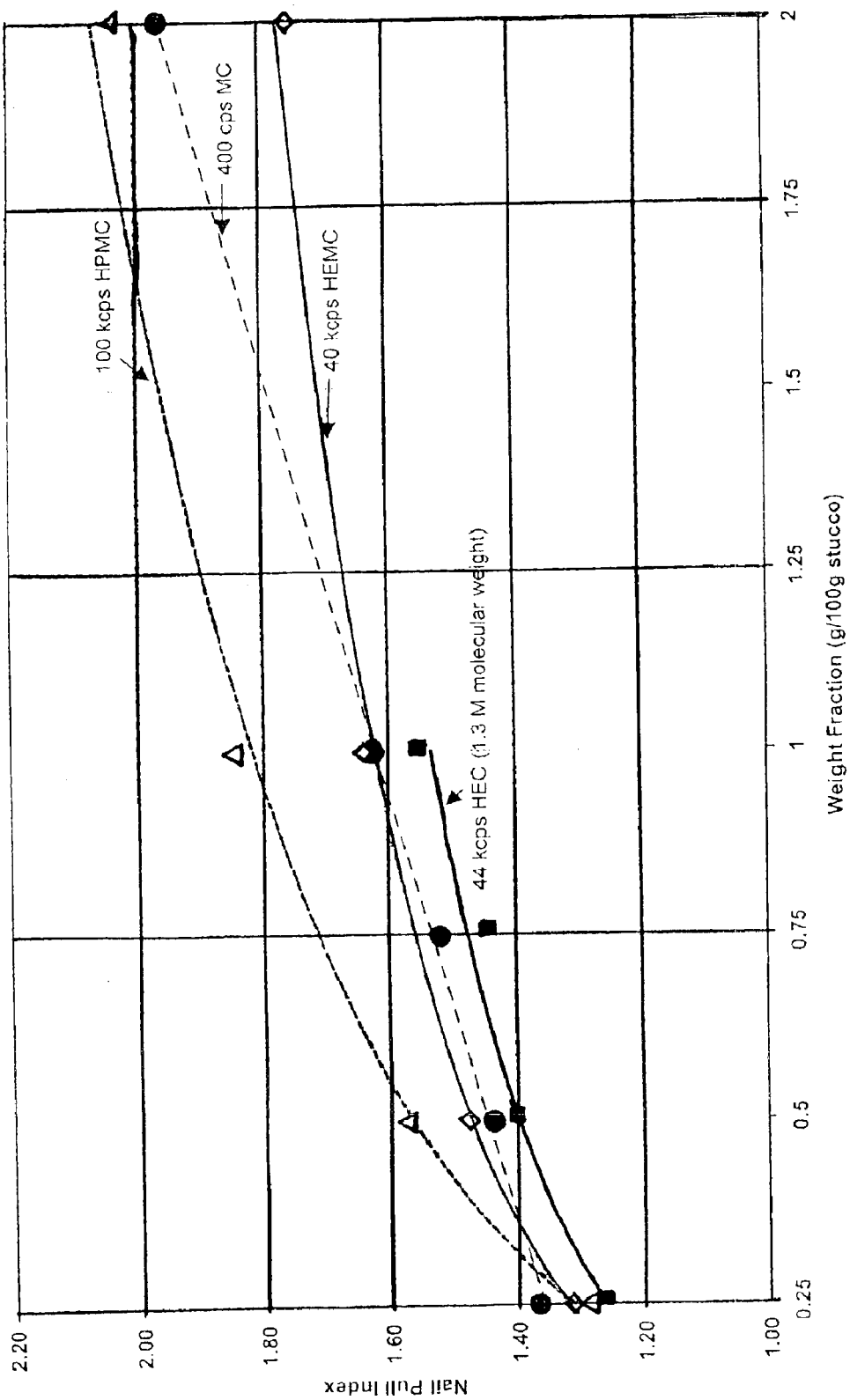
FIG. 5 shows the nail pull index versus weight fraction for several embodiments of the present invention.
Figure 6:
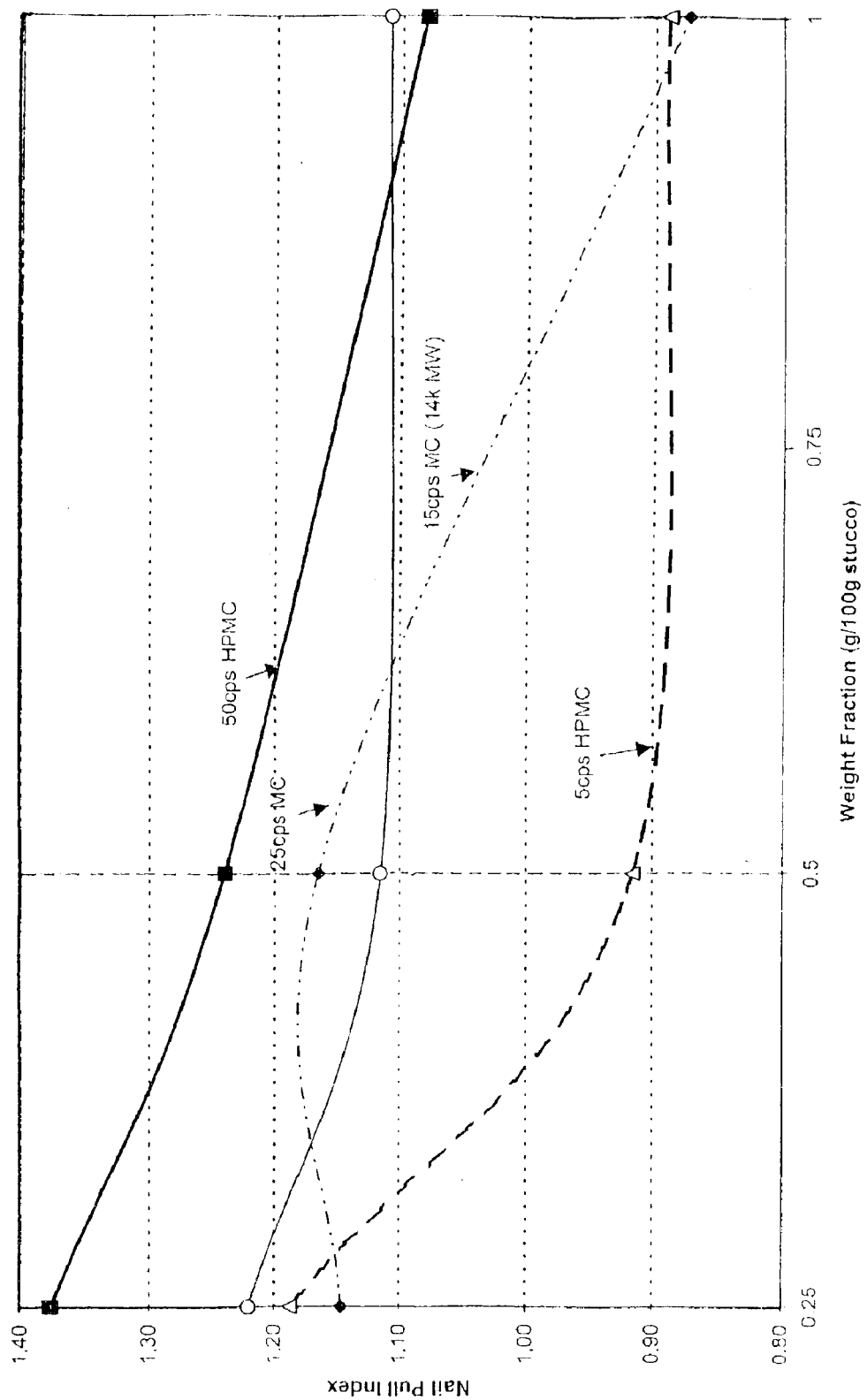
FIG. 6 shows the nail pull index versus weight fraction for several low viscosity cellulose ethers.

FIG. 5 shows that for high molecular weight and high viscosity HPMC, HEMC, and HEC, the nail pull resistance increases logarithmically with the weight fraction of additive. This is a desirable trend, making for a robust and forgiving manufacturing process. 400 cps MC shows a linear increase in nail pull resistance with weight fraction of additive, which is also desirable.

CMC is one of the most commonly used cellulose ethers, but, in the absence of other cellulose ethers, CMC greatly retards setting time and reduces nail pull resistance and flexural strength compared to unreinforced specimens. As mentioned previously, CMC does not increase the strength of wallboard at the concentrations, high molecular weights and viscosities that are effective for the other cellulose ethers. It is believed, without being limiting in any way, that other cellulose ethers tend to have molecular interactions, for example, by hydrogen bonding, immobilizing the molecules that do not segregate to the drying surfaces of the wallboard, as some other soluble polymers do. For example, high molecular weight molecules, having substantial interactions, remain dispersed throughout the wallboard core and reinforce the matrix of hydrated gypsum crystals. Also, having a low methyl DS, approaching the limit of solubility of methyl cellulose in water, increases the flexural strength and nail pull index at the same time that it would be expected to limit the mobility of the methyl cellulose, which precipitates early during drying. It is believed that there is some mechanism of reduced mobility that accounts for the unexpected and surprising results observed for HPMC, as well.

A surface treatment may coat the cellulose ethers to delay the onset of dissolution, which would be expected to improve dispersion of the cellulose ethers in water. In practice, it is believed that the delay in dissolution caused by the surface treatment resulted in incomplete dissolution of the surface treated cellulose ethers, unless dissolution of the cellulose ethers was achieved prior to hydration of the calcium sulfate hemihydrate.

Iodine stain tests showed that cellulose ethers that were surface treated did not disperse evenly throughout the wallboard specimen, especially for HEC surface-treated powders, while both untreated cellulose ethers and surface treated cellulose ethers that were pre-dissolved showed complete and even dispersion throughout the wallboard. One method of improving dispersion of untreated and surface-treated powdered cellulose ethers was to pre-mix the dry cellulose ethers until the powders were well dispersed with the dry calcium sulfate hemihydrate before adding the mixture to water. Thereby, the agglomeration of the cellulose ethers was reduced and dissolution occurred more readily than for agglomerated particles.

Figure 11:
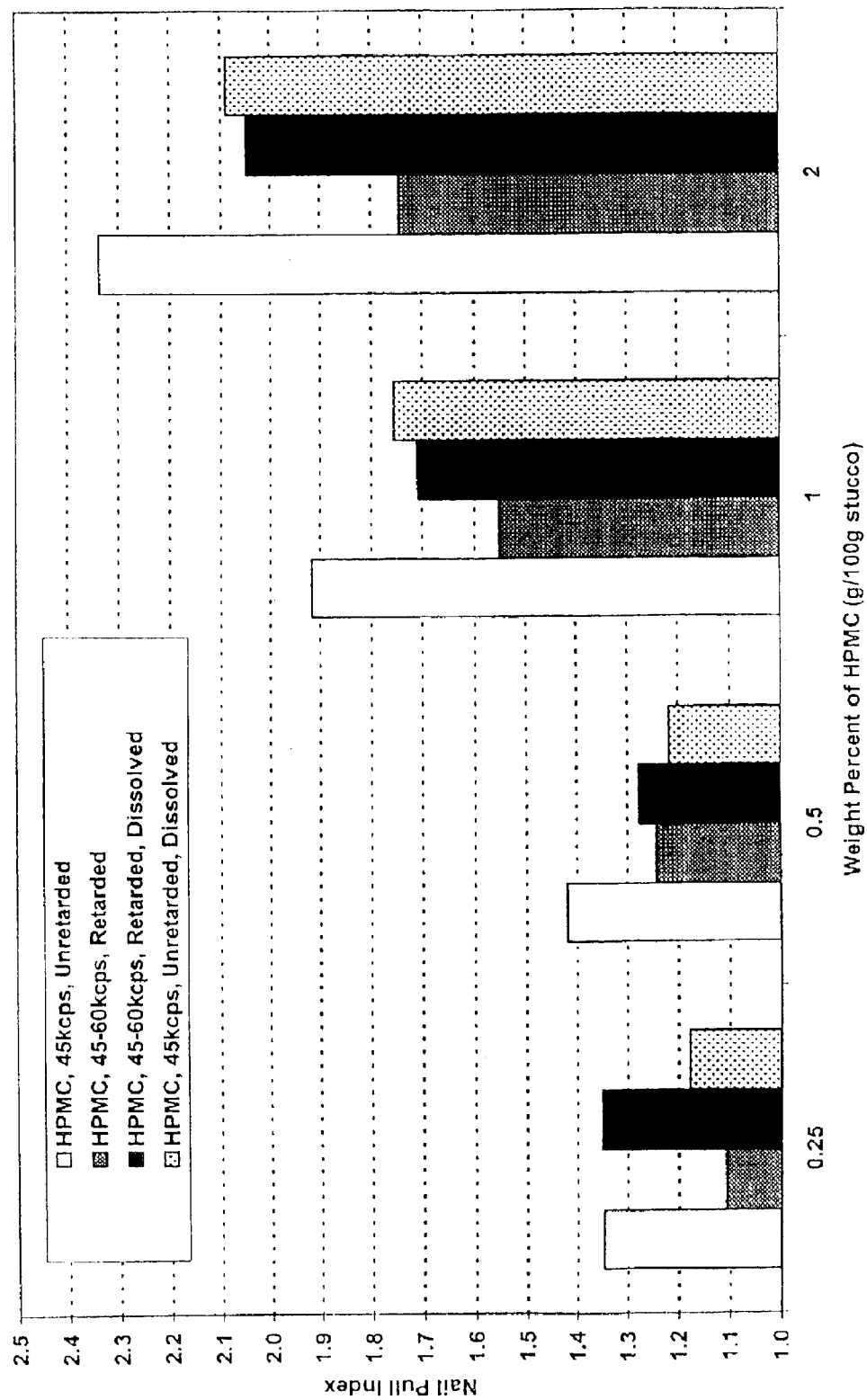
FIG. 11 shows the nail pull index versus weight fraction for four alternative embodiments comprising a paperless wallboard and a HPMC strengthening additive.
Figure 13:
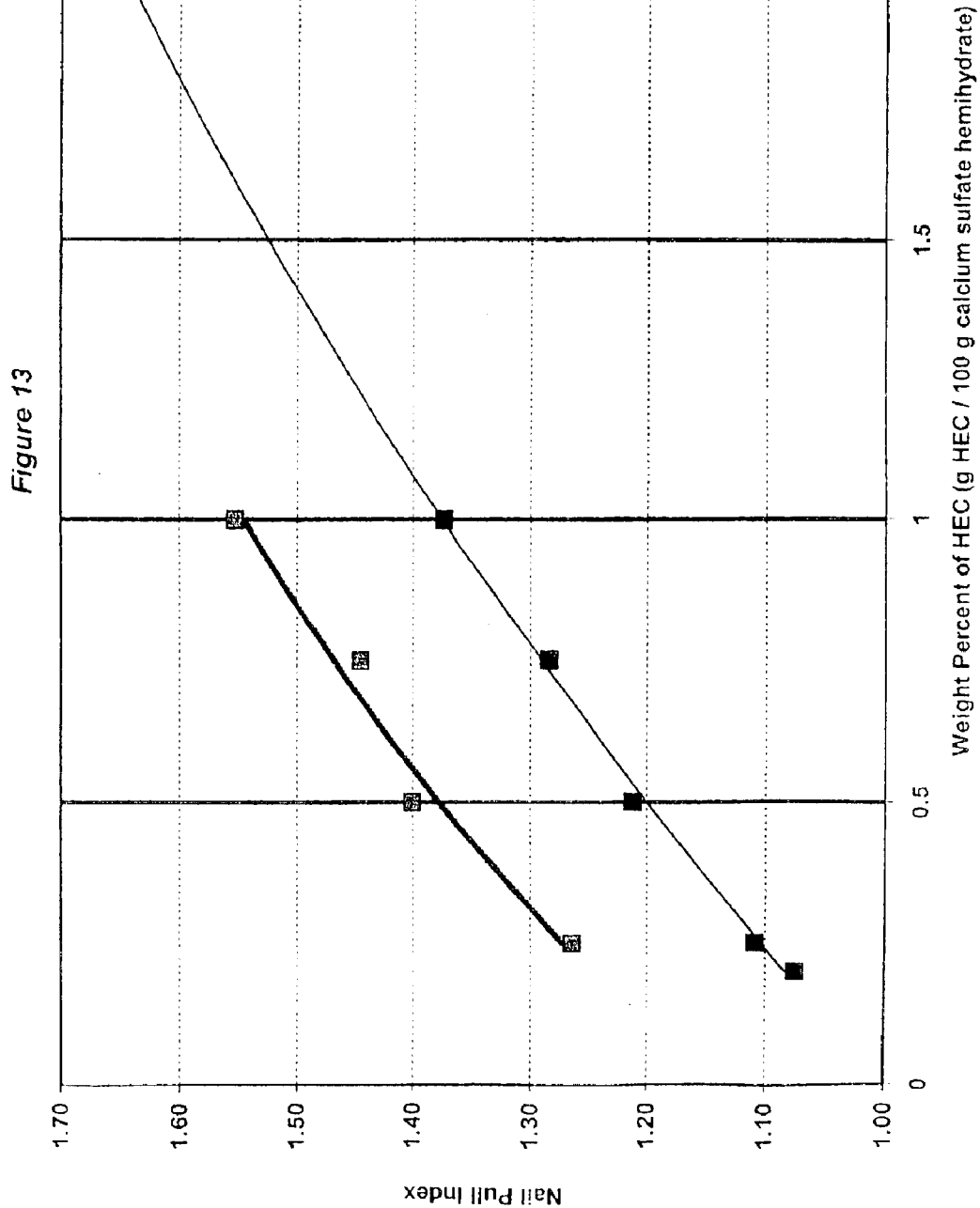
FIG. 13 shows the nail pull index versus weight fraction for two alternative embodiments of a HEC reinforced wallboard or ceiling board.

The nail pull index of surface treated cellulose ethers was less than the nail pull index of either pre-dissolved, surface treated cellulose ethers or untreated cellulose ethers, as shown in FIGS. 1 and 2, and as shown against weight fraction, for example in FIG. 11 for HPMC with a viscosity grade of 45,000 cps (45 kcps) and in FIG. 13 for HEC with a molecular weight of 1.3 million (1.3 M).

Figure 12:
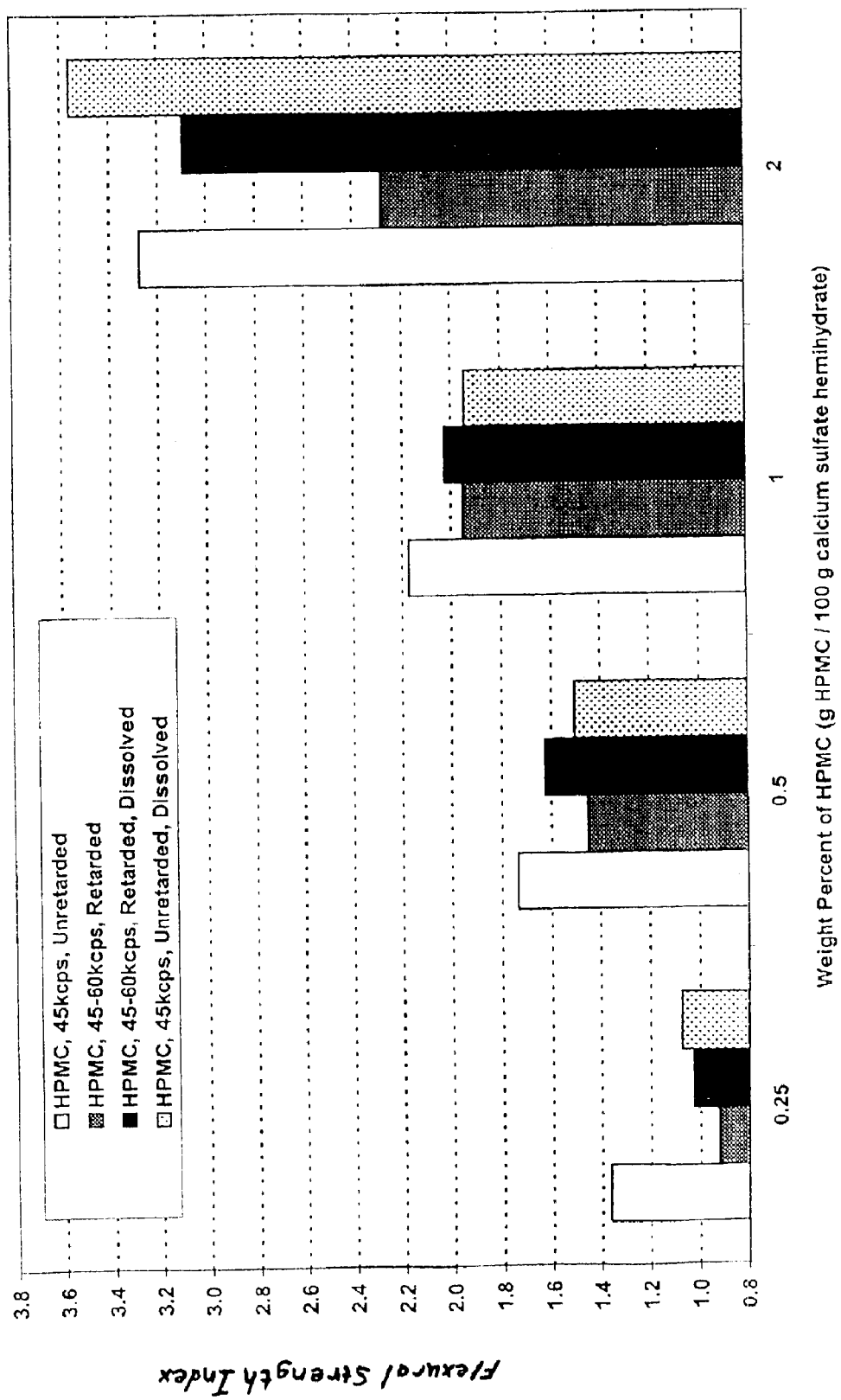
FIG. 12 shows the flexural strength index versus weight fraction for the same four embodiments as shown in FIG. 11.

The flexural strength is not affected as greatly by incomplete dissolution, as shown versus weight fraction in FIG. 12 for HPMC at 45 kcps. It is believed that the difference between the effects in nail pull index and flexural strength index is due to the insensitivity of the flexural strength to localized weakness in the structure. The flexural strength index is less sensitive to crushing of the specimen of the core (distributed stresses) than the nail pull index (localized stresses).

Figure 8:
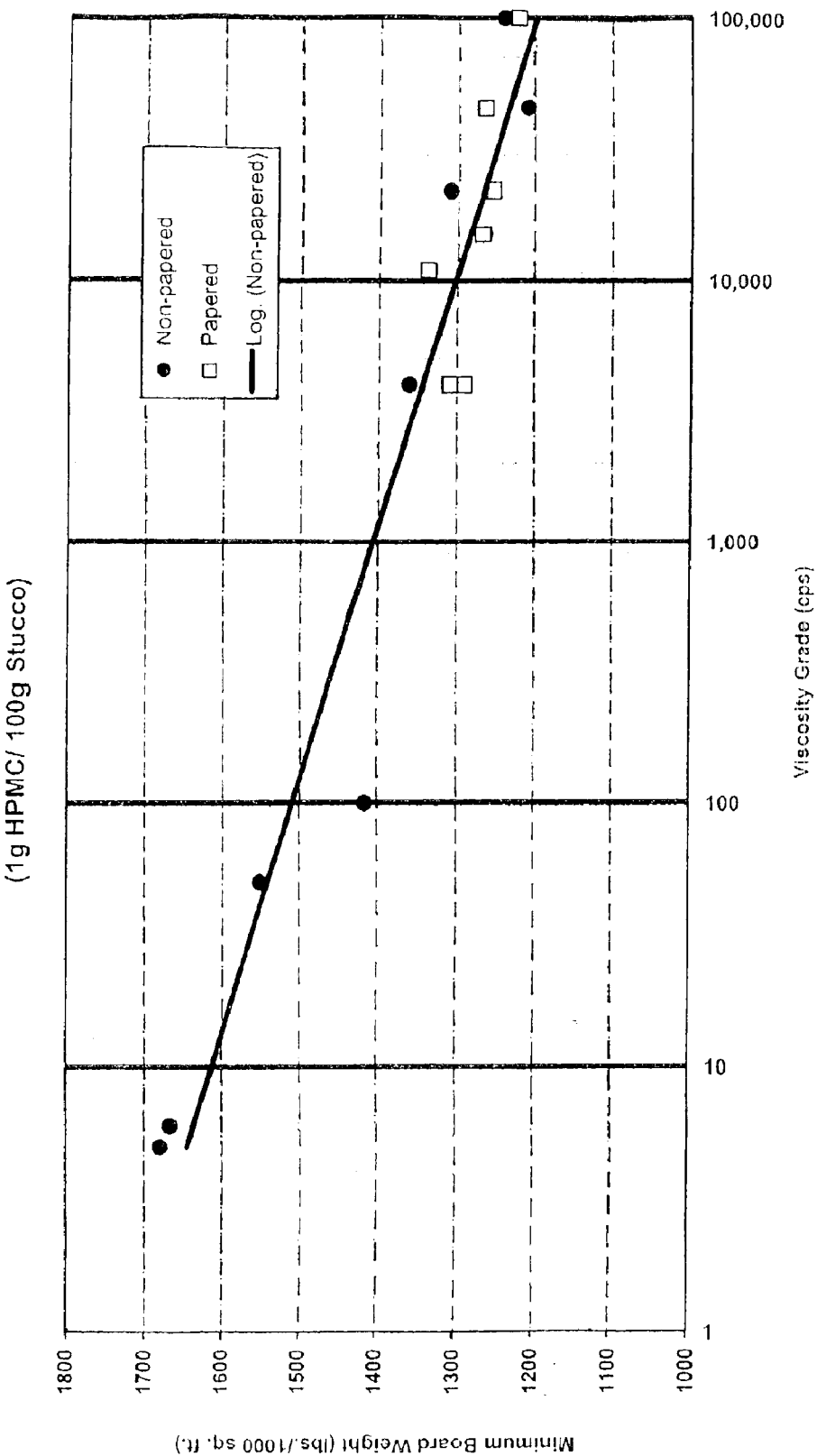
FIG. 8 shows the minimum board weight versus viscosity grade for HPMC at a weight fraction of 1 g of HPMC per 100 g β-calcium sulfate hemihydrate with and without a paper backing.
Figure 29:
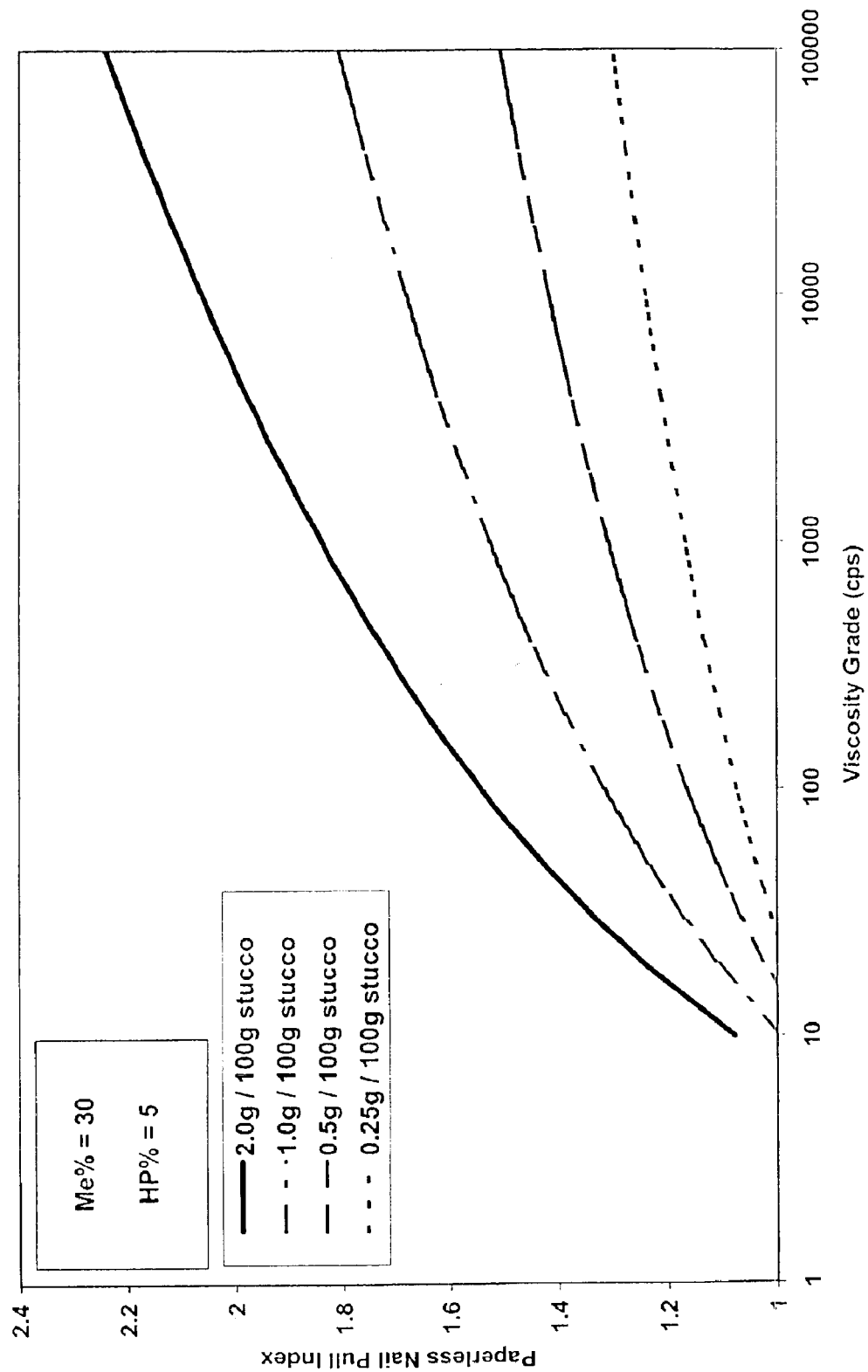
FIG. 29 shows the paperless nail pull index versus viscosity grade for an HPMC having substitution of 30 wt % methyl and 5 wt % hydroxypropyl groups for four different amounts of HPMC addition to β-calcium sulfate hemihydrate from 0.25 wt % to 2.0 wt %, as calculated using a correlation to experimental data.

FIG. 8 shows a minimum board weight projected for meeting ASTM standards versus viscosity grade of wallboard specimens prepared with a weight percent of HPMC additive to β-calcium sulfate hemihydrate of 1 wt %. FIG. 29 shows the effect of viscosity grade and amount of additive on the nail pull index calculated from the correlation for HPMC having 30 wt % substitution of methyl groups and 5 wt % substitution of hydroxypropyl groups in the cellulose ether. As the viscosity grade increases the minimum board weight that is required to pass ASTM standards decreases. In addition, using an HPMC with a more preferred substitution further reduces minimum board weight needed to achieve minimum ASTM standards. Also, other reinforcements, such as fibers added to the slurry, should further reduce the minimum board weight required to pass ASTM standards. Thus, one embodiment of the invention is a wallboard comprising a low density core and meeting or exceeding ASTM standards for wallboard.

In one embodiment, the wallboard core comprises gypsum, a cellulose ether and cellulose fibers. Other fiber reinforcements, such as glass, polymer and carbon fibers, are optionally substituted or added to increase the flexural strength of the wallboard core. In one specific embodiment, short polyester fibers or nylon fibers or both are mixed into the dry ingredients prior to adding the dry ingredients to water to increase the flexural strength. Longer fibers can be introduced during extrusion to provide the core with oriented strengthening along the longitudinal direction of the wallboard.

Slurry viscosity is a concern in high speed wallboard production. Increased viscosity can lead to increased mixing and pumping demands, clogged machinery, and problems with board formation. Slurry viscosity is of even greater importance when selecting a CE additive because the primary purpose of CEs in conventional plaster formulations is to thicken the mixture.

In order to fully hydrate the β-calcium sulfate hemihydrate and prepare a slurry that can be mixed and extruded, a greater amount of water is used than is used for plaster compounds, which use hydration of t-calcium sulfate hemihydrate to form gypsum. It is known that the amount of water added to the slurry has a profound effect on the quality and microstructure of the resulting wallboard. It is believed, without limiting the invention in any way, that addition of too little water prevents adequate mixing of the slurry, while too much water causes porosity in the wallboard core. There can be a dramatic increase in viscosity with the addition of cellulose ethers, especially in formulations with elevated levels of high viscosity cellulose ethers, which can make it difficult to adequately mix the dry ingredients and the water. Furthermore, an increase in viscosity can prevent the slurry from being poured into a form. One simple test that can be used to determine slurry viscosity is a "patty test" in which some amount of slurry is poured from a designated height and the resulting patty diameter is recorded. Furthermore, the rheology of wallboard slurry is a function of time, humidity and temperature.

Figure 9:
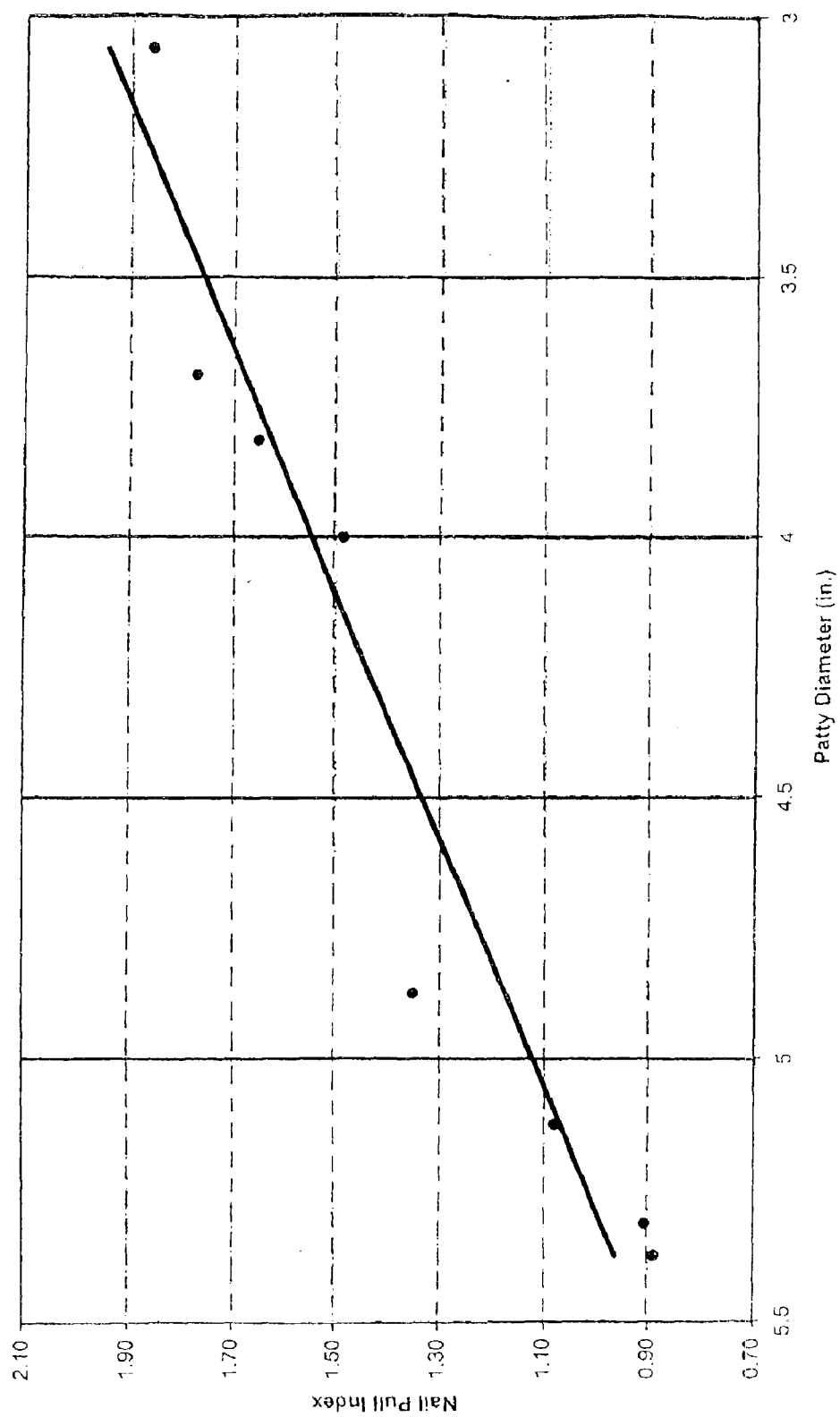
FIG. 9 shows the nail pull index versus patty diameter (an indicator of the viscosity that decreases with increasing viscosity) for HPMC.
Figure 10:
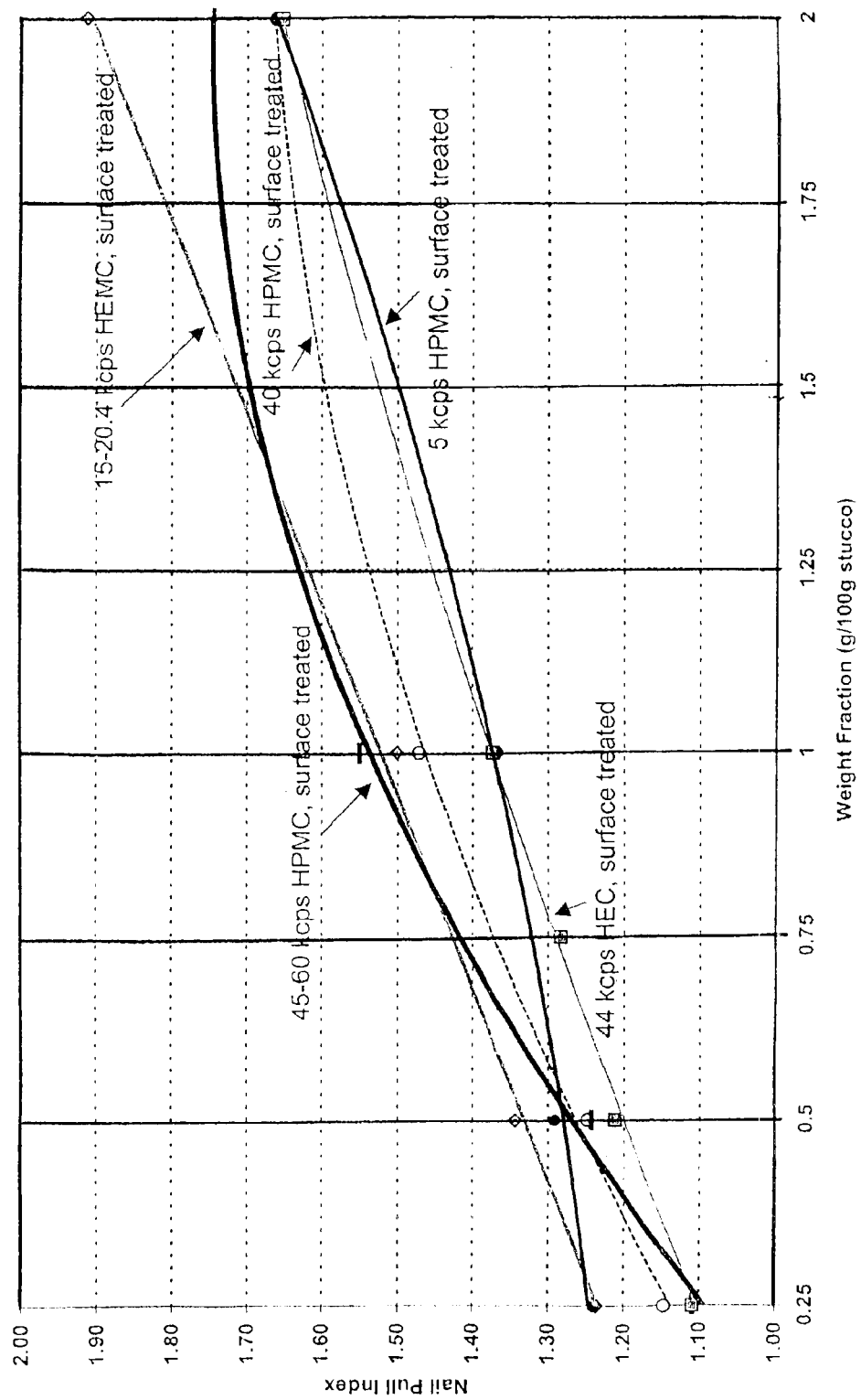
FIG. 10 shows the nail pull index versus weight fraction for several embodiments of the present invention having treated surfaces to delay dissolution.

In general, the patty size increases inversely with an increase in the viscosity grade of a cellulose ether. As expected, the patty diameter increases with decreasing viscosity grade for HPMC. In fact, patty diameter increases logarithmically with the inverse of viscosity grade; therefore, the nail pull index increases proportionally with the inverse of patty size, as shown in FIG. 9. Thus, a trade-off occurs between increasing the viscosity grade to increase strength and the effect of viscosity grade on mixing and further processing of a slurry.

In one embodiment, a slurry was formed by mixing β-calcium sulfate hemihydrate with less than 5 wt % of a powdered cellulose ether, such that the cellulose ether was evenly dispersed throughout the mixture. The mixture was then mixed with an amount of water to form a slurry, such that the wallboard core had a density of less than 0.8 g/cc upon drying. In an alternative embodiment, the cellulose ether was selected to have a molecular weight of at least 10,000 and a viscosity grade of at least 100 cps, and both the nail pull resistance and flexural strength were improved compared to unreinforced wallboard. In another embodiment, the amount of powdered cellulose ether was limited to a range of 0.5 wt % to 3 wt %, and the measured nail pull index continuously increased with addition of powdered cellulose ether. In yet another embodiment, the amount of cellulose ether is limited to less than 1 wt %, more preferably no greater than 0.5 wt %, and the cellulose ether is selected of HPMC and HEMC having a methyl substitution of at least 25 wt %, more preferably at least 30 wt %, and a substitution of the hydroxymethyl or hydroxyethyl of at least 6 wt %, more preferably at least 8 wt %.

In yet another embodiment, the DS is limited to a range between 1.2 and 2.4 for a MC. In an alternative embodiment, the DS is limited to a range from 1.2 to 1.8 for a MC, having a viscosity grade of at least 10 cps, as shown in FIGS. 14 and 15, for example. FIG. 14 shows a graph of nail pull index versus MC viscosity grade with 0.25, 0.5, 1.0, and 2.0 wt % of MC mixed with powdered β-calcium sulfate hemihydrate. The darker lines and point are the values calculated using a correlation, which is discussed elsewhere, while the lighter lines are the experimental values. FIG. 15 is a similar graph for HPMC mixed with powdered β-calcium sulfate hemihydrate. In another alternative embodiment, a DS range from 1.2 to 1.6 for a MC substantially increases the flexural strength index and substantially increases the nail pull index for MC additions at a weight percent of 0.25 and 0.5 wt %, as shown in FIG. 19, which is based on the correlation used in FIG. 14. FIG. 20 shows that this trend applies also to higher weight percent additions of MC. This shows that substantially increasing nail pull resistance occurs for a gypsum-based panel having a MC with low DS, high viscosity grade, large amount of MC and/or a combination of these.

In yet another embodiment, the gypsum-based composite structure is a wallboard having a density less than 0.85 grams per cubic centimeter (g/cc) having a core comprising gypsum crystals and a strengthening additive dispersed throughout the gypsum crystals. The core, without the addition of any face sheets, has a nail pull resistance that meets or exceeds the nail pull resistance for ASTM Standard C36-95b, which is incorporated herein in its entirety. Minimum nail pull resistance for various thickness of wallboard is shown in Table IV. In another embodiment, the wallboard core has a flexural strength and humidified deflection that also meets or exceeds the requirements of ASTM Standard C36-95b. Generally, it is the nail pull resistance that is the critical, limiting strength criterion for commercially useful reduced-paper wallboard. Humidified deflection may become important for ceiling board, and flexural strength may be critical for handling of paperless wallboard during transportation and installation.

In another embodiment, the gypsum-based composite structure has a barrier layer on the surface of the board, such as another gypsum layer. For example, a thin gypsum layer, which may have little or no strengthening additive present, may be incorporated onto one or both surface layers of the wallboard core using a thin skim layer, for example, as is known in the art. The skim layer may be prepared by mixing stucco and water without the addition of the strengthening additive. This thin skim layer forms a dense, smooth protective layer on one or more surfaces and may incorporate a different additive, such as a fungicidal additive or a different strengthening additive from that of the core.

In another specific embodiment, the gypsum-based composite structure is a reduced paper wallboard having a density of less than 0.85 grams per cubic centimeter (g/cc), more preferably less than 0.75 g/cc, and a core comprising gypsum crystals and a strengthening additive dispersed throughout the gypsum crystals, the core having flexural strength that meets or exceeds the flexural strength requirements for ASTM Standard C36-95b. Specifically, the average breaking load of the wallboard core shall be not less than the load shown in Table IV for a wallboard core with the wallboard thickness listed in Table IV. In another alternative embodiment, the wallboard core has a humidified deflection that also meets or exceeds the requirements of ASTM Standard C36-95b.

In one preferred embodiment, the amount of strengthening additive in the core is less than 5 wt. % of the calcium sulfate hemihydrate that is used to form the gypsum crystals, such that inflammability and extinguishability meet the standards for both residential and commercial use.

Method A and Method B of Table IV refer to the methods so designated in ASTM test method C473-95, which is incorporated by reference herein in its entirety.

One or more face sheets may be adhered to the surface of the core, while retaining mold resistance. For example, a single sheet of decorative paper may be applied to the surface of a lightweight core. The decorative face sheet allows the surface of the wallboard, exposed after installation, to be treated as any ordinary wallboard. Thus, taping and sealing joints, wallpapering, painting, and other finishing processes are completed the same as for conventional wallboard, using the single decorative paper face sheet. The face sheet may also provide abrasion resistance and improved flexural strength and/or nail pull resistance.

In one embodiment, the gypsum-based composite structure has an insulative face sheet on one or more surfaces. For example, the insulative face sheet may be a single layer or multiple layers of a foil, including but not limited to an aluminum foil. The insulative face sheet may provide a barrier to radiation heat transfer. Alternatively, the face sheet may be a vapor barrier. In addition, the face sheet may provide abrasion resistance during shipping and handling of the wallboard. Alternatively, a decorative face sheet on one side of the wallboard is combined with an insulative face sheet on the other side of the wallboard.

Another embodiment has a core and a thin protective layer at one or more surfaces of the wallboard. For example, a protective layer may be formed in situ during the setting process. By including a soluble additive in the slurry, which migrates with water, segregation of a highly concentrated layer of the additive may be accomplished during drying of an excess amount of water added to the slurry. Some water soluble polymers, such as poly(vinyl pyrrolidone) and the polyamine curing component of epoxy, migrate with water to the surface of the wallboard during the drying and setting process. Also, some dissolved starches and boric acids migrate with water. Specifically, if an excess of water is present in the slurry, a drying process, for example at an elevated temperature, removes excess water from the wallboard from one or more surfaces by evaporation. In one alternative embodiment, post-processing is used to make the protective layer insoluble to water. For example, a titanium alkoxide or titanium tetraethoxide may be sprayed onto cellulose ethers, making them insoluble in water. Specifically, the reaction between titanium alkoxides and cellulose ethers requires heat, and in one embodiment the reaction occurs during drying of the wallboard, when the wallboard is heated to evaporate the excess water. Alternatively, a photosensitive polymer may be chemically sensitive to light, for example, U.V. light or sunlight and may produce crosslinking that makes the protective layer insoluble.

In one alternative, the protective layer is a water-soluble antifungal chemical that may be either polymeric or monomeric, such as quarternized amines, for example. For example, poly(vinylpyridium bromide) and tetramethylammonium chloride both migrate to the surface with evaporating water and provide an antifungal layer on the surface of the wallboard. Alternatively, a protective layer is applied to the surface of the wallboard by spraying a coating on one or more surfaces of the core, for example, or by introducing the layer as a skim layer. For example, the surface of the gypsum-based structure is protected by either forming a protective skim layer and extruding the gypsum-based structure onto the skim layer or by forming the core and adding a skim layer.

In another embodiment, abrasion resistant surfaces are formed on the gypsum-based composite structure by introducing reinforcements onto one or more surfaces. In one example, abrasion resistant surfaces are formed by co-extrusion or co-molding of an abrasion resistant surface on a structural core. Alternatively, abrasion resistant surfaces are formed after forming the structural core by introducing reinforcements prior to the setting of the surfaces of the gypsum-based composite structure. In one embodiment, the reinforcements are fibrous, such as glass fibers, cellulose fibers and/or polymer fibers. Alternatively, the reinforcements may be particulate reinforcements, such as spherical particles or flakes. Also, a combination of particles and fibers may be used. In an alternative embodiment, a protective layer is applied to the fiber-reinforced surfaces, e.g. a skim layer.

In yet another embodiment of the present invention. The gypsum-based composite structure is a wallboard comprising a core, a protective layer and a face sheet, which includes multiple plies. The face sheet enhances the nail pull resistance of the wallboard, while reducing the number of paper plies. Furthermore, the multiple plies in the face sheet need not add to the flexural strength of the wallboard. Therefore, a lower grade ply may be used than for conventional wallboard. Thus, such wallboard costs less than wallboard using conventional oriented fiber paper plies. For example, paper plies made of recycled newspaper may be used in the face sheet.

As yet another embodiment of the present invention, the gypsum-based composite structure comprises a core having a second phase dispersed throughout the core. For example, the second phase is porosity, a reinforcement, an expanded filler and/or a filler. If the second phase is porosity or an expanded filler, then the density of the wallboard core is reduced. For example, paperless wallboard having a density less than 0.75 g/cc. Alternatively, a reinforcement, such as fibrous or particulate reinforcements, enhance the flexural strength and nail pull resistance of the core. As another alternative, a low cost filler may simply reduce the cost of the gypsum-based composite structure.

In another example, the gypsum-based composite structure is a reinforced, paperless wallboard. Unreinforced, paperless wallboard is very dense, frangible and difficult to handle, whereas paperless, reinforced wallboard solves these longstanding and unresolved needs. The nail pull resistance, mold resistance and flexural strength results for reinforced, paperless wallboard specimens show that wallboard can now be manufactured that meets or exceeds the ASTM standards for nail pull resistance, having reduced weight compared to conventional papered wallboard, and eliminating the multi-ply paper layers that feed mold growth, satisfying a longstanding and unresolved need in a very competitive marketplace. Furthermore, the total installed cost of the some of the alternative embodiments is comparable to the installed cost of conventional papered wallboard.

It is believed, without being limiting in any way, that intermolecular interactions, such as hydrogen bonding, immobilize the cellulose ether molecules, making them precipitate during setting and drying of the gypsum core and prevent migration to the surface of the structure. The degree of interaction between molecules and between a molecule and gypsum is affected by molecular weight, which is reflected in the increase in strength with viscosity grade. It is also affected by the degree of substitution. Also, the addition of larger amounts of a cellulose ether causes precipitation to occur earlier, given the same amount of water, because of the limited solubility of cellular ethers in water. Thus in selecting a specific cellulose ether as a strengthening additive, it is believed that the strength of the wallboard depends not only on the amount of cellulose ether added, but also the solubility and mobility of cellulose ether. Furthermore, it is believed that the solubility and mobility depend on both the degree of substitution and the weight percent of the addition, as shown by the correlations and figures.

In another alternative embodiment, a foam may be produced to further reduce the density of the wallboard core. This foam may be produced, for example, using a surfactant and stirring of the water and/or slurry to generate a foam, which may be incorporated into the extruded wallboard core.

Figure 28:
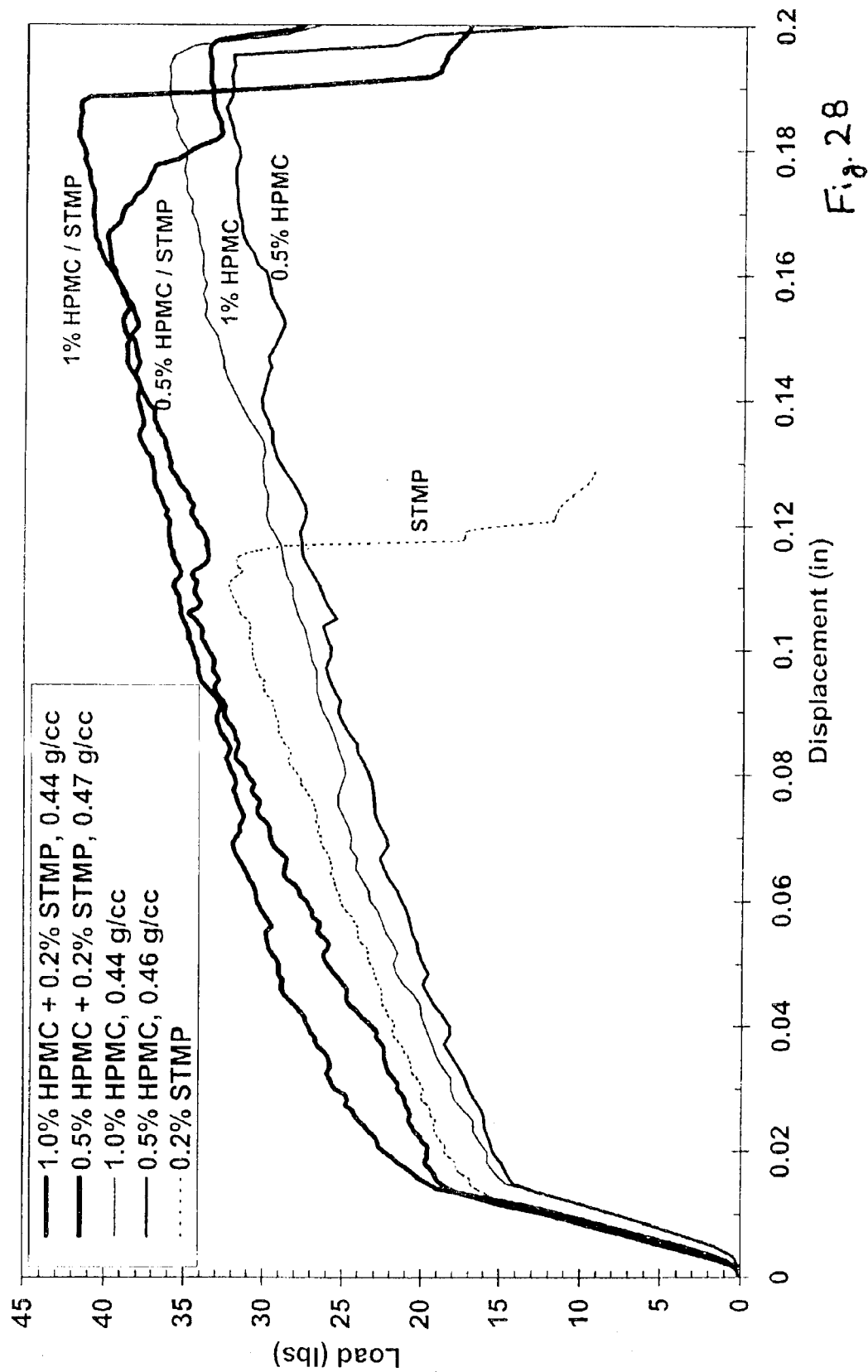
FIG. 28 shows the load-displacement curve of another embodiment.

In yet another embodiment, sodium trimetaphosphate (STMP) was added. Preferably, STMP is added in a range from 0.02 wt % to 1 wt %. STMP is used as a sag reducer in ceiling board. As shown in FIG. 28, STMP has a surprising synergy with the cellulose ether reinforced, gypsum-based composite structure. The toughness, defined as the area under the load displacement curve in FIG. 28, is greatly increased for a panel having both a cellulose ether and STMP compared to a panel missing either the cellulose ether additive or the STMP or missing both (control). This is highly surprising, because STMP usually embrittles gypsum-based wallboard, and undesirably reduces the toughness, as shown by the reduced area under the curve for the gypsum-based panel prepared using STMP alone, without a cellulose ether additive, having a shorter displacement to failure than even the control panel. Both the stiffness and toughness of the cellulose ether reinforced panel is improved by introduction of STMP in to the composite. Furthermore, there is surprisingly little less in the displacement to failure with the addition of the STMP.

In yet another embodiment, the gypsum-based composite structure is fiber-reinforced. The composite strength and toughness of fiber-reinforced cementitious materials is strongly dependent on the interface between the fibers and the matrix, such as the cementitious materials used in building materials. If the fibers have little interaction with the cement matrix, and thus poor interfacial adhesion, the strength of the composite will not be significantly improved regardless of the strength of the fibers or the level of fiber loading. Instead, fiber pullout occurs. Incorporation of foam or lightweight filler into the matrix to reduce the density of the cementitious building materials exacerbates fiber pull-out. The pullout characteristics of fibers in the matrix determine their potential for reinforcing a particular cement. In co-pending application entitled "Construction Materials Containing Surface Modified Fibers, to Tagge et al., filed May 27, 2003, a method for modifying the surface of a reinforcing additive is disclosed, which is incorporated herein by reference.

In one embodiment, co-polymers are polymerized from a mixture of fluoro-aliphatic (meth)acrylate monomers, hydroxyalkyl (meth)acrylate monomers, stearyl (meth) acrylate monomers and chlorinated monomers. Herein, the co-polymers of this embodiment are referred to as fluoro-polymers; however, these co-polymers may actually contain little or no fluorinated groups, depending on the desired application.

In one example, the fluoro-polymers are applied to fibrous surfaces using an anhydride functional polymer and a catalyst. In this example the anhydride group chemically binds to the functional groups of a fiber and crosslinks the hydroxyl groups, for example, binding to hydroxyl groups of water and oil repellant polymers imparts an impermeable surface to the fibers by integrating the functionally designed polymer on the surface. In another embodiment, a cross-linking agent, such as an organic titanate, diisocyanate, metal salt or another reactive, functionalized polymer or pre-polymer, is used in place of an anhydride functional polymer.

In another embodiment, additional monomers with functional groups that are selected to react with a cross-linking agents are included in the fluoro-polymer synthesis. In one example, water and oil repellant and/or bio-active co-polymers contain monomers that react with metals, and a metal salt is used to crosslink the polymer. For example, additional monomers may contain other functional groups, such as, but not limited to, carboxyl, carboxylate, sulfate, sulfonate, phosphate and phosphonate groups.

In one preferred embodiment, the surface modifier is selected to be a multifunctional molecule comprising at least one polymer group, e.g. monomer or oligomer, that binds the surface modifier to one of the reinforcement and the gypsum, and another polymeric group having a different function, such as bioactivity, hydrophyllic or hydrophobic moeity, oil repellancy, adhesion to cellulose, fire retardancy, antistatic properties and/or other functions.

In an alternative embodiment, a functional co-polymer includes a reactive group that chemically bonds to a particulate or fibrous surface without crosslinking the polymer. For example, graft, block and random co-polymers of stearyl (meth)acrylate and maleic anhydride are used with or without a catalyst to increase the rate of chemical bonding between the functional co-polymers and the fibrous surfaces, including natural surfaces such as wood.

In one method of treating fibrous surfaces, the fibers are incorporated into a fabric, such as a fiber mat or textile. The fabric is treated with the fluorpolymer, either before or after incorporation into the fabric. Next, the fabric is exposed to a solution or emulsion that binds one or more functional groups to the fiber surfaces, for example, by immersing the fabric in an emulsion or solution including a monomer, polymer or co-polymer and a metal salt. The treated fabric is then dried, cured and washed to remove undesired, residual components. Drying and curing is performed either under the same conditions or under differing conditions. For example, the temperature for curing may be either greater or less than the temperature used for drying.

In an alternative method, a polymer is synthesized in situ on a fibrous surface by applying a solution or an emulsion including the desired monomers directly on the fibrous surface. A free radical initiator is applied either with the desired monomers or in a separate step, and the fibrous surfaces are exposed to heat or UV light, for example, after drying the fibrous surfaces. Then, the fibers, mat or textile is washed to remove any undesired, residual components.

In one embodiment, bio-active functional monomers are included in the fluoro-polymer synthesis and impart mold resistance, such as anti-microbial and/or biocidal properties. Alternatively, crosslinking of a bio-active functional polymer, co-polymer or oligomer is achieved by including the bio-active component during application of a metal salt and/or free radical initiators. In another embodiment, both bio-active functionality and water and oil repellency are imparted in the same process.

In another embodiment, bio-active functional monomers, oligomers, co-polymers or polymers are polymerized (or further polymerized or crosslinked) in situ around fibrous or particulate surfaces. In one example, another reactive polymer and/or a crosslinking agent is mixed together with the bio-active functional component, binding the bio-active functional component to the fibrous surface. In an alternative example, the bio-active functional components are functional groups on monomers, oligomers, co-polymers and polymers, which are capable of binding to particulate and fibrous surfaces.

For example, the monomers, oligomers, co-polymers and polymers bind to functional groups that are bound to the fibrous or particulate surface. Some examples of bio-active functional monomers, oligomers, co-polymers and polymers include, but are not limited to, quarternized amine functional groups, for example, having from 4 to 10 carbons in the alkyl chain. In one specific example, the fungicidal and bactericidal properties have been shown to kill mold after the mold contacts a bio-active coating on the surface of a textile.

In one embodiment, fibers are first treated to provide a desired functional group on the surface of the fiber. Then, the fibers are incorporated into a mat or textile. For example, the fibers may be woven into a fabric or otherwise incorporated into the form of a mat or paper. The fibers may be combined with fibers having no coating or having a coating incorporating a different functional group, providing the paper, mat or fabric with mold resistance and/or other desirable properties, such as a cohesive bond between the fibers and the matrix, based on the properties of treated fibrous surfaces.

In one embodiment, a facing paper is treated on one surface to impart mold resistance and water repellency. The opposite surface is untreated or is treated in such a way as to provide the opposite surface excellent adhesion with a slurry that forms a wallboard core. Alternatively, the facing paper may be made of multiple plies. For example, an outer ply may be treated to provide bio-active and water repellency to a wallboard, while the innermost ply may be treated to adhere to the core of the wallboard. In another example, the outer ply may be treated for water repellency and one or more inner plies may be treated to impart bio-active properties. In yet another embodiment, the outermost ply on an exposed surface is treated to prepare the surface for plastering, stucco, painting, tarring or decorative papering. For example, the outermost ply may be treated to provide a self-stick surface for a later-applied layer, such as insulation or a decorative wallpaper.

In one embodiment, a film forming polymer or mixture of polymers, at least one of which is an at least partially water-soluble or water-swellable strength enhancer is used as a surface modifier for fibers or is applied to a mat or a fabric. The composition may optionally include a bio-active component and/or a fire retardant to increase fire-resistance. The polymer is preferably cross-linked or treated to prevent complete dissolution of the polymer and subsequent migration away from the fiber during addition to water and subsequent drying. For example, a water-soluble, film-forming polymer utilized in a sizing composition preferably has a strong interaction with the cementitious matrix. Preferred strength enhancing, film forming polymers of the invention include, but are not limited in any way, to cellulose ethers other than CMC for gypsum-based composite structures.

Fibers may be of any denier and length, ranging from continuous, bundled strands, such as those often used in woven meshes, to relatively short, monofilament fibers, such as those used for discrete fiber reinforcement and in some non-woven mats. Herein denier is used as a measure of the fiber mass per unit length in milli-grams per inch (mg/inch), which is an indirect measure of the fiber cross section. Alternatively, a polymer composition may be used as a binder in non-woven fibrous mats, the mats being used for reinforcing composite cementitious materials.

Reinforced composite cementitious materials may be used as, for example, fiber-reinforced cement for cast products, fiber-reinforced gypsum, such as glass-fiber-reinforced gypsum (GFG). Also, fabrics and paper are used with cement as a reinforcement, such as in joint tapes, patching kits, and molded articles. The fibers and fabrics, themselves, can be made by any conventional process or may be specifically designed with functional groups on the fibrous surfaces that react with the polymer additives or sizing. In one embodiment, conventional sizing equipment is configured to apply the polymer additive and to dry and crosslink the polymers. In one embodiment, the treated fibers are incorporated into the composites according to conventional methods by merely replacing existing fiber or fabric inclusions.

It is thought, without being limiting in any way, that in one embodiment a polymer coating forms an interfacial layer of polymer-enriched slurry adjacent to the fiber. As the slurry dries, the polymer re-forms a film encapsulating the fiber and local gypsum crystals in the matrix surrounding it. The polymer binds the fiber to the matrix and reinforces the region surrounding the fiber. This results in an effective transfer of stress between the gypsum crystals and the reinforcing fiber when the composite is stressed. In a preferred embodiment, the amount of solids in the slurry is in a range from 0.5% to 50% with an add-on of from 1% to 500% of the fiber weight. Preferably, a sizing composition is selected having solids of from 2% to 20%, and add-on of from 20% to 500%. Strength enhancement in surface-modified, fiber-reinforced composites increases with higher amounts of polymer add-on.

In one embodiment, the calcium sulfate hemihydrate is mixed with surface modified fibers, a second additive and water. The sizing composition for surface modifying the fibers is selected from one of a starch, a starch derivative, a cellulose derivative, an acrylic polymer (commonly polymerized from an acrylic acid, an acrylic salt, an acrylic ester, an acrylamide, a methacrylic acid, or an acrylonitrile monomer), a polyvinyl acetate, a polyvinyl alcohol (PVA), an alginate, and a natural gum. Also, emulsions or dispersions of polyesters, polyurethanes, and styrene copolymers may be used.

For example, wallboard reinforced by fibers coated solely with these formulations show some improvement in mechanical strength if the treated fibers are mixed into the slurry gently, as a final step. Also, excess water content crosslinked additives dissolve in the water and tend to migrate away from the fibers and toward the surface of the wallboard over time during drying. However, without further treatment these additives often segregate to the surface and serve as nutrients for undesirable microbial, mold and fungus growth. Iodine staining techniques were used to observe this propensity for migration, for example, among poly vinyl pyrrolidone additives. Preferably, the surface modifying layer (surface modifier) has an interaction and/or bond with the hardening cement that improves interfacial strength without retarding the set. Alternatively, the surface modifier interacts with the additive, such as a cellulose ether, which is added to the matrix of a cementitious structure. In one embodiment, the surface treatment is somewhat soluble or swellable in water, resulting in an interfacial layer of polymer that adheres to the fiber and partially penetrates the crystallized particles of cement or gypsum.

Preferably, high molecular weight sizing solutions have lower solids content than conventional sizes; however, the add-on is comparable, because the slurry viscosity is greater. Furthermore, cross-linking the surface coating creates a durable coating for fibers or fabrics that is not easily removed during the mixing, setting, or drying steps of fiber-cement production.

For example, hydrophilic polymer systems are converted to swellable hydrogels upon cross-linking. It is believed, without being limiting in any way, that these swollen coatings allow cement crystal growth into fiber size while resisting erosion, dissolution, and migration. Fibers with cross-linked surface coatings are used in conventional high-speed mixing procedures such as those found in wallboard production. In one embodiment, the fibers are pre-mixed with dry components. Alternatively, the fibers are dispersed in water prior to cement mixing or are combined together with both the water and the calcium sulfate hemihydrate and other powdered additives.

Several cross-linking methods are utilized to decrease the solubility of surface coatings. In one embodiment, a sizing is at least partially insolubilized by exposing the sizing to higher temperatures than normal during drying, causing crosslinking of the sizing. Sizing components such as starch and starch derivatives, PVA, CMC, and acrylate polymers, as previously listed above, crosslink at elevated temperatures. Conventional sizing avoids such temperatures to prevent the sizing from becoming insoluble, for example.

In another embodiment, radiation, such as ultra-violet (UV) light or gamma rays, can also be used to cross-link some sizing components, such as polyvinyl pyrrolidone (PVP). In another embodiment, water-insoluble polymers are incorporated into a film forming polymer to physically cross-link the surface treatment. For example, a reactive polymer system, a system of reactive prepolymers, or a latex, preferably with an internal cross-linker, may be mixed with hydrophilic polymers and reacted to lower the solubility of the resulting film on the additive.

In an alternative embodiment, a film forming polymer is chemically cross-linked to form a hydrogel. For example, cross-linking agents for cellulose ethers include organic titanates, organic zirconates, and dialdehydes, such as glyoxal and gluturaldehyde. Borax and sodium trimetaphosphate are preferred for starches. Calcium chloride with peroxide, poly(styrene sulfonate) (PSS) and UV light are preferred for PVP. In one preferred embodiment, the cross-linking system is relatively stable and is preferably enhanced during or after drying by the elevated temperature, which allows swelling during setting but avoids migration of the polymer during drying and weakening of the bond if a cementitious building material becomes wet, for example, by flooding or exposure to high humidity.

In one embodiment, HPMC is crosslinked by a chelated organic titanate which is activated at temperatures above 100 degrees centigrade. In another embodiment, a cross-linking agent is applied to only the outermost region of the surface coating, forming a surface cross-linked polymer coating with delayed solubility. In another preferred embodiment, a surface coating polymerizes in situ on a fiber in combination with a crosslinking agent. For example, the free radical polymerization of 1-vinyl 2-pyrrolidone with 1,6-hexanediol diacrylate is used to form a surface coating on a fiber for use in cementitious composite materials.

In another embodiment, a coupling agent, such as a silane coupling agent, is included with the surface modifier formulation to improve the bond between the size and the fiber, promoting adhesion. Alternatively, the coupling agent is applied to the fibers or fabric as a primer before application of the surface treatment. In a preferred embodiment, a cross-linking agent, such as an organic titanate, acts as both the crosslinking agent and the coupling agent, chemically bonding the surface treatment to the fiber, for example, via hydroxyl functional groups of the fibrous surface of a fabric. In one embodiment, the layer of the surface treatment adjacent to the fibrous surface is cross-linked by a coupling/crosslinking agent applied as a primer, but the exterior of the surface treatment is either not cross-linked or is less highly cross-linked than the surface treatment adjacent to the fibrous surface.

In another preferred embodiment, a plasticizer, such as polyethylene glycol or glycerol, may be included in the surface coating composition to increase the flexibility and toughness of the coating.

Preferred fibers to be sized include monofilament, bundled, and spun strands of various materials, including inorganic fibers, such as glass, mineral wool, and metal (e.g. steel), synthetic fibers, such as polypropylene, polyester, and nylon, and natural fibers, such as cotton, hemp, and wood. In one embodiment, bundled and chopped spun strands are designed to separate when mixed with the slurry, allowing the treated fibers to disperse and embed within the matrix material. In an alternative preferred embodiment, the sizing composition and slurry mixing conditions are controlled to maintain an intact surface modifier layer around a fiber bundle or strand, while allowing for some separation of the individual fibers. This provides a larger effective surface area of the fibers for adhesion to the size and cement matrix. The surface coating acts as a binder, allowing discrete bundles or spun strands of fibers that would normally separate into individual filaments when mixed in a slurry.

In one embodiment, the fiber is immersed in the surface coating material, dried, woven if desired, and cut to the desired dimensions in an automated process. For example, bundled fiberglass strands sized with a cross-linking CMC composition may be woven or arranged into a mesh and embedded as reinforcement in cement boards. In an alternative embodiment, chopped or other types of discrete fibers are sized by spraying them with a sizing solution while they are suspended in air. In yet another embodiment, individual fibers are coated by a surface coating in a solvent or emulsion and are agglomerated into a mat of fibers. Each of the coating processes may be repeated any number of times to achieve a desired thickness of add-on.

In one preferred embodiment, fibers are coated by a cellulose ether at an elevated temperature, at which the cellulose ether particles have low solubility. Powdered CE's are dispersed in hot water without hydrating or dissolving them, maintaining a low viscosity even at high concentrations of CE's. As the solution cools, as when exposed to a cool fiber or fabric or to air, the CE dissolves, forming a semi-solid gel. In an alternative embodiment, a surface-treated, delayed-solubility CE is used. Preferably, the surface-treated, delayed-solubility cellulose ether is coated with an aldehyde, more preferably a gluturaldehyde, which also impart anti-fungal properties to the fibers. For example, fiber immersion sizing (single or double) with a high molecular weight, high viscosity grade cellulose ether achieves an add-on thickness greater than 25%.

In one embodiment, fabrics or papers are surface modified by immersing the fabric or paper sheet in the surface modifier. In another embodiment, a surface modifier is sprayed onto one or both sides a fabric or paper layer.

In one embodiment, a fiber mat is formed by evenly dispersing chopped fibers in solution for surface treating the fibers. Then, the fibers are evenly spread, and the dispersion is drained over a wire mesh. Next, the fiber mat is dried, or, alternatively, the mat is first compressed to force liquid out of the mesh. For example, the fibers may be glass fibers, the surface coating may be PVP, and/or the PVP may be crosslinked by PSS or UV light before or after the mat is dried. In an alternative embodiment, pressure or vacuum is applied before the wet fiber mat is dried, degassing the fibers and improving penetration of the surface coating.

In one preferred embodiment, intermingling of the polymer and the gypsum crystals in the matrix is increased by incorporating inorganic particles in the sizing formulation. For example, the inorganic particles, such as accelerant, act as seeds for the precipitation of gypsum crystals, causing crystals to grow directly from the surface coating and improving adhesion with the matrix. Also, inorganic particles may be added that act as a fire-retardant filler, improving the fire-resistance. Preferably, inorganic particles are ground gypsum ball mill accelerator for gypsum-based composite structures that use calcium sulfate hemihydrate to form gypsum crystals.

In an additional embodiment, the surface coatings are used to coat other types and forms of materials in addition to fibers. For example, reinforcing polymer coatings can be used to coat reinforcing aggregate, lightweight filler and wire mesh. Also, the surface coating may be added primarily for its bio-active properties, rather than as primarily a strengthening agent.

In contrast to an unprotected textile, a textile having a thin layer of the bio-active polymer on the fibrous surfaces of the textile resists or prevents mold growth. In one example, a test exposed both a protected surface and an unprotected surface to the same mold-containing emulsion, which was then encouraged to grow by placing both of the samples in a warm, humid environment. After a short period of time, the untreated textile showed evidence of mold growth. In contrast, the sample having fibers coated with the bio-active polymer showed no mold growth for more than 24 days.

In one alternative embodiment, the treatment is applied to a surface of a fabric or paper, such as a fiber-reinforced paper or a re-pulped, recycled paper, such that the treatment does not penetrate the surface or only partially penetrates the surface. Thus, the properties imparted to the fabric or paper have a functional gradient from the exterior surface toward the interior.

In yet another embodiment, particulates of water soluble cellulose ethers, such as hydroxypropyl methyl cellulose and methyl hydroxyethyl cellulose ether, were treated to coat the surface with a layer of a dialdehyde to improve dispersal, delay dissolution and delay an increase in viscosity associated with mixing of the cellulose ether with water. In another example, a glyoxal was used for the same purpose. Both examples caused the desired delay in dissolution, as evidenced by the ability of the surface-treated cellulose ethers ready dispersion in water. Untreated particles immediately underwent gelation upon contact with the surface of the water and resisted dispersion in the water even with mild agitation.

It is believed, without being limited thereto, that the gluturaldehyde is a bio-active material, inhibiting mold growth, while the glyoxal is a food source for mold growth, encouraging the growth of mold. In another example, glyoxal treated cellulose ethers used in preparation of reinforced gypsum wallboard showed enhanced mold growth in tests compared to gypsum wallboard using untreated cellulose ethers. It is believed that this is the first observation of this undesirable characteristic of glyoxal treated cellulose ethers, leading to the present development of gluturaldehyde as a beneficial replacement in the role of delaying dissolution of cellulose ether particulates, promoting dispersion of the cellulose ether particulates in water, while providing anti-fungal and anti-microbial properties to wallboard, for example.

SPECIFIC EXAMPLES

Control Sample. One hundred grams of β-calcium sulfate hemihydrate was dry mixed with 0.13 g ground gypsum accelerator. The β-calcium sulfate hemihydrate was then added to 150 g of room-temperature tap water in a 500 mL Waring blender. The slurry was blended at low speed for 15 seconds. The slurry was then immediately poured into an approximately 7"×2"×½" mold. After about 20 minutes, the sample was removed from the mold and placed in a convection oven at 45° C. in which it was dried for at least 36 hrs. After removal from the oven, the sample was cut to 5"×2" and massed and dimensioned. This data was used to calculate sample density. The flexural strength was attained using a three-point-bend test similar to the ASTM C473 flexural strength test (method B) for gypsum wallboard. An Instron mechanical testing system with data acquisition software was used to determine mechanical behavior. The flexural failure stress was calculated from the failure load, testing configuration, and sample geometry. The two half samples remaining from the bending test were tested for resistance to nail pull. A nail pull test based on ASTM C473 nail pull test (method B) was used. The resulting sample had a density of 0.63 g/cc, a flexural strength of 242 psi, and a nail pull resistance of 46 lbs.

High Viscosity HPMC Enhancing Agent; Paperless Sample. One hundred grams of β-calcium sulfate hemihydrate was dry mixed with 0.13 g ground gypsum accelerator and 1 g HPMC (100 kcps purchased from Aldrich Chemical Co.). The dry mixture was then added to 150 g of tap water in a 500 mL Waring blender. The slurry was blended at low speed for 15 seconds. The slurry was then immediately poured into a 7"×2"×½" mold where it set for about 20 minutes before being removed. The sample was placed in a convection oven at 45° C. for at least 36 hrs. After removal from the oven, the sample was cut to 5" long, massed, and dimensioned. The density was calculated and the sample was tested for flexural strength and nail pull resistance on an Instron mechanical testing system. The sample had a density of 0.46 g/cc, a flexural strength of 299 psi, and a nail pull resistance of 43 lbs.

High Viscosity RETARDED HEMC Enhancing Agent; Paperless Sample. One hundred grams of β-calcium sulfate hemihydrate was dry mixed with 0.13 g ground gypsum and Ig of retarded HEMC (15–20, 5 kcps, purchased from Aldrich Chemical Co.). The dry mixture was then added to 150 g of tap water in a 500 mL Waring blender. The slurry was blended at low speed for 15 seconds. The slurry was then immediately poured into a 7"×2"×½" mold and, after 20 minutes, removed. The sample was placed in a convection oven at 45° C. for at least 36 hrs. After removal from the oven, the sample was cut to 5" long, massed, and dimensioned. The density was calculated and the sample was tested for flexural strength and nail pull resistance on an Instron mechanical testing system. The resulting sample had a density of 0.63 g/cc, a flexural strength of 545 psi, and a nail pull resistance of 78 lbs.

High Viscosity HPMC Enhancing Agent; Lightweight Wallboard. A papered sample was prepared by mixing 1 kg of β-calcium sulfate hemihydrate with 1.3 g ground gypsum and 10 g of HPMC (22 kcps, purchased from Aldrich Chemical Co.). To a 5 liter Waring blending container was added 1.5 kg of room-temperature tap water, 20 drops of Daxad 19LKN (dispersant) from Dow, and 10 drops of a 40% solution of diethylenetriaminepentaacetic acid sodium salt (retarder). The powder was added to the water and blended on high for 15 seconds. The slurry was then poured into an approximately 12"×12"×½" mold lined with an envelope made of standard decorative wallboard facing paper. The sample was removed from the mold after 15 minutes and placed in a 45° C. convection oven for 48 hrs.

The sample was then removed and cut into 5"×2" and 9"×2" specimens, with the long dimension in the direction of the fibers of the paper. These specimens were then massed and measured. The density was calculated and the specimens were tested for flexural strength in the fiber direction and nail pull resistance on an Instron mechanical testing system. The sample had a density of 0.47 g/cc, a flexural strength of 822 psi, and a nail pull resistance of 75 lbs.

MC with 1:1 ratio of water:β-calcium sulfate hemihydrate ratio by weight. First, 100 parts of β-calcium sulfate hemihydrate was mixed with 9 parts of methyl cellulose (Aldrich, MW 17,000, viscosity grade 25 cps). The mixture was then added to 100 parts of water at room temperature and blended at a high shear setting for approximately 15 seconds. The resulting slurry was highly viscous, failing to pour into the form. A spatula was used to transfer, in small portions, enough slurry to be pressed into a form measuring 2 inches by 5 inches by 0.5 inches. After setting, the mixture was removed from the mold and cured at 45° C. for 2 days. The resulting sample has a density of 0.72 g/cc, a nail pull index of 1.87 (121 lbs) and flexural strength of 881 lb/in$^2$.

MC with 1:1 ratio of water:β-calcium sulfate hemihydrate ratio by weight. First, 100 parts of β-calcium sulfate hemihydrate was mixed with 9 parts of methyl cellulose (Aldrich, MW 14,000, viscosity grade 15 cps). The mixture was then added to 100 parts of water and blended at high shear setting for approximately 15 seconds. The resulting slurry was highly viscous, failing to pour into the form. A spatula was used to transfer, in small portions, enough slurry to be pressed into a from [??] measuring 2 inches by 5 inches by 0.5 inches. After setting, the mixture was removed from the mold and cured at 45° C. for 2 days. The resulting sample had a density of 0.74 g/cc, a nail pull index of 1.75 (119 lbs.) and flexural strength of 864 lb/in$^2$.

MC with 1:1 ratio of water:β-calcium sulfate hemihydrate ratio by weight. First, 100 parts of β-calcium sulfate hemihydrate was mixed with 9 parts of methyl cellulose (Aldrich, MW 40,000, viscosity grade 400 cps). The mixture was then added to 100 parts of water and blended at a high shear setting. The viscosity was exceedingly high and mixing was not possible for the desired 15 second duration. The powdered mixture was not fully incorporated into the slurry. The mixture prematurely set and could not be transferred to a form.

MC with 1:1 ratio of water:β-calcium sulfate hemihydrate ratio by weight. A subsequent specimen was prepared by reducing the amount of methyl cellulose by mixing 100 parts of β-calcium sulfate hemihydrate with 5 parts methyl cellulose instead of 9 parts methyl cellulose. The mixture was then added to 100 parts of water and blended at high shear setting for approximately 15 seconds. The resulting slurry was extremely viscous, beginning to set prematurely during mixing and failing to pour into the form. A spatula was used to transfer, in small portions, enough slurry to be pressed into a form measuring 2 inches by 5 inches by 0.5 inches. After setting, the mixture was removed from the mold and cured at 45° C. for 2 days. The resulting sample had a density of 0.73 g/cc, a nail pull index of 1.54 (103 lbs.) and a flexural strength of 766 lbs./in$^2$.

Low Viscosity Grade HPMC. A ratio of 1:1 of water:β-calcium sulfate hemihydrate ratio by weight was prepared. First, 100 parts of β-calcium sulfate hemihydrate was mixed with 9 parts of HPMC (Aldrich, MW 10,000, viscosity grade 5 cps). The mixture was then added to 100 parts of water and blended at high shear setting for approximately 15 seconds. The resulting slurry poured directly into a form measuring 2 inches by 5 inches by 0.5 inches. After setting, the mixture was removed from the mold and cured at 45° C. for 2 days. The resulting sample had a density of 0.63 g/cc, a nail pull index of 1.26 (58 lbs.) and a flexural strength of 675 lb/in$^2$.

Low Viscosity Grade HPMC. A ratio of 1:1 of water:β-calcium sulfate hemihydrate ratio by weight was prepared. First, 100 parts of β-calcium sulfate hemihydrate was mixed with 9 parts of HPMC (Aldrich, MW 10,000, viscosity grade 6 cps). The mixture was then added to 100 parts of water and blended at high shear setting for approximately 15 seconds. The resulting slurry poured directly into a form measuring 2 inches by 5 inches by 0.5 inches. After setting, the mixture was removed from the mold and cured at 45° C. for 2 days. The resulting sample had a density of 0.59 g/cc, a nail pull index of 1.18 (47 lbs.) and a flexural strength of 535 lb/in$^2$.

Moderate Range Viscosity Grade HPMC. A water:β-calcium sulfate hemihydrate ratio of 1.0 by weight was prepared. First, 100 parts of β-calcium sulfate hemihydrate was mixed with 9 parts of HPMC (Aldrich, MW 12,000, viscosity grade 80–120 cps). The mixture was then added to 100 parts of water and blended at high shear setting for approximately 15 seconds. The resulting slurry was exceedingly viscous, prematurely setting during mixing and failing to pour into the form. A spatula was used to transfer, in small portions, enough slurry to fill a form measuring 2 inches by 5 inches by 0.5 inches. After setting, the mixture was removed from the mold and cured at 45° C. for 2 days. The resulting sample had a density of 0.75 g/cc, a nail pull index of 1.54 (121 lbs.) and a flexural strength of 652 lb/in$^2$.

High viscosity surface-treated HEMC. A paperless sample was prepared by mixing 1.3 kg of β-calcium sulfate hemihydrate with 1.69 g ball mill ground gypsum (accelerator) and 26 g of retarded HEMC (viscosity grade of 15–20.5 kcps at 2 wt %, purchased from Aldrich Chemical Co.). The liquid components, 1.68 kg room temperature tap water, 26 drops Daxad 19LKN (dispersant) from Dow, and 13 drops 40% solution of diethylenetriaminepentacetic acid sodium salt (retarder), were added to a 5 liter Waring blender. The dry ingredients were added to the water and blended on high for 15 seconds, forming a slurry. The slurry was then poured into an approximately 12"×12"×½" glass mold with a thin teflon sheet on one face to facilitate removal. The sample was removed from the mold after 15 minutes and placed in a 45° C. convection oven for 48 hrs. The sample was then removed and cut into 5"×2" specimens. These specimens were then weighed and measured. The densities of nine specimens were calculated and the specimens were tested for flexural strength and nail pull resistance on an Instron Mechanical testing system using the methods previously described. The board had an average density of 0.64 g/cc, a flexural strength of 809 psi, and a nail pull resistance of 102 lbs., passing ASTM flexural strength and nail pull requirements.

Ultra-Lightweight Wallboard/Insulation Board. An ultra-lightweight wallboard cone was prepared by adding, to a 500 mL blending container, 200 mL of room temperature tap water. 40 g calcium sulfate hemi-hydrate (stucco) was dry mixed together with 20 g of a high viscosity, surface-treated (delayed solubility) HPMC, 0.8 g of trisodium trimetaphosphate, and 0.4 g of ground gypsum ball mill accelerator. The dry mixture was added to the water and the slurry was blended at low speed for 30 seconds. The slurry was deposited in an envelope of standard, decorative drywall paper in a 7"×2"×0.5" mold. The sample was dried at 45° C. for 48 hours. The sample was then cut, dimensioned, massed and mechanically tested. The resulting board had a density of only 0.33 g/cc (850 lbs/MSF) and an average nail pull resistance of 118 lbs.

Ultra-Lightweight Wallboard/Insulation Board. An ultra-lightweight wallboard cone was prepared by adding, to a 500 mL blending container, 200 mL of room temperature tap water. 65 g of beta-calcium sulfate-hemi-hydrate (stucco) was dry mixed together with 6.5 g of a high viscosity, surface-treated (delayed solubility) HPMC, 0.006 G of tri-sodium trimetaphosphate, 3.3 g of 1" chopped strand glass fibers and 0.06 g of f\ground gypsum ball mill accelerator. The dry mixture was added to the water and the slurry was blended at a low speed for 30 seconds. The slurry was then deposited in an envelope of standard, decorative drywall paper in a 7"×2"×0.5" mold. The sample was dried at 45° C. for 48 hours. The sample was then cut, dimensioned, massed and mechanically tested. The resulting board had a density of 0.34 g/cc (880 lbs/MSF) and an average nail pull resistance of only 84 lbs.

High viscosity, surface-treated HEMC. A paperless sample was prepared by mixing 100 g of β-calcium sulfate hemihydrate with 0.13 g ball mill ground gypsum (accelerator) and 1 g of retarded HEMC (viscosity grade of 15–20.5 kcps at 2 wt %, purchased from Aldrich Chemical Co.). The mixture was then added to 150 g of water and blended on high for 15 seconds, forming a slurry. The slurry was then poured into an approximately 7"×2"×½" mold. The sample was removed from the mold after 15 minutes and placed in a 45° C. convection oven for 48 hrs. The sample was then removed and cut to 5"×2". The density of sample was calculated and it was tested for flexural strength and nail pull resistance on an Instron mechanical testing system using the methods previously described. The wallboard specimen had an average density of 0.63 g/cc, a flexural strength of 545 psi, and a nail pull resistance of 78 lbs., passing the ASTM nail pull requirement.

High-viscosity, surface-treated HEMC. A paperless wallboard is prepared using the following procedure. First, 150 g of β-calcium sulfate hemihydrate is dry mixed with 0.2 g ground gypsum and 3 g of surface-treated (retarded dissolution) HEMC (15–20.5 kcps, purchased from Aldrich Chemical Co.). The dry ingredients are added to 162 g of tap water in a 500 mL Waring blender, forming a slurry. The slurry is blended at low speed for 15 seconds. The slurry is then immediately poured into a 7"×2"×½" mold and, after 20 minutes, removed. The wallboard specimen is placed in a convection oven at 45° C. for at least 36 hrs for drying. After removal from the oven, the sample is trimmed to 5" long, weighed and dimensioned. A specimen prepared according to this procedure had a density of 0.80 g/cc, a flexural strength of 975 psi, and a nail pull resistance of 180 lbs., exceeding ASTM standards for flexural strength and nail pull resistance for ½-inch wallboard.

High viscosity, surface-treated HEMC. A paperless wallboard is prepared using the following procedure. First, 150 grams of β-calcium sulfate hemihydrate is dry mixed with 0.2 g ground gypsum and 3 g of surface-treated HEMC (15–20.5 kcps, purchased from Aldrich Chemical Co.). The dry ingredients are then added to 150 g of tap water in a 500 mL Waring blender, forming a slurry. The slurry is blended at low speed for 15 seconds. The slurry is then immediately poured into a 7"×2"×½" mold and, after 20 minutes, removed. The wallboard specimen is placed in a convection oven at 45° C. for at least 36 hrs for drying. After removal from the oven, the specimen is cut to 5" long, weighed and dimensioned. A specimen prepared according to the foregoing procedure had a density of 0.85 g/cc, a flexural strength of 989 psi, and a nail pull resistance of 203 lbs., exceeding the ASTM standards for flexural strength and nail pull resistance for ½-inch wallboard.

Quarternization of Poly(vinylpyridine). An amount of 6 g of poly(4-vinylpyridine) MW 160,000 was dissolved in 80 g of nitromethane. The temperature of the solution was brought to 96° C. An amount of 10 g of hexyl bromide was added dropwise to the solution which was then left to stir for 4 hr. During the mixing, the color of the yellow solution became darker. After 4 hr, the solution was precipitated in 400 mL of toluene. The fibrous solid was filtered and washed with 100 mL of acetone. The quaternized polymer was dried in an oven at 180° C. for 30 minutes.

Use of Quarternized Poly(vinylpyridine). An amount of 100 parts of β-calcium sulfate hemihydrate was mixed with 0.5 parts of quaternized poly(vinylpyridine), 0.13 parts accelerator and 0.2 parts of dispersant. The mixture was then added to 150 parts of water containing a small percentage of retarder and blended at a high shear setting for approximately 20 seconds. The resulting slurry was poured directly from the laboratory blender to a mold measuring 12 in×14 in×0.5 in. After setting, the sample was removed from the mold and cured at 45° C. for 2 days.

Poly(vinylpyridine) Bio-Active Coating. A fibrous polyester material was coated with an anti-fungal polymer layer. A solution was made of the following: 6 g of 4-vinylpyridine, 0.12 g of divinylbenzene, 0.12 g of benzoyl peroxide, and 6 g of methanol. One each of a 2"×2" polyester pad and a glass mat were dipped in the solution and then were exposed to ultraviolet light for about 3 hours (plus or minus 10 minutes). Then, the pad and mat were immersed in a solution of 10 milli-liters of nitromethane/hexyl bromide (10:1, vol/vol) and placed in an oven at 80° C. for 4 h. After heating, the pad and mat were cooled to room temperature.

A mold solution was prepared. Two Petri dishes of potato dextrose agar were stored in a humid environment. After 3 days, a dense layer of mold was evident. In a 1000 mL flask, 10 g of potato dextrose starch was added to 500 mL of water. The mixture was heated with stirring until the starch dissolved and was then cooled to room temperature. Two drops of Triton-X was added. The moldy agar from the two Petri dishes was then added and the mixture was stirred for 30 min. The mixture was filtered and the dark green filtrate was collected in a spray bottle. For comparison, samples of an untreated polyester material and glass mat and the treated polyester pad and glass mat were each sprayed twice with the mold solution. The samples were then stored in a humidity chamber at 37 degrees C. and 90% humidity. After 5 days, both the untreated glass mat and the untreated polyester material exhibited mold growth while the bio-active, anti-fungal coated samples were free from mold growth. The samples were observed for a period of five weeks during which no mold growth was observed on the treated samples.

Gluturaldehyde Bio-Active Coating. In another example, both glyoxal treated hydroxyethyl methyl cellulose, a cellulose ether, and gluturaldehyde treated hydroxyethyl methyl cellulose were prepared by mixing an aqueous solution of the dialdehyde (e.g. 50 wt % gluturaldehyde or 40 wt % glyoxal) dropwise to a mixture of 1 gram of the cellulose ether in 20 milli-liters of acetone, until 1 gram of the dialdheyde aqueous solution was added. The mixture was stirred at ambient temperature for one-half hour and the treated cellulose ether was dried in an oven at 60 degrees centigrade until the acetone evaporated. Then, the treated cellulose ether was mixed at a ratio of 1:100 to water heated to 90 degrees centigrade. After the cellulose ether dispersed in the water, the temperature was reduced to ambient temperature to complete the dissolution of the cellulose ether. Solubility of the cellulose ether increases with decreasing temperature within this temperature range. Samples of each of the cellulose ethers were poured into petri dishes, which were exposed to mold in a warm, most environment (32 degrees centigrade; 89% humidity). The glyoxal treated cellulose ethers grew mold, but the gluturaldehyde treated cellulose ethers did not grow mold. For example, after the first week the glyoxal treated cellulose ethers showed 15–60% coverage of mold on the surface of the samples, whereas the gluturaldehyde remained free of mold. At five weeks, the glyoxal samples had between 50–70% mold coverage, whereas the gluturaldehyde remained mold free. In comparison, untreated hydroxyethyl methyl cellulose had 3050% mold coverage after 5 weeks.

Glass Fiber Gypsum, No Surface Modifier. As a comparative example, strands of fiber were removed from a sheet of woven type E fiberglass boat cloth. The strands were cut into 4" sections and individually massed to determine fiber denier. The specimens were then embedded in the center of a 9"×1"×½" gypsum block. The fibers were oriented parallel to the ½" direction with approximately one inch spacing between each fiber. The mold was constructed with the fibers suspended between two sets of clamped ½" zinc bars with two ½" plastic spacers. Three inches of fiber were left exposed from the gypsum block on one side for clamping to the testing apparatus.

One hundred grams of beta calcium sulfate hemi-hydrate stucco was mixed with 0.13 g of ground gypsum ball mill accelerator. This powder was added to 150 g tap water and mixed in a Waring blender at low speed for 15 seconds. The slurry was then poured into the mold around the suspended fibers. The block was removed from the mold after 20 minutes of setting and dried in a convection oven at 45 C for 24 hours.

After drying, the block was massed to determine matrix density. The pull-out characteristics of each fiber were tested using an Instron mechanical testing machine at a displacement rate of one inch per minute.

The gypsum density was 0.62 g/cc, the average fiber denier was 3.5 mg per inch, and the average pull-out strength was 2.62 lbs with a standard deviation of less than 5%.

Glass Fiber Gypsum, Polyurethane Latex Surface Modifier. As another comparative example, a commercially available polyurethane latex emulsion with an internal cross-linker was used as a sizing composition. The surface-modifier was applied at room temperature to strands removed from a sheet of woven type E fiberglass boat cloth. The surface-modifier was applied by winding the strands onto a small roller, submerging the roller in the sizing composition, and unwinding the strands through the composition. The fiber strands were then weighted with a small clip on one end to prevent warping and hung to dry in a 45 C convection oven for 30 minutes. The dried fibers were cut to 4" sections, massed, and embedded in a gypsum block, and the pull-out strength was tested following the procedure from the Glass Fiber Gypsum, No Size example. The results were recorded and compared to determine the amount of surface-modifier add-on and pull-out strength improvement from control fibers in the same matrix. Pullout strength improvement indicates the increase in pullout strength over that for a glass fiber with no surface modifier (negative indicates a decrease in strength).

| Fiber Denier (mg/in) | Pull-Out Strength (lbf) | Energy at Yield (lbf-in) | Add-On (% wt) | Pull-Out Strength Improvement |
|---|---|---|---|---|
| 8.0 | 2.3 | 0.023 | 128% | −14% |
| 8.4 | 3.0 | 0.101 | 138% | 13% |
| 8.6 | 2.3 | 0.027 | 144% | −12% |
| 8.6 | 2.5 | 0.102 | 144% | −6% |
| 9.2 | 2.5 | 0.009 | 162% | −6% |
| 9.3 | 3.0 | 0.041 | 166% | 13% |
| 9.4 | 2.1 | 0.167% | 167% | −20% |

Glass Fiber Gypsum, Waterborne Epoxy Surface-Modifier. Also included for comparison is a waterborne epoxy size. A sizing composition was prepared by mixing 100 g of Epirez 3519 50% solids waterborne epoxy emulsion with EpiCure curing agent, both from Shell. The surface-modifier was applied at room temperature to strands removed from a sheet of woven type E fiberglass boat cloth as in the previous example. The fiber strands were then weighted and hung to dry in a 100 C convection oven for 2 hours. The dried, cured fibers were then cut to 4" sections, massed, and embedded in a gypsum block and tested following the procedure from the previous examples. The results were recorded and compared to determine the amount of surface-modifier add-on and pull-out strength improvement from control fibers in the same matrix.

| Fiber Denier (mg/in) | Pull-Out Strength (lbf) | Energy at Yield (lbf-in) | Add-On (% wt) | Pull-Out Strength Improvement |
|---|---|---|---|---|
| 7.7 | 1.8 | 0.057 | 118% | −30% |
| 8.5 | 2.0 | 0.056 | 142% | −24% |
| 8.7 | 2.1 | 0.042 | 147% | −18% |
| 8.7 | 1.4 | 0.013 | 148% | −47% |
| 8.7 | 1.5 | 0.022 | 148% | −43% |
| 9.2 | 1.7 | 0.038 | 162% | −36% |
| 9.5 | 2.0 | 0.048 | 170% | −22% |

The polyurethane latex surface-modifier and waterborne epoxy surface-modifier are included for comparison with some preferred embodiments of the invention. Interfacial bond strength was not improved by adding these surface-modifiers between the gypsum and the fiber. Instead, polyurethane latex and waterborne epoxy reduced the pull-out strength, despite the increased surface contour and denier of the fiber. This may explain why sizing is removed as part of conventional processes, because one of ordinary skill in the art would not expect sizing to improve pullout strength.

Glass Fiber Gypsum. HPMC Surface-Modifier. A sizing composition was prepared by mixing 5 g of Methocel 240 from Dow Chemical (40,000 cps @ 2 wt %, 25 C) into 100 g of 85 C tap water. The dispersion was mixed for 5 minutes and then cooled to 45 C. The surface-modifier was applied to strands removed from a sheet of woven type E fiberglass boat cloth by winding the strands onto a small roller, submerging the roller in the sizing composition, and unwinding the strands through the composition. The fiber strands were then tensioned and hung to dry in a 45 C convection oven for 30 minutes. The dried fibers were cut to 4" sections, massed, and embedded in a gypsum block and tested following the previous procedures. The results were recorded and compared to determine the amount of surface-modifier add-on. The pull-out strength was measured and a percent improvement was calculated compared to the control specimens.

| Fiber Denier (mg/in) | Pull-Out Strength (lbf) | Energy at Yield (lbf-in) | Add-On (% wt) | Pull-Out Strength Improvement |
|---|---|---|---|---|
| 3.6 | 1.3 | 0.055 | 3% | −51% |
| 3.7 | 1.7 | 0.011 | 6% | −36% |
| 3.8 | 0.6 | 0.002 | 7% | −77% |
| 3.9 | 1.3 | 0.004 | 11% | −49% |
| 4.1 | 2.7 | 0.024 | 17% | 5% |
| 4.4 | 3.9 | 0.028 | 24% | 48% |
| 5.4 | 7.5 | 0.217 | 54% | 185% |
| 10.8 | 10.1 | 0.877 | 208% | 285% |

These results show that with less add-on, such as used in conventional sizing applications, the HPMC 1 surface-modifier reduces the pull-out strength. It is believed, without limiting in any way, that the weakening is due to migration of the polymer away from the fiber, leaving a porous and a weak interface between the fiber and cement matrix. However, increased add-on results in significantly improved pull-out strength and energy compared to the control specimen.

Glass Fiber Gypsum Low Molecular Weight HPMC Surface Modifier. A sizing composition was prepared by mixing 30 g of a lower viscosity grade HPMC than the previous example (from Aldrich with viscosity grade of 5 cps @ 2 wt %, 25 C) into 100 g of 85 C tap water. The dispersion was mixed for 5 minutes and then cooled to 25 C. The surface-modifier was applied to type E boat cloth glass fiber as described in the previous example. The fiber strands were then tensioned and hung to dry in a 45 C convection oven for 30 minutes. The dried fibers were cut to 4" sections, massed, and embedded in a gypsum block and tested following the previous procedures. The results were recorded and compared to determine the amount of surface modifier add-on and pull-out strength improvement.

| Fiber Denier (mg/in) | Pull-Out Strength (lbf) | Energy at Yield (lbf-in) | Add-On (% wt) | Pull-Out Strength Improvement |
|---|---|---|---|---|
| 7.4 | 1.6 | 0.004 | 111% | −39% |
| 8.6 | 0.3 | 0.001 | 145% | −90% |
| 9.8 | 2.7 | 0.023 | 179% | 5% |
| 11.0 | 0.6 | 0.003 | 214% | −77% |
| 11.8 | 2.9 | 0.011 | 236% | 11% |
| 13.8 | 4.7 | 0.061 | 293% | 80% |
| 20.5 | 16.4 | 0.231 | 483% | 527% |
| 20.8 | 11.5 | 0.712 | 492% | 340% |

This low viscosity grade cellulose ether did not improve fiber-cement adhesion as much as the previous example using a high viscosity grade HPMC. A greater amount of add-on was required to achieve a similar level of improvement in pull-out strength. For example, the pull-out energy of a fiber sized with 200% add-on of 40,000 cps HPMC is greater than that of a fiber with 500% add-on of 5 cps HPMC. The pullout strength appears to follow a trend similar to as the nail pull index and flexural strength of gypsum-based HPMC-reinforced composite panels, which are dramatically affected by viscosity grade, amount of additive and degree of substitution of substituent groups, such as methyl and hydroxy-propyl groups.

Glass Fiber Gypsum, High Molecular Weight HPMC/Polyurethane Surface Modification. A surface treatment composition was prepared by adding 4 g of Airflex 423, a 50% solids polyurethane latex emulsion with an internal cross-linker from Air Products Inc., to 100 g of 85 C tap water. Three grams of HPMC (Methocel 240 with a viscosity grade of 40,000 cps from Dow Chemical) was then added to the mixture. The dispersion was mixed for 5 minutes and then cooled to 45 C. The surface treatment was applied to type E boat cloth glass fiber as described in the previous examples. The fiber strands were then tensioned and hung to dry in a 45 C convection oven for 30 minutes. The dried fibers were cut to 4" sections, massed, and embedded in a gypsum block and tested following the previous procedure. The results were recorded and compared to determine the amount of size add-on and pull-out strength improvement from control fibers in the same matrix.

| Fiber Denier (mg/in) | Pull-Out Strength (lbf) | Energy at Yield (lbf-in) | Add-On (% wt) | Pull-Out Strength Improvement |
|---|---|---|---|---|
| 3.8 | 3.0 | 0.012 | 9% | 13% |
| 4.0 | 3.7 | 0.019 | 15% | 39% |
| 4.3 | 5.0 | 0.037 | 23% | 93% |
| 4.4 | 5.6 | 0.039 | 26% | 115% |
| 4.8 | 7.3 | 0.064 | 35% | 179% |

It is believed that the latex component of this sizing composition functions mainly to physically cross-link the HPMC and create a more uniform coating. It is observed that fibers coated with a reinforcing sizing that is physically or chemically cross-linked demonstrate improved fiber pull-out strength even with conventional amounts of sizing add-on. It is believed that the sizing does not dissolve and migrate away from the fiber. Thus, it remains an effective reinforcement, even at low levels. It is observed that fiber pull-out strength increases linearly with sizing add-on within the limits tested here.

Glass Fiber Gypsum, High Molecular Weight HPMC/Organic Titanate. A surface treatment composition was prepared by mixing 3 g of Methocel 240 from Dow Chemical (40,000 cps @ 2 wt %, 25 C) into 100 g of 85 C tap water. The dispersion was mixed for 5 minutes and then cooled to 60 C. Five drops of Tyzor 131, organic titanium chelate, from DuPont Chemical were added to the dispersion. This mixture was mixed for an additional 10 minutes and then cooled to 45 C. The surface treatment was applied to type E boat cloth glass fiber as described in the previous examples. The fiber strands were then tensioned and hung to dry in a 100° C. convection oven for 30 minutes. The dried fibers were cut to 4" sections, massed, and embedded in a gypsum block and tested following the previous procedure. The results were recorded and compared to determine the amount of size add-on and pull-out strength improvement from control fibers in the same matrix.

| Fiber Denier (mg/in) | Pull-Out Strength (lbf) | Energy at Yield (lbf-in) | Add-On (% wt) | Pull-Out Strength Improvement |
|---|---|---|---|---|
| 3.8 | 4.9 | 0.011 | 9% | 86% |
| 4.4 | 5.2 | 0.231 | 24% | 97% |
| 4.4 | 7.7 | 0.712 | 25% | 195% |
| 4.7 | 8.1 | — | 33% | 209% |

Figure 30:
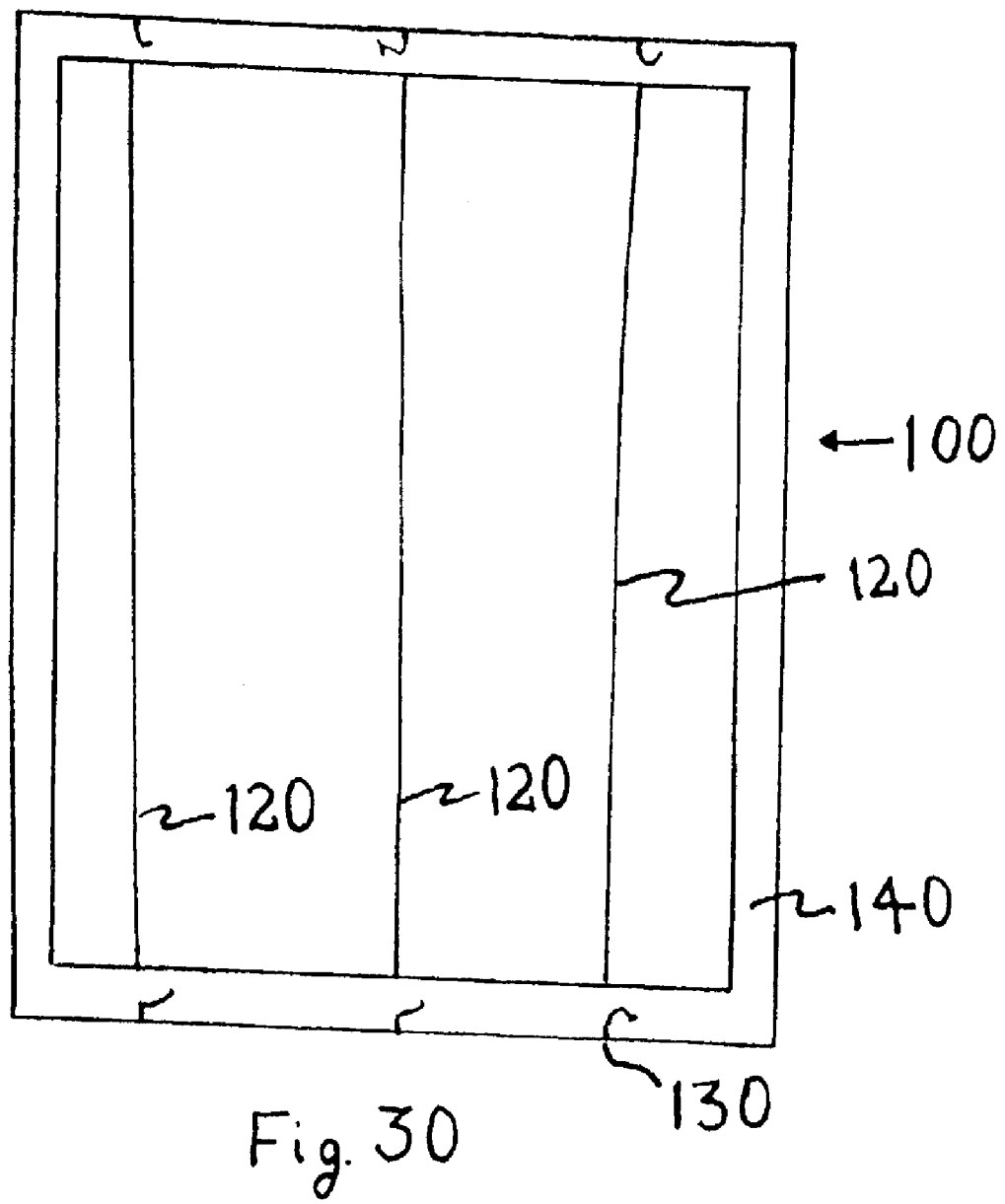
FIG. 30 shows one embodiment of a frame for use in surface modification of fibers

Glass Fiber Gypsum High Molecular Weight, Surface Treated HEMC/Melamine Sulfonate A sizing composition was prepared by mixing 1 g of sulfonated melamine poly-condensate (Melement F17 g from Degussa) and 3 g of surface treated, high viscosity HEMC (Culminal 15000 PFR from Hercules) into 100 g of tap water at room temperature. The mixture was stirred for two minutes. Ten drops of a 1% solution of calcium hydroxide was then added to the mixture which was stirred for another five minutes. The resulting sizing solution was applied to type E boat cloths glass fiber. Glass fiber strands measuring approximately two feet long were tensioned across a cardboard frame 100 as shown in FIG. 30. The frame 140 and fibers 120 were placed over wax paper and the solution of surface modifier was spread across the fibers. The frame was then lifted away from the paper, pulling the fibers through the surface modifier. The fibers were then dried in the framework in a 120° C. convection over for 30 minutes The surface modifier had good mechanical properties and strong swelling characteristics.

Mold Resistance. This test method is adapted from the mold test described in ASTM D3273-94 (Resistance to Growth of Mold on the Surface of Interior Coatings in an Environmental Chamber), which is incorporated as background for the test herein in its entirety. The adapted test provides a procedure for photographic recordings and comparative descriptions of specimens, which are representations of its susceptibility to mold growth. The extent of mold coverage, thickness, and color is recorded weekly, along with digital photographs of the specimens. In the modified procedure, a 6 in.×6 in. square specimen was prepared in a form using no release agent or oil, which eliminates any extraneous food source for mold. The specimen was cut on all edges using a table saw. Each specimen was supported vertically in a rack that allowed adequate circulation of air through the gaps at the bottom of the rack. The rack was placed into a Form a 3033 Steri-cult incubator and mold spores were circulated from the bottom to top of the chamber. The incubating environment was maintained at 90° F. (32.2° C.) and 90% relative humidity. The specimens were analyzed for mold growth and rotated weekly. The mold coverage, thickness, and color were observed, recorded, and documented with digital photographs, using a fluorescent lamp from above to enhance the contrast of the growth on the sample faces.

For example, paperless wallboard core with a cellulose ether added and wallboard having a single ply of newsprint showed no mold growth at 24 days. With 1 wt % starch added, paperless wallboard showed 30% mold coverage and 40% mold density at day 7, and mold coverage of 90% and mold density of 50% at day 14. A commercial, multi-ply paper wallboard having 80–100% coverage of mold growth at the end of 7 days (National Gypsum). Thus, under high humidity conditions paperless wallboard and wallboard having a single ply of newsprint exhibited much greater resistance to mold growth than commercial, multi-ply paper covered wallboard.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

TABLE I

Examples of Commercially Available Cellulose Ethers

| Source | Viscosity Grade (cps) | Measured Viscosity Grade (cps) | Surface Treated | Average MW | D.S. | M.S. | Reported % Me | Reported % HE | Reported % HP | Measured % Me | Measured % HP |
|---|---|---|---|---|---|---|---|---|---|---|---|
| HEC | 4,500–6,500 (Brookfield) | | X | 720,000 | 1.5 | 2.5 | — | — | — | — | — |
| HEC | 80–125 (Brookfield) | | X | 250,000 | 1 | 2 | — | — | — | — | — |
| HEMC | 15,000–20,500 (Brookfield) | | X | — | 1.6–1.9 | 0.25–0.5 | 26 | 8 | — | — | — |
| HEMC | 25,000 (Brookfield) | | | — | 1.6–1.9 | 0.25–0.5 | 22–30 | 2–14 | — | — | — |
| HEMC | 65,000 (Brookfield) | | | — | 1.6–1.9 | 0.25–0.5 | 22–30 | 2–14 | — | — | — |
| HPMC | 100,000 (Ubbelohde) | 83,803 | | 120,000 | 1.1–1.6 | 0.1–0.3 | 21 | — | 5 | 25 | 9 |
| HPMC | 15,000 (Ubbelohde) | | | 90,000 | 1.1–1.6 | 0.1–0.3 | 21 | — | 5 | 25 | 8 |
| HPMC | 3,800 (Ubbelohde) | 2,747 | | 86,000 | 1.7–1.9 | 0.1–0.2 | 29 | — | 7 | 30 | 4 |
| HPMC | 4,000 (Ubbelohde) | | | 86,000 | 1.8–2.0 | 0.2–0.3 | 29 | — | 7 | 32 | 8 |
| HPMC | 80–120 (Ubbelohde) | | | 12,000 | 1.1–1.6 | 0.1–0.3 | 21 | — | 5 | 25 | 7 |
| HPMC | 50 (Ubbelohde) | | | 11,500 | 1.8–2.0 | 0.2–0.3 | 29 | — | 7 | 32 | 7 |
| HPMC | 6 (Ubbelohde) | | | 10,000 | 1.8–2.0 | 0.2–0.3 | 29 | — | 7 | 29 | 6 |
| HPMC | 5 (Ubbelohde) | | | 10,000 | 1.8–2.0 | 0.2–0.3 | 29 | — | 9 | 32 | 7 |
| HPMC | 11,000 (Brookfield)/15,000 (Ubbelohde) | 8,309 | | — | 1.4 | 0.21 | 22 | — | 8 | 23 | 3 |
| HPMC | 3,800 (Brookfield)/4,000 (Ubbelohde) | 4,104 | | — | 1.8 | 0.13 | 28 | — | 5 | 31 | 4 |
| HPMC | 22,000 (Brookfield)/40,000 (Ubbelohde) | 40,020 | | — | — | — | — | — | — | 31 | 4 |
| HPMC | 3,800 (Brookfield)/4,000 (Ubbelohde) | | X | — | — | — | 18 | — | 27 | 21 | 15 |
| HPMC | 22,000 (Brookfield)/40,000 (Ubbelohde) | | X | — | — | — | 18 | — | 27 | 20 | 13 |
| HPMC | 65,000 (Brookfield) | 311,267 | | — | 1.6–1.9 | 0.2–0.4 | 20–30 | — | 2–25 | 32 | 2 |
| HPMC | 65,000–86,000 (Brookfield) | | X | — | — | — | 20–30 | — | 2–25 | 27 | 2 |
| HPMC | 22,000 (Brookfield) | 68,385 | | — | 1.6–1.9 | 0.4–0.8 | 20–30 | — | 2–25 | 23 | 4 |
| MC | 4,000 | | X | 86,000 | 1.6–1.9 | — | 27.5–31.5 | — | — | 33 | 0 |
| MC | 400 | | X | 40,000 | 1.6–1.9 | — | 27.5–31.5 | — | — | 28 | 0 |
| MC | 1,500 | | X | 63,000 | — | — | — | — | — | 34 | 0.1 |
| MC | 25 | | X | 17,000 | — | — | — | — | — | 32 | 0 |
| MC | 15 | | X | 14,000 | 1.6–1.9 | — | 27.5–31.5 | — | — | 31 | 0 |

TABLE II

Correlation Coefficients & Exponents

MC NP Index

| B1 | B2 | B3 | B4 | Y1 | Y2 |
|---|---|---|---|---|---|
| −10.54871 | 0.00037 | 13.41978 | 1.16830 | 0.99736 | 11.81617 |
| Y3 | | Y4 | | Y5 | Y6 |
| −1.36696 | | 0.98050 | | −0.07942 | 0.06035 |

MC TPB Index

| C1 | C2 | C3 | C4 | C5 | Z1 | Z2 |
|---|---|---|---|---|---|---|
| −70.10242 | 6.88755 | 33.06707 | 48.23504 | 2.11972 | 0.02781 | −0.19560 |
| Z3 | Z4 | Z5 | Z6 | Z7 | Z8 | |
| −0.22841 | −0.11900 | −0.36825 | 0.09072 | 0.02629 | 0.03841 | |

HP NP Index

| A1 | A2 | A3 | A4 | A5 | X1 | X2 |
|---|---|---|---|---|---|---|
| 2.956625 | −0.568141 | −0.013089 | 4.07E−06 | 0.713089 | 0.490977 | 0.152411 |
| | X3 | X4 | X5 | X6 | X7 | X8 |
| | 0.129997 | 0.608552 | −0.765522 | 1.205066 | 3.080522 | −0.590659 |

TABLE III

Correlation Compared to Data

| viscosity gr. (cps) | 5 | 6 | 50 | 100 | 4104 | 2747 | 3800 | 11000 | 8309 | 40020 | 68385 | 311267 | 83803 |
|---|---|---|---|---|---|---|---|---|---|---|---|---|---|
| Me % | 32.3 | 29.1 | 31.8 | 24.6 | 30.96 | 30 | 31.8 | 25.3 | 22.82 | 31.28 | 23.34 | 31.57 | 24.7 |
| HP % | 7 | 6 | 7 | 7 | 4.05 | 4 | 8 | 8 | 3.38 | 3.94 | 4.27 | 1.56 | 9 |
| Experimentally Measured Nail Pull Index (HPMC - wt %) | | | | | | | | | | | | | |
| 0.25 | 1.19 | 0.85 | 1.30 | 1.21 | 1.20 | 1.14 | 1.33 | 1.29 | 1.22 | 1.19 | 1.35 | 1.33 | 1.39 |
| 0.5 | 0.92 | 1.09 | 1.24 | 1.25 | 1.38 | 1.45 | 1.44 | 1.57 | 1.54 | 1.51 | 1.43 | 1.49 | 1.64 |
| 1 | 0.89 | 0.91 | 1.08 | 1.35 | 1.65 | 1.65 | 1.53 | 1.70 | 1.62 | 1.63 | 1.98 | 1.85 | 1.95 |
| 2 | | | | | 2.04 | 2.01 | 1.93 | 2.28 | 2.21 | 2.12 | 2.22 | 2.30 | 2.17 |
| Nail Pull Index as Calculated by Correlation (HPMC - wt %) | | | | | | | | | | | | | |
| 0.25 | 1.11 | 0.98 | 1.16 | 1.17 | 1.18 | 1.18 | 1.35 | 1.35 | 1.25 | 1.25 | 1.31 | 1.30 | 1.45 |
| 0.5 | 0.96 | 0.92 | 1.16 | 1.24 | 1.35 | 1.34 | 1.42 | 1.49 | 1.46 | 1.45 | 1.53 | 1.53 | 1.59 |
| 1 | 0.88 | 0.91 | 1.24 | 1.38 | 1.60 | 1.59 | 1.61 | 1.73 | 1.75 | 1.73 | 1.86 | 1.86 | 1.85 |
| 2 | | | | | 1.96 | 1.93 | 1.91 | 2.10 | 2.17 | 2.14 | 2.31 | 2.33 | 2.26 |

TABLE IV

ASTM Standard

| Tests: | Flexural Strength | | Nail Pull Resistance |
|---|---|---|---|
| Thickness (inches) | Method A (lbs.) | Method B (lbf) | Method B (lbf) |
| ¼ | 50 | 46 | 36 |
| ⁵⁄₁₆ | 65 | 62 | 46 |
| ⅜ | 80 | 77 | 56 |
| ½ | 110 | 107 | 77 |
| ⅝ | 150 | 147 | 87 |
| ¾ | 170 | 167 | 97 |

What is claimed is:

1. A composite structure comprising:
gypsum; and
an additive, wherein the gypsum forms by hydration of a calcium sulfate hemihydrate in the presence of the additive and water, and the additive is of a cellulose ether other than CMC, and both a viscosity grade of the cellulose ether and a degree of substitution of at least one substitutional group of the cellulose ether are selected such that the strength of the composite is substantially increased compared to a structure prepared without the additive.

2. The composite structure of claim 1, wherein the cellulose ether is of an hydroxypropyl cellulose, an hydroxyethyl cellulose, a methyl cellulose, an hydroxypropyl methyl cellulose, an ethyl hydroxyethyl cellulose, an ethyl hydroxypropyl cellulose or an hydroxyethyl methyl cellulose.

3. The composite structure of claim 1, wherein the cellulose ether is of an hyroxypropyl methyl cellulose or an hydroxyethyl methyl cellulose.

4. The composite structure of claim 1, wherein the cellulose ether is of an hydroxypropyl methyl cellulose.

5. The composite structure of claim 1, wherein the cellulose ether is of an hydroxyethyl methyl cellulose.

6. The composite structure of claim 1, wherein the composite structure comprises substantially no clay.

7. The composite structure of claim 1, wherein the degree of substitution of the at least one substitutional group is no greater than 1.8, and the viscosity grade is at least 10 cps.

8. The composite structure of claim 7, wherein the cellulose ether is of methyl cellulose.

9. The composite structure of claim 8, wherein the methyl cellulose is selected to have a degree of substitution no greater than 1.5.

10. The composite structure of claim 8, wherein the cellulose ether is selected to have a methyl degree of substitution less than 1.8, and the viscosity grade is at least 100 cps.

11. The composite structure of claim 7, wherein the cellulose ether is selected to have a methyl degree of substitution less than 1.5.

12. The composite structure of claim 4, wherein at least 1 wt % of the cellulose ether is added to the calcium sulfate hemihydrate, and the cellulose ether is selected to have a viscosity grade of at least 100 cps and a degree of methyl substitution of no greater than 1.8.

13. The composite structure of claim 12, wherein the hydroxypropyl substitution is one of less than 4 wt % or greater than 8 wt %.

14. The composite structure of claim 13, wherein the cellulose ether is selected to have a viscosity grade of at least 1000 cps.

15. The composite structure of claim 14, wherein the cellulose ether is selected to have a viscosity grade of at least 100,000 cps, and the hydroxypropyl substitution is no greater than 4 wt %.

16. The wallboard core of claim 15, wherein the cellulose ether is selected to have a methyl degree of substitution no greater than 1.5.

17. The composite structure of claim 1, further comprising a gluturaldehyde, whereby the composite structure resists mold growth.

18. The composite structure of claim 17, wherein the gluturaldehyde is added as a surface treatment on the additive, whereby dissolution of the additive is delayed, affecting the microstructure of the composite structure.

19. The composite structure of claim 1, further comprising a sodium trimetaphosphate.

20. The composite structure of claim 19, wherein the cellulose ether is of an hydroxypropyl methyl cellulose.

21. The composite structure of claim 19, wherein the cellulose ether is of an hydroxethyl methyl cellulose.

22. The composite structure of claim 19, wherein the sodium trimetaphosphate is added in a range from 0.02 wt % to 1 wt %.

23. The composite structure of claim 19, wherein the composite structure has a density in a range from 0.3 g/cc to 0.8 g/cc.

24. The composite structure of claim 19, wherein the composite structure is a wallboard.

25. The composite structure of claim 1, wherein the cellulose ether is of an hydroxypropyl methyl cellulose, and the cellulose ether is selected to have an hydroxypropyl substitution greater than 6 wt %, and the amount of the additive is less than 1 wt % of the calcium sulfate hemihydrate.

26. The composite structure of claim 25, wherein the cellulose ether is selected to have a viscosity grade no greater than 10,000 cps.

27. The composite structure of claim 26, wherein the amount of the additive is no greater than 0.5 wt %, and the cellulose ether is selected to have a methyl degree of substitution of at least 1.5.

28. The composite structure of claim 27, wherein the cellulose ether is selected to have a viscosity grade no greater than 1000 cps and a methyl degree of substitution of at least 1.8.

29. The composite structure of claim 28, wherein the cellulose ether is selected to have a hydroxypropyl substitution of at least 8 wt %.

30. A process for making a composite structure comprising:
mixing together a calcium sulfate hemihydrate powder and a powdered additive, until the powdered additive is dispersed throughout the calcium sulfate hemihydrate powder to form a mixture;
combining the mixture and an amount of water forming a slurry;
shaping the composite structure; and
drying the composite structure, wherein the powdered additive is a cellulose ether having at least one substitutional group selected from the substitutional groups of methyl, hydroxypropyl and hydroxyethyl and the degree of substitution of the at least one substitutional group is selected to be in a range that at least partially immobilizes the additive during drying, preventing migration of the cellulose ether from the interior to the surface of the composite structure.

31. A process for making a composite structure comprising:
preparing a mixture comprised of a calcium sulfate hemihydrate, an additive and water; wherein the additive is a cellulose ether selected to have both a viscosity grade of at least 100 cps and a degree of substitution of at least one substitutional group selected from one of a methyl group, an hydroxypropyl group and an hydroxyethyl group such that the composite structure has a substantially increased strength compared to a structure made without the additive; and forming the composite structure from the mixture.

32. A composite structure comprising:
gypsum;
an additive; and
a reinforcement, wherein the gypsum forms by hydration of a calcium sulfate hemihydrate in the presence of the additive, the reinforcement, and water, and the additive is of a cellulose ether, and the reinforcement is surface modified, by a surface modifier whereby the strength of the composite structure is substantially increased compared to a structure prepared without the additive and the reinforcement.

33. The composite structure of claim 32, wherein the reinforcement is fibrous.

34. The composite structure of claim 33, wherein the surface modifier is of a cellulose ether.

35. The composite structure of claim 33, wherein the surface modifier is of a cellulose ether and a crosslinking agent.

36. The composite structure of claim 34, wherein the cellulose ether is a hydroxypropyl methyl cellulose.

37. The composite structure of claim 35, wherein the crosslinking agent is of a polyurethane latex, and the cellulose ether is of a hydroxypropyl methyl cellulose.

38. The composite structure of claim 35 wherein the crosslinking agent is of an organic titanate and the cellulose ether is of an hydroxypropyl methyl cellulose.

39. The composite structure of claim 35, wherein the cellulose ether is of a hydroxyethyl methyl cellulose and the crosslinking agent is of a sulfonated melamine.

40. The composite structure of claim 32, wherein the surface modifier is one of a starch, a starch derivative, a cellulose derivative, an acrylic polymer, a polyvinylacetate, a polyvinyl alcohol, an alginate and a natural gum, and a process of fabricating the composite is selected as such that a substantial portion of the surface modifier remains on the surface of the reinforcement after the composite structure is fabricated, whereby the pull-out strength of the fiber is increased compared to a reinforcement without the surface modifier.

41. The composite structure of claim 40, wherein the process of fabricating includes a step that exposes the surface modified reinforcement to a high temperature, whereby the surface modifier is crosslinked.

42. The composite structure of claim 32, wherein the surface modifier is of a polyvinyl pyrrolidone.

43. The composite structure of claim 42, wherein the surface modifier is crosslinked by ultra-violet light.

44. The composite structure of claim 42, wherein the polyvinyl pyrrolidone is crosslinked by one of calcium chloride with peroxides and poly(styrene sulfonate).

45. The composite structure of claim 32, further comprising a coupling agent, whereby a bond between the reinforcement and the surface modifier is formed or strengthened.

46. The composite structure of claim 45, wherein the coupling agent is of a silane.

47. The composite structure of claim 45, wherein the coupling agent is an organic titanate.

48. The composite structure of claim 45, wherein the coupling agent is applied as a primer to a surface of the reinforcement prior to the surface modifier, whereby the surface modifier is crosslinked adjacent to the surface of the reinforcement but is not crosslinked at a radial position further from the surface of the reinforcement.

49. The composite structure of claim 32, further comprising a plasticizer that is added to the surface modifier.

50. The composite structure of claim 33, wherein the reinforcement is one of a monofilament, bundled fibers, and spun strands.

51. The composite structure of claim 33, wherein the reinforcement is one of glass, mineral wool, and metal.

52. The composite structure of claim 33, wherein the reinforcement is one of polypropylene, polyester and nylon.

53. The composite structure of claim 34, wherein the reinforcement is one of cotton, hemp and wood.

54. The composite structure of claim 34, wherein the fibrous surfaces are one of bundled fibers and spun strands, and the surface modifier comprises an intact layer around the one of bundled fibers and spun strands while allowing the fibrous surfaces of one of the bundled fibers and spun strands to separate a finite distance during processing, whereby the surface modifier acts as a binder.

55. The composite structure of claim 33, wherein the surface modifier is one of a carboxymethyl cellulose, and the reinforcements are arranged in a consolidated layer.

56. The composite structure of claim 1, further comprising at least one facing sheet applied to at least one surface of the composite structure.

57. The composite structure of claim 56, further comprising a surface modifier, wherein the surface modifier is applied to at least one facing sheet.

58. The composite structure of claim 1, further comprising an accelerant, wherein the accelerant nucleates crystallization of gypsum crystals.

59. The composite structure of claim 57, wherein the surface modifier comprises a bio-active polymer.

60. The composite structure of claim 34, wherein the surface modifier comprises a bio-active polymer.

61. The composite structure of claim 60, wherein the bio-active polymer is a quarternized poly(vinylpyridine).

62. The composite structure of claim 34, wherein the surface modifier is a multifunctional molecule comprising at least one polymeric group that binds the surface modifier to one of the reinforcement and the gypsum, and another polymeric group having a different function.

* * * * *